(12) United States Patent
Edgington, Jr.

(10) Patent No.: US 12,074,932 B2
(45) Date of Patent: *Aug. 27, 2024

(54) DIGITAL SIGNAGE AND DIGITAL SIGNAGE CONTENT MANAGER

(71) Applicant: Recognition Concepts, Inc., Coppell, TX (US)

(72) Inventor: Edward Jack Edgington, Jr., Coppell, TX (US)

(73) Assignee: Recognition Concepts, Inc., Coppell, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/410,530

(22) Filed: Aug. 24, 2021

(65) Prior Publication Data

US 2022/0014573 A1 Jan. 13, 2022

Related U.S. Application Data

(63) Continuation of application No. 15/615,674, filed on Jun. 6, 2017, now Pat. No. 11,102,257.

(60) Provisional application No. 62/346,435, filed on Jun. 6, 2016.

(51) Int. Cl.
| | |
|---|---|
| *H04L 65/61* | (2022.01) |
| *H04L 65/612* | (2022.01) |
| *H04N 21/262* | (2011.01) |
| *H04N 21/414* | (2011.01) |
| *H04N 21/43* | (2011.01) |

(52) U.S. Cl.
CPC ............ *H04L 65/61* (2022.05); *H04L 65/612* (2022.05); *H04N 21/26241* (2013.01); *H04N 21/26258* (2013.01); *H04N 21/41415* (2013.01); *H04N 21/43079* (2020.08)

(58) Field of Classification Search
CPC ......................... H04L 65/61; H04N 21/26258
See application file for complete search history.

(56) References Cited

U.S. PATENT DOCUMENTS

| | | | | |
|---|---|---|---|---|
| 9,575,614 | B1* | 2/2017 | Aebersold | G06Q 30/0276 |
| 10,489,824 | B2* | 11/2019 | Vaya | H04W 4/80 |
| 2005/0039206 | A1* | 2/2005 | Opdycke | G06Q 30/0277 |
| | | | | 725/23 |
| 2008/0319856 | A1* | 12/2008 | Zito | G06F 16/954 |
| | | | | 715/716 |
| 2009/0049097 | A1* | 2/2009 | Nocifera | H04L 65/611 |
| | | | | 709/224 |
| 2010/0057928 | A1* | 3/2010 | Kapoor | G06F 16/4387 |
| | | | | 709/231 |
| 2011/0004669 | A1* | 1/2011 | Navar | G06F 21/10 |
| | | | | 709/217 |
| 2011/0225238 | A1* | 9/2011 | Shaffer | H04W 4/06 |
| | | | | 709/227 |

(Continued)

*Primary Examiner* — Jeffrey R Swearingen
(74) *Attorney, Agent, or Firm* — Ferguson Braswell Fraser Kubasta PC

(57) ABSTRACT

In various implementations, a signage manager may manage digital sign content. The signage manager may transmit playlists and/or media to signage devices to be presented on a display and/or on a set of displays. The signage manger may allow independent customization of playlists. The media items associated with the playlists and presented on display(s) may be stored on a memory of the signal device and/or streamed media from another source.

17 Claims, 40 Drawing Sheets

(56) References Cited

U.S. PATENT DOCUMENTS

2014/0351748 A1* 11/2014 Xia .................. G06F 3/0481
  715/798
2017/0019394 A1* 1/2017 Yastrebenetsky ..... H04L 63/083

* cited by examiner

| | | |
|---|---|---|
| ⊞ Sign Zone Layout | Cafeteria<br>Location: Dallas | |
| ⊞ Content Zone | Last published: 5/19/2016 11:33 AM<br>Publisher: Melissa Snow | Edit Zone |
| ⊞ Scheduled Video Zone | Last published: 9/25/2015 11:14 AM<br>Publisher: Melissa Snow | Edit Zone |
| ⊞ Info Zone | Last published: 4/27/2016 7:54 AM<br>Publisher: Melissa Snow | Edit Zone |
| ⊞ Weather Zone | Last published: 5/18/2016 10:35 AM<br>Publisher: Melissa Snow | Edit Zone |
| ⊞ Marquee Zone | Last published: 4/19/2016 11:23 AM<br>Publisher: Melissa Snow | Edit Zone |
| ⊞ Severe Weather Zone | Last published: 4/13/2016 4:29 AM<br>Publisher: Melissa Snow | Edit Zone |
| ⊞ Traffic | Last published: 5/11/2016 6:54 AM<br>Publisher: Melissa Snow | Edit Zone |
| ⊞ Enhanced Content | Last published: 5/11/2016 7:51 AM<br>Publisher: Melissa Snow | Edit Zone |

FIG. 1D

| | | |
|---|---|---|
| ⊞ Sign Zone Layout | Cafeteria<br>Location: Dallas | |
| ☐ Content (portrait)<br>☐ Content (landscape) | ☐ Info<br>☐ Marquee<br>☐ Weather | |
| ☐ Content (portrait)<br>☐ Content (landscape) | ☐ Info<br>☐ Marquee<br>☐ Weather | |
| ⊞ Content Zone | Last published: 5/19/2016 11:33 AM<br>Publisher: Melissa Snow | Edit Zone |
| ⊞ Scheduled Video Zone | Last published: 9/25/2015 11:14 AM<br>Publisher: Melissa Snow | Edit Zone |
| ⊞ Info Zone | Last published: 4/27/2016 7:54 AM<br>Publisher: Melissa Snow | Edit Zone |
| ⊞ Weather Zone | Last published: 5/18/2016 10:35 AM<br>Publisher: Melissa Snow | Edit Zone |
| ⊞ Marquee Zone | Last published: 4/19/2016 11:23 AM<br>Publisher: Melissa Snow | Edit Zone |
| ⊞ Severe Weather Zone | Last published: 4/13/2016 4:29 AM<br>Publisher: Melissa Snow | Edit Zone |
| ⊞ Traffic | Last published: 5/11/2016 6:54 AM<br>Publisher: Melissa Snow | Edit Zone |
| ⊞ Enhanced Content | Last published: 5/11/2016 7:51 AM<br>Publisher: Melissa Snow | Edit Zone |

FIG. 2

| | | |
|---|---|---|
| [+] Sign Zone Layout | Cafeteria<br>Location: Dallas | |
| [+] Content Zone | Last published: 5/19/2016 11:33 AM<br>Publisher: Melissa Snow | Edit Zone |

*Portrait Zone*

| Title | View | Duration | Start Date | End Date |
|---|---|---|---|---|
| Recycle Reuse | View | :15 | 4/11/2016 | 4/18/2017 |
| Food Truck Party | View | :15 | 4/11/2016 | 4/18/2017 |
| Phone Use - Driving Dangers | View | :15 | 4/28/2016 | 4/29/2017 |
| Spring Fling | View | :15 | 4/11/2016 | 4/18/2017 |

*Landscape Zone*

| Title | View | Duration | Start Date | End Date |
|---|---|---|---|---|
| Sleep Management 7 | View | :15 | 5/1/2016 | 4/29/2017 |
| Sleep Management 3 | View | a:15 | 5/1/2016 | 4/29/2017 |
| Healthy Lunch Choices 1 | View | :15 | 5/1/2016 | 4/29/2017 |
| wellness 1 | View | :15 | 5/1/2016 | 4/29/2017 |

| | | |
|---|---|---|
| [+] Scheduled Video Zone | Last published: 9/25/2015 11:14 AM<br>Publisher: Melissa Snow | Edit Zone |
| [+] Info Zone | Last published: 4/27/2016 7:54 AM<br>Publisher: Melissa Snow | Edit Zone |
| [+] Weather Zone | Last published: 5/18/2016 10:35 AM<br>Publisher: Melissa Snow | Edit Zone |
| [+] Marquee Zone | Last published: 4/19/2016 11:23 AM<br>Publisher: Melissa Snow | Edit Zone |
| [+] Severe Weather Zone | Last published: 4/13/2016 4:29 AM<br>Publisher: Melissa Snow | Edit Zone |
| [+] Traffic | Last published: 5/11/2016 6:54 AM<br>Publisher: Melissa Snow | Edit Zone |
| [+] Enhanced Content | Last published: 5/11/2016 7:51 AM<br>Publisher: Melissa Snow | Edit Zone |

FIG. 3

| | | |
|---|---|---|
| ⊞ Sign Zone Layout | Cafeteria<br>Location: Dallas | |
| ⊞ Content Zone | Last published: 5/19/2016 11:33 AM<br>Publisher: Melissa Snow | Edit Zone |
| ⊞ Scheduled Video Zone | Last published: 9/25/2015 11:14 AM<br>Publisher: Melissa Snow | Edit Zone |

| Title | View | Start/End Dates | Days Shown | Time | Duration | View |
|---|---|---|---|---|---|---|
| | | | | | | |

| | | |
|---|---|---|
| ⊞ Info Zone | Last published: 4/27/2016 7:54 AM<br>Publisher: Melissa Snow | Edit Zone |
| ⊞ Weather Zone | Last published: 5/18/2016 10:35 AM<br>Publisher: Melissa Snow | Edit Zone |
| ⊞ Marquee Zone | Last published: 4/19/2016 11:23 AM<br>Publisher: Melissa Snow | Edit Zone |
| ⊞ Severe Weather Zone | Last published: 4/13/2016 4:29 AM<br>Publisher: Melissa Snow | Edit Zone |
| ⊞ Traffic | Last published: 5/11/2016 6:54 AM<br>Publisher: Melissa Snow | Edit Zone |
| ⊞ Enhanced Content | Last published: 5/11/2016 7:51 AM<br>Publisher: Melissa Snow | Edit Zone |

FIG. 4

| | | |
|---|---|---|
| ⊞ Sign Zone Layout | Cafeteria<br>Location: Dallas | |
| ⊞ Content Zone | Last published: 5/19/2016 11:33 AM<br>Publisher: Melissa Snow | Edit Zone |
| ⊞ Scheduled Video Zone | Last published: 9/25/2015 11:14 AM<br>Publisher: Melissa Snow | Edit Zone |
| ⊞ Info Zone | Last published: 4/27/2016 7:54 AM<br>Publisher: Melissa Snow | Edit Zone |

| Topic | Date Added |
|---|---|
| Health & Wellness | 4/27/2016 |
| Healthy Eating | 4/27/2016 |
| Healthy Heart | 4/27/2016 |
| | |

| | | |
|---|---|---|
| ⊞ Weather Zone | Last published: 5/18/2016 10:35 AM<br>Publisher: Melissa Snow | Edit Zone |
| ⊞ Marquee Zone | Last published: 4/19/2016 11:23 AM<br>Publisher: Melissa Snow | Edit Zone |
| ⊞ Severe Weather Zone | Last published: 4/13/2016 4:29 AM<br>Publisher: Melissa Snow | Edit Zone |
| ⊞ Traffic | Last published: 5/11/2016 6:54 AM<br>Publisher: Melissa Snow | Edit Zone |
| ⊞ Enhanced Content | Last published: 5/11/2016 7:51 AM<br>Publisher: Melissa Snow | Edit Zone |

FIG. 5

| | | |
|---|---|---|
| ⊞ Sign Zone Layout | Cafeteria<br>Location: Dallas | |
| ⊞ Content Zone | Last published: 5/19/2016 11:33 AM<br>Publisher: Melissa Snow | [Edit Zone] |
| ⊞ Scheduled Video Zone | Last published: 9/25/2015 11:14 AM<br>Publisher: Melissa Snow | [Edit Zone] |
| ⊞ Info Zone | Last published: 4/27/2016 7:54 AM<br>Publisher: Melissa Snow | [Edit Zone] |
| ⊞ Weather Zone | Last published: 5/18/2016 10:35 AM<br>Publisher: Melissa Snow | [Edit Zone] |

| Locale | |
|---|---|
| 75201 | Dallas, TX |
| 84101 | Salt Lake City, UT |
| 30301 | Atlanta, GA |
| 34231 | Sarasota, FL |

| | | |
|---|---|---|
| ⊞ Marquee Zone | Last published: 4/19/2016 11:23 AM<br>Publisher: Melissa Snow | [Edit Zone] |
| ⊞ Severe Weather Zone | Last published: 4/13/2016 4:29 AM<br>Publisher: Melissa Snow | [Edit Zone] |
| ⊞ Traffic | Last published: 5/11/2016 6:54 AM<br>Publisher: Melissa Snow | [Edit Zone] |
| ⊞ Enhanced Content | Last published: 5/11/2016 7:51 AM<br>Publisher: Melissa Snow | [Edit Zone] |

FIG. 6

| | | |
|---|---|---|
| ⊞ Sign Zone Layout | Cafeteria<br>Location: Dallas | |
| ⊞ Content Zone | Last published: 5/19/2016 11:33 AM<br>Publisher: Melissa Snow | Edit Zone |
| ⊞ Scheduled Video Zone | Last published: 9/25/2015 11:14 AM<br>Publisher: Melissa Snow | Edit Zone |
| ⊞ Info Zone | Last published: 4/27/2016 7:54 AM<br>Publisher: Melissa Snow | Edit Zone |
| ⊞ Weather Zone | Last published: 5/18/2016 10:35 AM<br>Publisher: Melissa Snow | Edit Zone |
| ⊞ Marquee Zone | Last published: 4/19/2016 11:23 AM<br>Publisher: Melissa Snow | Edit Zone |
| Ticker-Message set: Standard American (English) | | |
| Messages | | |
| Day shift has been safe for 357 days - Safety Meeting is May 11 at 10 am in breakroom<br>Open Enrollment paperwork due end of day 4/15 | | |
| RSS (News Feed) | | |
| Location | | |
| Sports: ESPN Top Headlines | | |
| ⊞ Severe Weather Zone | Last published: 4/13/2016 4:29 AM<br>Publisher: Melissa Snow | Edit Zone |
| ⊞ Traffic | Last published: 5/11/2016 6:54 AM<br>Publisher: Melissa Snow | Edit Zone |
| ⊞ Enhanced Content | Last published: 5/11/2016 7:51 AM<br>Publisher: Melissa Snow | Edit Zone |

FIG. 7

| | | |
|---|---|---|
| ⊞ Sign Zone Layout | Cafeteria<br>Location: Dallas | |
| ⊞ Content Zone | Last published: 5/19/2016 11:33 AM<br>Publisher: Melissa Snow | Edit Zone |
| ⊞ Scheduled Video Zone | Last published: 9/25/2015 11:14 AM<br>Publisher: Melissa Snow | Edit Zone |
| ⊞ Info Zone | Last published: 4/27/2016 7:54 AM<br>Publisher: Melissa Snow | Edit Zone |
| ⊞ Weather Zone | Last published: 5/18/2016 10:35 AM<br>Publisher: Melissa Snow | Edit Zone |
| ⊞ Marquee Zone | Last published: 4/19/2016 11:23 AM<br>Publisher: Melissa Snow | Edit Zone |
| ⊞ Severe Weather Zone | Last published: 4/13/2016 4:29 AM<br>Publisher: Melissa Snow | Edit Zone |
| Locale | | |
| Orange County, FL | | |
| ⊞ Traffic | Last published: 5/11/2016 6:54 AM<br>Publisher: Melissa Snow | Edit Zone |
| ⊞ Enhanced Content | Last published: 5/11/2016 7:51 AM<br>Publisher: Melissa Snow | Edit Zone |

FIG. 8

| | | |
|---|---|---|
| ➕ Sign Zone Layout | Cafeteria<br>Location: Dallas | |
| ➕ Content Zone | Last published: 5/19/2016 11:33 AM<br>Publisher: Melissa Snow | Edit Zone |
| ➕ Scheduled Video Zone | Last published: 9/25/2015 11:14 AM<br>Publisher: Melissa Snow | Edit Zone |
| ➕ Info Zone | Last published: 4/27/2016 7:54 AM<br>Publisher: Melissa Snow | Edit Zone |
| ➕ Weather Zone | Last published: 5/18/2016 10:35 AM<br>Publisher: Melissa Snow | Edit Zone |
| ➕ Marquee Zone | Last published: 4/19/2016 11:23 AM<br>Publisher: Melissa Snow | Edit Zone |
| ➕ Severe Weather Zone | Last published: 4/13/2016 4:29 AM<br>Publisher: Melissa Snow | Edit Zone |
| ➕ Traffic | Last published: 5/11/2016 6:54 AM<br>Publisher: Melissa Snow | Edit Zone |

| Location | Days | Times to display |
|---|---|---|
| Atlanta, GA | Mon, Tue, Wed, Thu, Fri | 6:00 AM - 7:17 PM |

Changed content has not been published.

| | | |
|---|---|---|
| ➕ Enhanced Content | Last published: 5/11/2016 7:51 AM<br>Publisher: Melissa Snow | Edit Zone |

FIG. 9

| | | |
|---|---|---|
| ⊕ Sign Zone Layout | Cafeteria<br>Location: Dallas | |
| ⊕ Content Zone | Last published: 5/19/2016 11:33 AM<br>Publisher: Melissa Snow | Edit Zone |
| ⊕ Scheduled Video Zone | Last published: 9/25/2015 11:14 AM<br>Publisher: Melissa Snow | Edit Zone |
| ⊕ Info Zone | Last published: 4/27/2016 7:54 AM<br>Publisher: Melissa Snow | Edit Zone |
| ⊕ Weather Zone | Last published: 5/18/2016 10:35 AM<br>Publisher: Melissa Snow | Edit Zone |
| ⊕ Marquee Zone | Last published: 4/19/2016 11:23 AM<br>Publisher: Melissa Snow | Edit Zone |
| ⊕ Severe Weather Zone | Last published: 4/13/2016 4:29 AM<br>Publisher: Melissa Snow | Edit Zone |
| ⊕ Traffic | Last published: 5/11/2016 6:54 AM<br>Publisher: Melissa Snow | Edit Zone |
| ⊕ Enhanced Content | Last published: 5/11/2016 7:51 AM<br>Publisher: Melissa Snow | Edit Zone |
| Days | Times to display | |
| Mon, Tue, Wed, Thu, Fri | 1:00 AM - 7:00 PM | |

FIG. 10

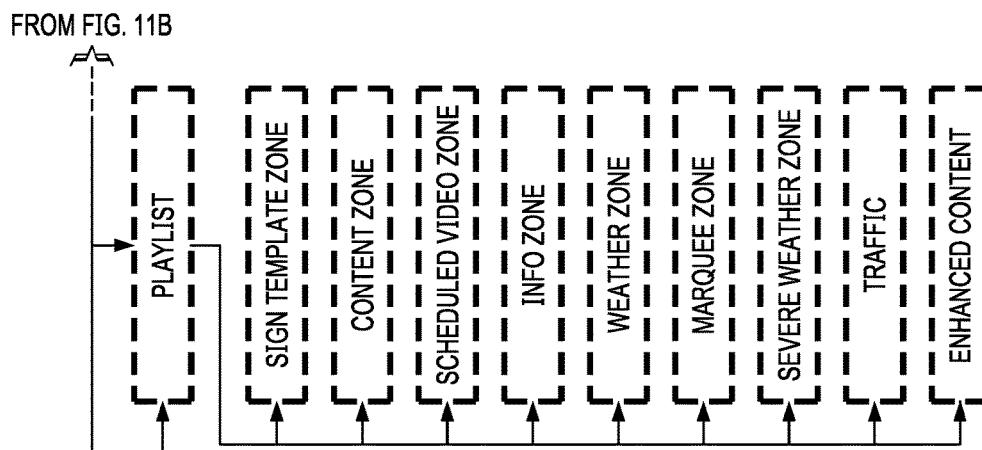
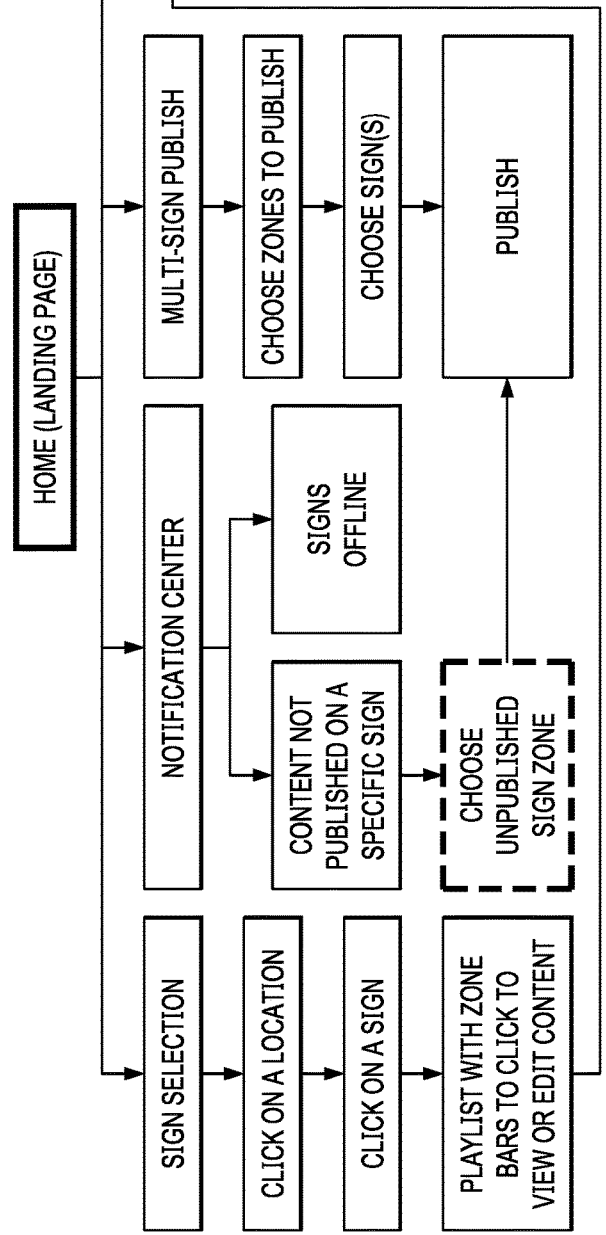
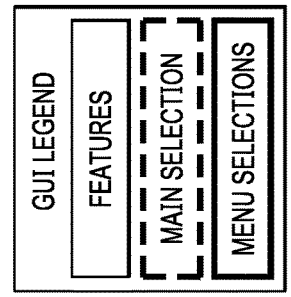
FIG. 11A

| FIG. 13A | FIG. 13B |

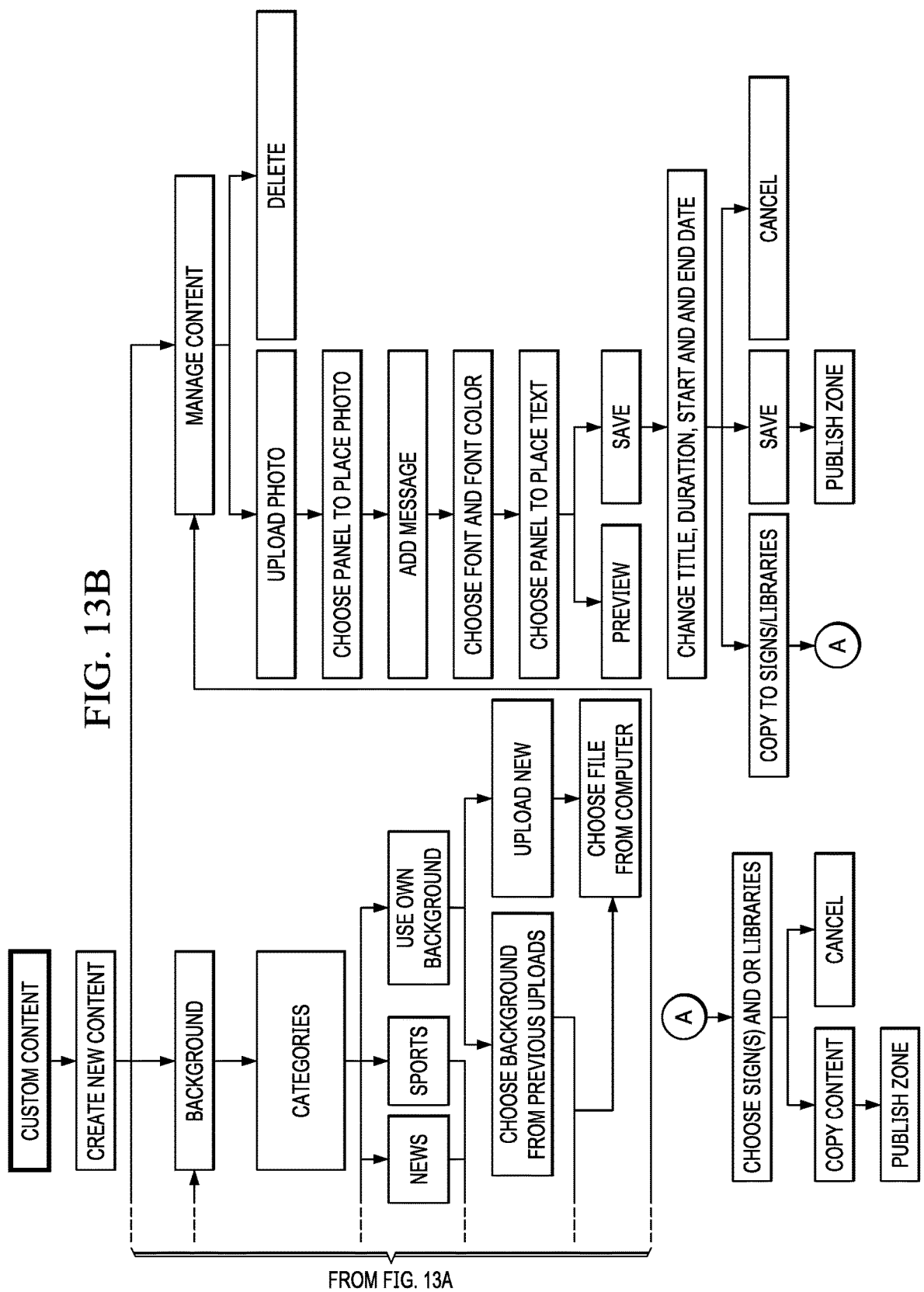

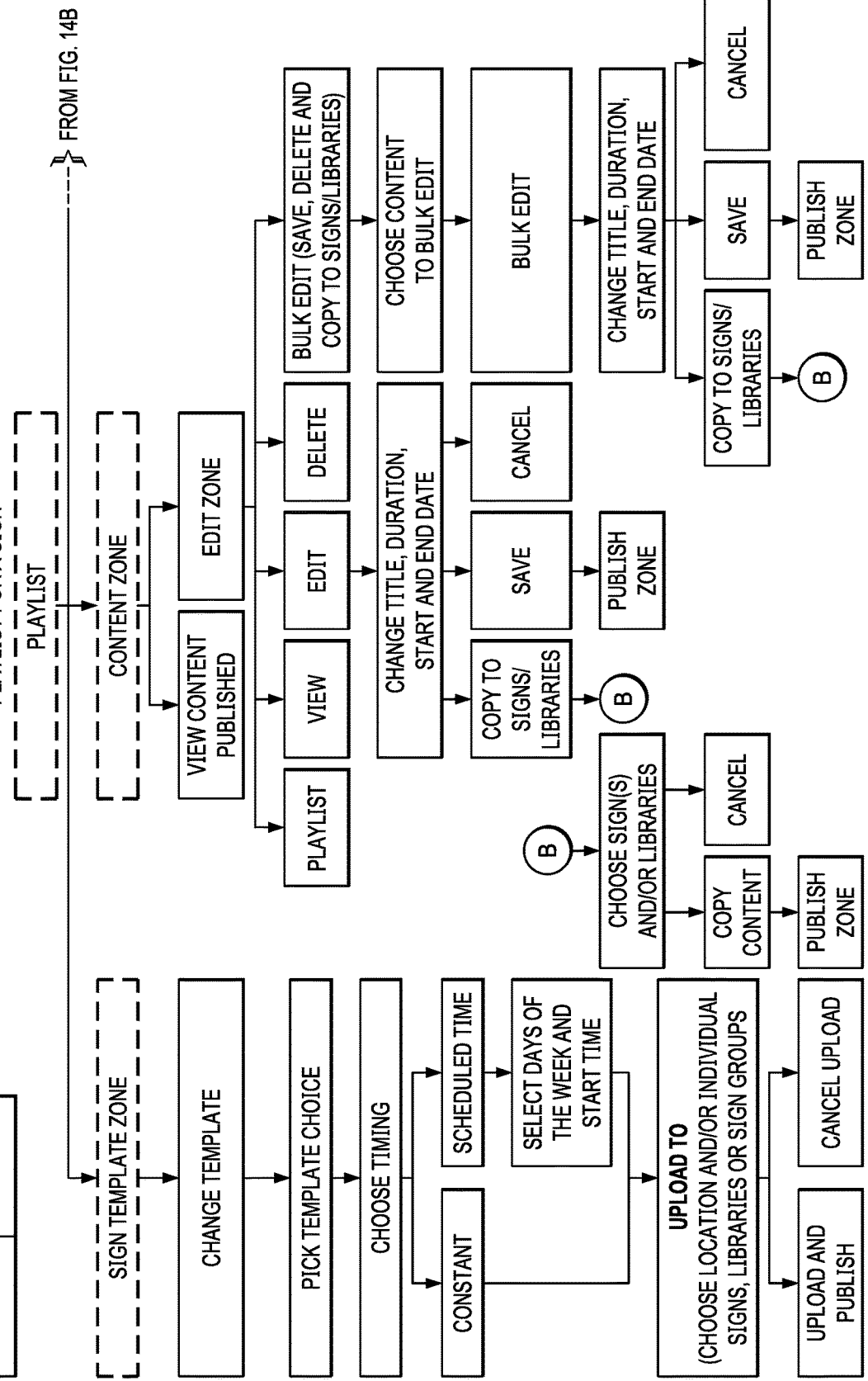

FIG. 16
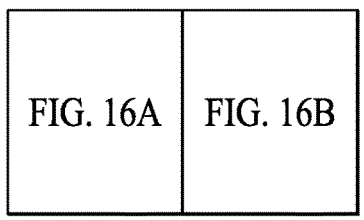
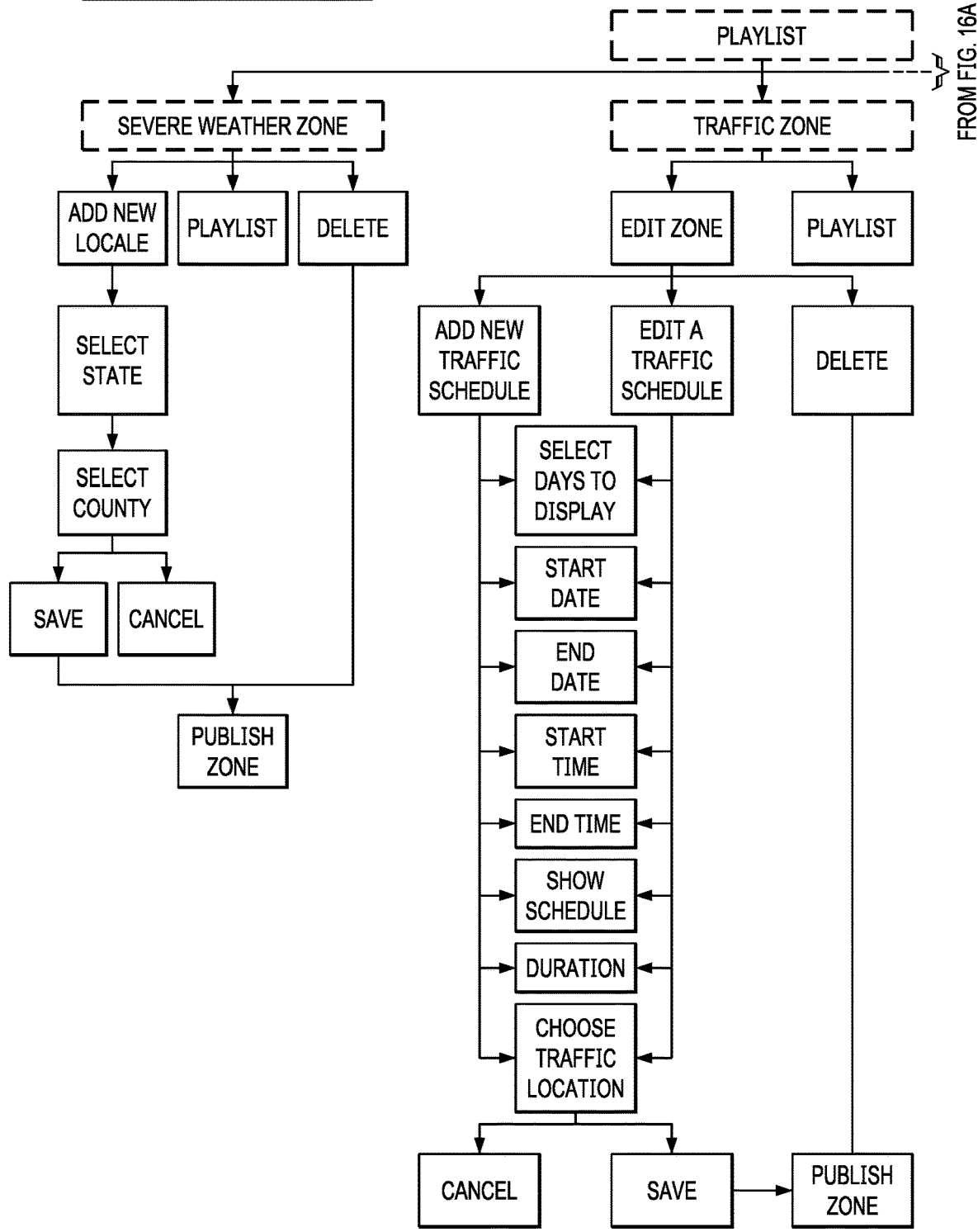
FIG. 16A

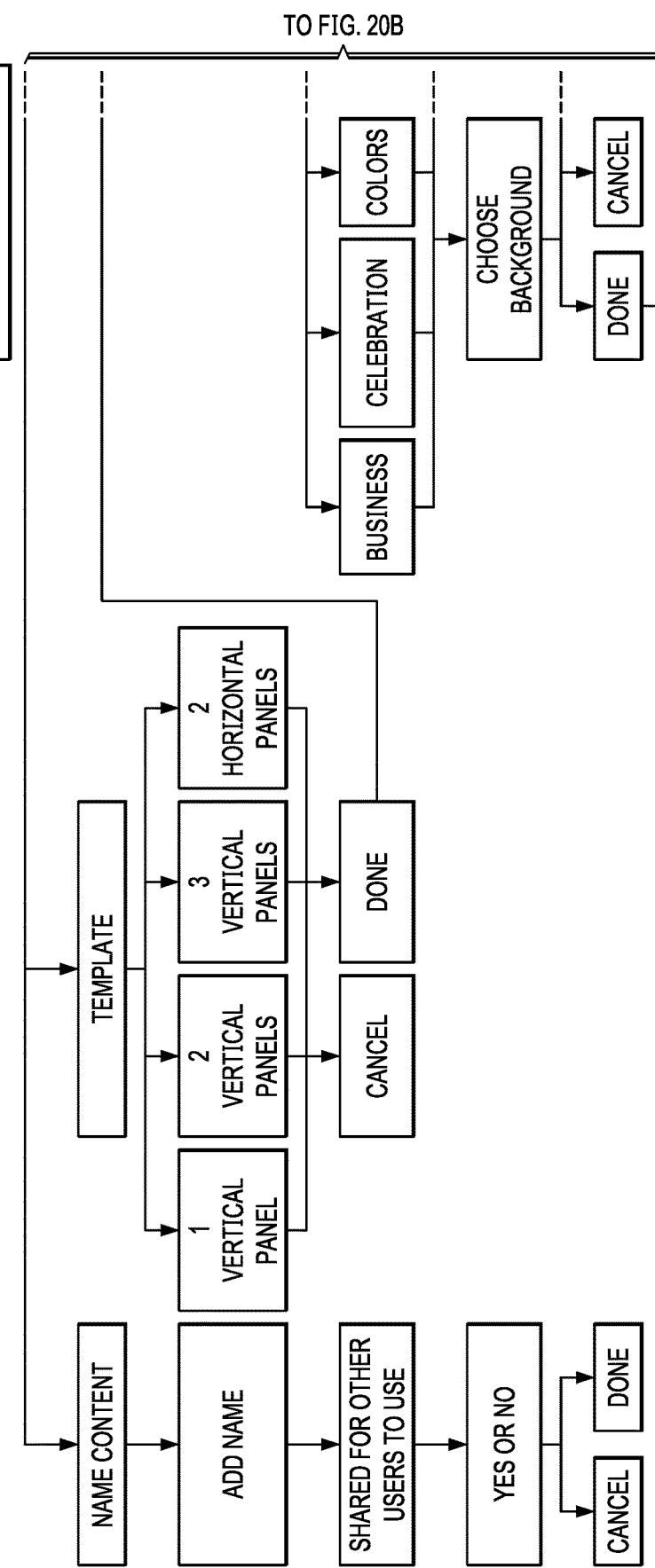
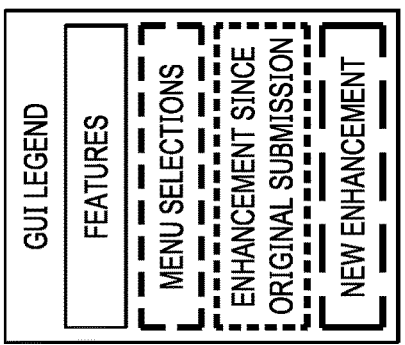
FIG. 20A

DIGITAL SIGNAGE AND DIGITAL SIGNAGE CONTENT MANAGER

CROSS-REFERENCE TO RELATED APPLICATION

This application is a continuation of U.S. patent application Ser. No. 15/615,674 filed on Jun. 6, 2017, which claims the benefit of U.S. Provisional Patent Application No. 62/346,435 filed on Jun. 6, 2016, both of which are hereby incorporated by reference for all purposes.

TECHNICAL FIELD

The present invention relates to a digital signage content manager.

BACKGROUND

Companies often use large displays (e.g., LED displays) as digital signs in elevators, break rooms, reception areas, hallways, and/or conference rooms to provide information to personnel and visitors. Videos are streamed from a source to the displays, which play the same streaming video feed. However, blanketing all sites in a company with the same video stream may waste bandwidth and limit the potential of digital signage by transmitting the same feed to all sites regardless of content and/or location. In addition, viewers may tune out and viewer satisfaction may be decreased when signage is considered not relevant to them (e.g., weather forecasts in other locations, etc.).

SUMMARY

In various implementations, a signage management system may manage digital sign content. The signage management system may include a signage manager that facilitates management of displays (e.g., the digital signs). The signage manager may be communicably coupled to a signage device, which transmits playlists (e.g., order, frequency, duration, media source, media items to be presented) to a display. The signage manger may allow customization of playlists. The media items associated with the playlists and presented on display(s) may be stored on a memory of the signal device and/or streamed media from another source.

In various implementations, a system may manage presentation of media. The system may include a signage device. The system may include a display and/or a signage manager. The signage device may be associated with a display. The signage device may include a memory and a processor (e.g., capable of executing modules to perform operations). The memory may store a playlist associated with the signage device and may be associated with the display. The playlist may be received from a signage manager remote to the signage device. The playlist may include a listing of media item(s) to be presented in one or more zones of the associated display (e.g., for a duration of time). The memory may store one or more media items in the playlist and/or a module. The module may be operable (e.g., by execution by the processor) to transmit a signal to the signage manager at an interval, and obtain updates from the signage manager to at least one of the playlist or one or more of the media items in response to transmission of the signal to the signage manager. The module may transmit a feed to the associate display that includes media item(s) (e.g., stored in the memory and/or streamed) based on the playlist. The processor of the signage device execute the module stored in the memory to perform the operations of the module.

Implementations may include one or more of the following features. Media item(s) may include media streamed from an external source. The signage device may allow the media to be streamed from the external source to the associated display according to the playlist. The module may be further operable to split the feed to the associated display to at least one other display such that the associated display and the at least one other display present the same media concurrently. The module may be inhibited from receiving alterations to the playlist from the signage device. The associated display is not capable of communicating with the signage device. An Internet outage may not substantially affect playback of media based on the playlist by the signage device, in some implementations. The module may be capable of interrupting the transmitted feed to play one or more new media items in response to a transmission from the signage manager (e.g., one or more new media items may not in the playlist). For example, emergency messages (e.g., weather, security alerts, workplace emergencies, etc.), meeting information (e.g., broadcasts of messages, handouts, etc.) may interrupt currently playlists.

In various implementations, the presentation on a plurality of signage devices may be controlled. A plurality of playlists for a plurality of signage devices may be managed. Each playlist may be associated with one of the signage devices, and each of the signage devices may be associated with a display. A signage device may transmit media to the display based on associated playlist and/or may transmit a signal to the signage manager at an interval. The signage manager may be allowed to independently manage each of the playlists in the plurality of playlists such that the media presented on each of the displays is independently controllable. The media presented on each display may be customized to, for example, keep users engaged (e.g., by providing new, interesting, and/or more relevant information). The signal may be received by the signage manager from one of the plurality of signage devices. A determination may be made whether one of the playlists associated with the signage device that transmitted the signal has been updated. If a determination is made that a playlist has been updated, the signage manager may transmit, to the signage device that transmitted the signal, the updated playlist. The signage device may play media based on the updated playlist after receipt of the updated playlist. Transmission of the updated playlist to the signage device that transmitted the signal may not alter the playlists of other signage devices of the plurality of signage devices. Media item(s) that are in the updated playlist and not previously transmitted to the signage device may be identified (e.g., since the signage device may need a copy of a media item and/or streaming information for media items that are not in the current and/or a previous playlist). The media item(s) that are in the playlist and not previously transmitted to the signage device may be transmitted to the signage device (e.g., by the signage manager and/or by a streaming service). The signage manager may be inhibited from communicating with the displays.

Implementations may include one or more of the following features. The feed from the signage device to a display may be split to at least one other display such that the display and the at least one other display present the same media concurrently. An update to one or more of the playlists may be received, and the updated playlist(s) may be pushed (e.g., transmitted) to one or more of the signage devices associated with the one or more playlists. A health of one of the signage device may be determined based on the signal received or not received from the signage device. A notification may be transmitted to one or more users based on the determined health of the signage device. A playlist may allow one or more media items to be presented sequentially in one or more zones presented on the display associated with one of the signage managers. Media items may include any appropriate stored (e.g., in a local and/or remote memory) and/or streamed. For example, media items may include media item stored in a memory of the signage device, streaming TV feed, streaming movie feed, media related to weather, media related to traffic, alerts, media related to a meeting, a handout, information sheet, media related to business operations, and/or media related to site specific information. In some implementations, at least a portion of the playlist and/or an alternative playlist (e.g., an offline playlist) may include one or more stored media items such that if connection to streaming media is lost (e.g., internet outage), the display may present the playlist, alternative playlist, and/or portions thereof. Transmission of one or more of the playlists to a signage device may be restricted during a quiet period of the signage device (e.g., a quiet period may be associated with a display or set of displays such as displays at a location or associated with a division of an entity). Media item(s) for immediate play and an identification of a subset of the signage devices and/or associated displays may be received (e.g., from user). The subset of the playlists may be associated with the subset of the signage devices. The new media item(s) may be transmitted to the identified subset of signage devices such that the new media items may interrupt the subset of playlists being presented by the subset of signage devices on associated displays. The new media items may not be in the subset of playlists. User interfaces may be generated to allow customization of one or more playlists and/or one or more media items. Transmission of each of the playlists to a signage manager other than the associated signage manager may be inhibited.

In various implementations, presentation of media on a plurality of signage devices may be controlled. A plurality of playlists may be transmitted from a signage manager to a plurality of signage devices. A playlist may be associated with a signage device, and a signage device may be associated with a display. A signage manager may be inhibited from communicating with the displays. Each playlist may be associated with one of the signage devices, and each of the signage devices may transmit media to a single display according to an associated playlist. The signage manager may allow independent management of each of the playlists in the playlists such that the media presented on each of the displays is independently controllable.

Implementations may include one or more of the following features. One or more geographical regions to associate with a set of the plurality of signage devices may be received. Each signage device in the set of signage devices may be associated with one or more of the geographical regions. A severe weather alert may be associated with a geographical region. A severe weather alert may be transmitted to one or more signage devices in the set of signage devices that are associated with the geographical region associated with the severe weather alert. The severe weather alert may interrupt at least a portion of the playlist in at least one of the zones (e.g., presented on the display). A selection of one or more zones on one of the displays may be received from a user and/or one or more topics for display on one or more of the selected zones on the display may be obtained. Media items for inclusion in one of the playlists associated with the display may be automatically identified based on one or more of the topics. In some implementations, a recommendation may be transmitted to the user based on the automatically identified one or more media items for inclusion and/or the playlist may be automatically updated to include one or more of the automatically identified one or more media items for inclusion. An identification of topic(s) to add to one of the playlists from a user may be received, and one or more media items may be identified based on the identified topic(s). One or more of the identified media items may be automatically included in the playlist for a first period of time.

The details of one or more implementations are set forth in the accompanying drawings and the description below. Other features, objects, and advantages of the implementations will be apparent from the description and drawings.

BRIEF DESCRIPTION OF THE DRAWINGS

For a more complete understanding of this disclosure and its features, reference is now made to the following description, taken in conjunction with the accompanying drawings, in which:

FIG. 1D illustrates an implementation of a graphical user interface generated by the signage manager.

FIG. 2 illustrates an implementation of a graphical user interface generated by the signage manager.

FIG. 3 illustrates an implementation of a graphical user interface generated by the signage manager.

FIG. 4 illustrates an implementation of a graphical user interface generated by the signage manager.

FIG. 5 illustrates an implementation of a graphical user interface generated by the signage manager.

FIG. 6 illustrates an implementation of a graphical user interface generated by the signage manager.

FIG. 7 illustrates an implementation of a graphical user interface generated by the signage manager.

FIG. 8 illustrates an implementation of a graphical user interface generated by the signage manager.

FIG. 9 illustrates an implementation of a graphical user interface generated by the signage manager.

FIG. 10 illustrates an implementation of a graphical user interface generated by the signage manager.

FIG. 11 illustrates an implementation of an example website wireframe of an example graphical user interface generated by the signage manager.

FIGS. 11A and 11B collectively illustrate the example website wireframe illustrated in FIG. 11.

FIG. 13 illustrates an implementation of an example website wireframe of an example graphical user interface generated by the signage manager.

FIGS. 13A and 13B collectively illustrate the example website wireframe illustrated in FIG. 13.

FIG. 14 illustrates an implementation of an example website wireframe of an example graphical user interface generated by the signage manager.

FIGS. 14A and 14B collectively illustrate the example website wireframe illustrated in FIG. 14.

FIG. 16 illustrates an implementation of an example website wireframe of an example graphical user interface generated by the signage manager.

FIGS. 16A and 16B collectively illustrate the example website wireframe illustrated in FIG. 16.

FIG. 20 illustrates an implementation of a portion of the example website wireframe of the example graphical user interface generated by the signage manager, illustrated in FIG. 17.

FIGS. 20A and 20B collectively illustrate the example website wireframe illustrated in FIG. 17.

Like reference symbols in the various drawings indicate like elements.

DETAILED DESCRIPTION

An entity (e.g., enterprise, collection of individuals, franchises, etc.) may have a plurality of displays that act as digital signage to present information, such as but not limited to various forms of media (e.g., images, text, sounds, videos, etc.). Entities are often grouped in subsets, for example, based on divisions, regions, sub-regions, sites, etc. Thus, since digital signage is used to convey information to individual(s), information may be more conveniently and/or more accurately conveyed when a company is allowed to customize the messages sent to each display such as when using the digital signage system. In addition, the ability to develop playlists for distribution globally and/or to sets within the entity (e.g., subset based on region, division, site, etc.) may allow uniform messaging as needed (e.g., for global meetings, for distribution of information relevant to all groups in an entity, etc.) by an entity. Thus, a digital signage system may be utilized to transmit information customized based on the subset to which the signage device and/or display is associated.

In various implementations, a digital signage system may include a signage manager that is capable of communicating with more than one signage device. A signage device may be associated with a display. A display may be a presentation device. The display may not be not capable of communicating with the signage manager (e.g., to reduce costs, to inhibit hacking, etc.), in some implementations. Thus, a display may present a feed (e.g., a signal that includes media items) transmitted from the signage device (e.g., without substantially altering the feed).

Figure 1A:
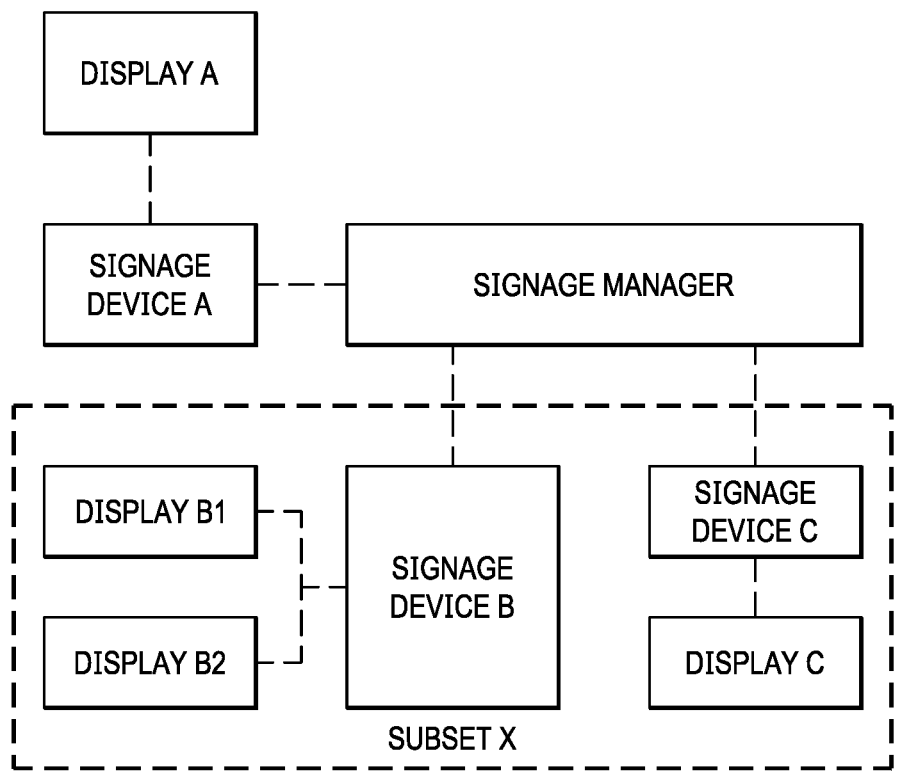
FIG. 1A illustrates an implementation of an example signage system.

FIG. 1A illustrates an implementation of an example digital signage system. The digital signage system may be utilized to manage digital signs (e.g., displays that present media) for one or more entities. A signage manager may be communicably coupled to more than one signage device. The digital signage system may include a signage manager that communicates with a plurality of signage devices in one or more geographical locations. A signage manager may be a web server, in some implementations. The signage manager may communicate with other components of the system via a network (e.g., the Internet). For example, the signage manager may communicate with streaming media services, repositories of media items (e.g., libraries), etc. The signage manager may include a module(s) to manage presentation of media item on digital signs. The module may be stored on a memory of the signage manager and executed by a processor of the signage manager to manage displays, signage devices, playlists, streaming videos, libraries, and/or other components as appropriate; allow customization of playlists for one or more signage devices; transmit playlists or portions thereof; allow independent control of displays via associated signage devices; monitor signage devices and/or displays (e.g., health, content, etc.); allow creation of media; suggest media for inclusion in playlists; automatically populate at least portion of a playlist, and/or any other appropriate operation.

As illustrated, the signage manager is coupled to more than one signage device, such as signage device A, signage device B, and signage device C. The signage device may be a computer (e.g., unit with a processor and a memory, set-top box, and/or any other appropriate programmable logic device). The signage device may include a memory. Media, playlists, modules (e.g., to play media, to communication with display(s) and/or signage manager, etc.) and/or other appropriate information may be stored on the signage device. A module of the signage device may be operable to allow communications with the signage manager (e.g., via a network such as the internet), to receive and/or retrieve a playlist (e.g., one or more of the media items, order of playing, duration of presentation, frequency of presentation, etc.), to transmit a signal at an interval, etc. For example, a playlist may include a sequence of media items to be presented (e.g., concurrently and/or sequentially). The signage device may store the playlist and one or more of the received the media items associated with the playlist on a memory of the signage device. The signage device may present media according to a playlist by identifying media item(s) to play, retrieving the media item from a memory of the signage device, and transmitting a feed that includes the media item to the display. The signage device may identify and retrieve media item(s) based on the playlist to create a continuous feed to transmit to the display (e.g., so that the signage device plays (e.g., during set time periods and/or always on). In some implementations, the signage device may be capable of receiving a streaming (e.g., live and/or prerecorded) media feed and transmitting the streaming media item(s) to display(s) (e.g., to be presentation on the display). For example, rather than or in addition to retrieving media items from a memory of the storage device, the storage device may retrieve streaming media items from a source and all the media streaming feed to be transmitted to the display.

The signage device may transmit a signal (e.g., feed) that includes media items to be presented according to a playlist to a display. Each signage device may be coupled to at least one display device. The display device may be any appropriate presentation device, such as, but not limited to, an LED screen or free-standing kiosk. The display device may present media transmitted from a signage device.

In some implementations, the signal from the signage device to the display may be split to allow transmission to more than one display. For example, the signal (e.g., with media to be presented) from the signage device B may be split between Display B1 and Display B2. Thus, the same media may be presented concurrently on both displays. The signage device may be inhibited from transmitting different playlists to different displays, in some implementations. Inhibiting transmission of different playlists to different displays by the signage device may reduce memory and/or processor size required for signage device, which may decrease costs associated with deployment and/or increase user satisfaction (e.g., aesthetics of a small device may increase satisfaction).

As illustrated, a signage manager may be communicably coupled with a plurality of signage devices. A user may access the signage manager (e.g., directly and/or indirectly via a computer coupled to a network, such as the Internet, that allows access to the signage manager). In some implementations, the signage system may operate at least partially using cloud computing and/or other distributed networks. For example, one or more modules of the signage manager may be stored in an remote on a cloud computing network and/or performed by processor(s) of the cloud computing network. The signage manager may generate one or more graphical user interfaces to facilitate management of playlists and/or creation of media items. The graphical user interface(s) may be accessible via the Internet, in some implementations.

In some implementations, the signage manager may be inhibited from communicating with displays directly. For example, utilizing a signage device to communicate with the signage manager rather than a display (e.g., without a programmable logic device) may allow greater customization of media presented on displays in an entity and/or allow greater customization in the management of data transfer, (e.g., when compared with a system that directly links the signage manager to a set of displays that display the same playlist).

In various implementations, the signage manager may be utilized to generate and/or alter a playlist for distribution to displays via signage devices. A user may access the signage manager (e.g., via a website and/or via a module on the user computer). The signage manger may allow creation and/or alteration of playlists to be presented as digital signs on displays of an entity. For example, to create a playlist a user may select one or more media items and/or features (e.g., presentation duration, frequency, start and/or end date, portion of template in which to display, etc.) associated with the media item.

In some implementations, a display may present more than one media item concurrently (e.g., based on the playlist associated with the display). For example, each media item may be positioned in a portion of the display screen. Thus, a plurality media items may be presented on the same display concurrently. The media items on each of the frames may have similar and/or dissimilar features (e.g., duration, frequency, start and/or end time, etc.). The playlist may indicate in which portion a media item may be positioned during presentation. The signage device and/or signage manager may automatically associate a media item with a portion, in some implementations. For example, a media item may be automatically assigned to a portion based on properties of the media item (e.g., size, duration, type, play properties such as streaming or stored media, etc.).

Figure 1B:
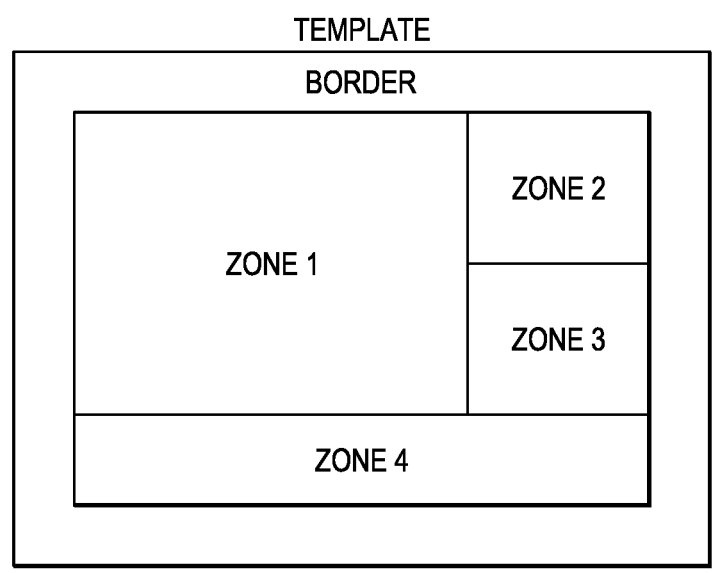
FIG. 1B illustrates an implementation of an example template.

FIG. 1B illustrates an implementation of an example presentation of more than one media item concurrently. As illustrated in FIG. 1, a template that includes one or more zones may characterize how media items are presented on a display. For example, the playlist may assign a sequential listing of media items to play in a zone of the template (e.g., each media item may play for a period of time). The template may (e.g., as illustrated) or may not include a border enclosing one or more zones. The template may include a fixed number of zones as illustrated and/or may merge and/or divide zones based on the media item being displayed (e.g., a media item may occupy more than one zone). In some implementations, the media item played in a zone and/or a border may be inhibited from being presented in the same portion of the template for longer than a predetermined burn-out time period to inhibit the media item from burning into the display. In some implementations, the signage manager may automatically switch media items to inhibit burn-out and/or may transmit a warning to one or more users (e.g., when a media item is presented and/or when the playlist is created that allows a media item to be presented for a time period greater than the predetermined burn-out time period. The template illustrated in FIG. 1B is an example template and other templates may be utilized. Any appropriate size zone, shape of zone, and/or relative position in the template may be utilized. In some implementations, template may or may not change during play of media items according to a playlist.

FIG. 2 illustrates a playlist for portion(s) or zone(s). In some implementations, a user may be able to select a set of devices and view (e.g., via a graphical user interface generated by the signage manager) the playlist associated with the set of devices. The user may alter the playlist (e.g., which media items are presented and/or features of the media items). The signage manager may generate one or more graphical user interfaces to facilitate receiving and/or requesting information from users.

In some implementations, the signage manager may receive a request from a user for access to playlists for a set of displays for an entity. The entity may be a company with a plurality of subsets such as divisions, regions, sub-regions, and/or sites. For example, the entity may be an international corporation, a public interest entity, and/or a group managing a facility such as an airport. The user may provide credentials that the server may verify prior to allowing access to playlist(s).

The signage manager may receive a request for access to a first play list associated with a first subset of the displays for the entity. The first playlists may be a portion of the playlists and/or the first subset of the displays may be a portion of the set of displays for the entity. For example, a user may request access to playlists for a region and/or may request access to a playlist associated with one signage device. The signage manager may verify that the user is allowed to have access to the first subset of playlists. If the user is not allowed access (e.g., based on user provided credentials) to the first subset of playlists, the signage manager may transmit a notification (e.g., error message) to the user and/or other users (e.g., administrator). This may allow subsets of users to at least partially alter the playlist for an associated subset of displays (e.g., one or more displays) while inhibiting alteration of other playlists. Thus, a site manager may alter a playlist to include traffic, meeting handouts, site specific information (e.g., time or date of meetings), etc. (e.g., while minimizing concern of media items going to different subsets than desired and/or while minimizing concern of losing control over corporate messaging).

The signage manager may receive one or more alterations to the first playlist. For example, media items in the playlist, order of presentation, duration of presentation, source of media item (e.g., stored on a memory of the signage device or live streaming), etc. may be altered.

A modified first playlist may be generated by the signage manager based on the one or more alterations received. For example, the media item(s) may be added to and/or deleted from the first playlist. Media item(s) in the first playlist may be reordered, in some implementations. A second playlist may be accessed and mirrored (e.g., such that the first playlist and the second playlist may be similar). The modified first playlist may be stored on a memory of the signage device. A date and/or time of the generation of the modified first playlist may be associated with the modified first playlist and/or stored in a memory of the signage device.

A request may be received by the signage manager to transmit the modified first playlist to one or more of the signage device(s) associated with the display(s) of the first subset of displays. For example, a request may be received by the signage manager to transmit the modified first playlist to each of the signage device(s) associated with each of the display(s) of the first subset of displays. In some implementations, a signage device may transmit a request to the signage manager for a modified first playlist. For example, the signage device may transmit a message to the signage manager to check for updates. The signage device may transmit a message to the signage manager that includes last update information and the signage manager may determine if the playlist associated with the signage device has been modified since the last update (e.g., by comparing the last update information with the date and/or time of generation of the last modified first playlist). In some implementations, a user may request transmission of the modified first playlist to the signage device(s). For example, if a user determines that a modified first playlist should be transmitted to associated device upon completion of the modified playlist rather than waiting for a request from a signage manager, a user may select this option. This feature may allow severe weather updates, urgent site specific information (e.g., site accidents, site explosions, lockdowns, and/or other security updates) to be pushed to displays (e.g., via the signage device) to be transmitted quickly to the displays (e.g., as opposed to waiting for a request for transmission of modified playlists or scheduled transmission times).

The modified first playlist may be transmitted from the signage device to one or more signage device(s) associated with the display(s) of the first subset of displays. For example, the signage manager may transmit the first playlist and one or more of the media items associated with the first playlist. In some implementations, the signage manager may transmit the first playlist and a copy of each of the media items in the playlist and/or source of each of the streaming media items in the playlist.

In some implementations, the signage manager may transmit media items in the modified first playlist that were not in the first playlist and be inhibited from transmitting media items in the first playlist. By inhibiting transmission of media items already stored on the signage device (e.g., since the items were on the first playlist), user satisfaction may increase when compared to transmitting the whole modified first playlist since, for example, bandwidth usage may decrease, download time may decrease, updates may take less time, and/or costs may decrease (e.g., since less data is transferred).

The described process may be implemented by various systems, such as the described signage system(s). In addition, various operations may be added, deleted, and/or modified. For example, a single display device may be associated with a single signage device. In some implementations, a signal to the single display device may be split (e.g., via a hardware splitter such as an HDMI splitter) to allow transmission to more than one display. The split single may cause a display to be mirrored on one or more additional displays (e.g., the same playlist may be presented on the display and the additional display(s). The hardware splitter may limit the number of devices among which the signal from the signage device can be split. For example, an HDMI splitter may be able to split a signal from the signage device to be sent to approximately 2 to approximately 4 displays without causing substantial loss in quality of the signal.

A playlist may be inhibited from receiving alterations from the signage device. Inhibiting alteration of the playlist by the signage device may inhibit tampering, corruption, and/or hacking of the playlist.

The playlist and/or feed transmitted to the display may include spliced media item(s). In some implementations, the signage device may retrieve (e.g., from a memory of the signage system) one or more media items and transmit one or more of the retrieved media items sequentially and/or concurrently for presentation on an associated display.

In some implementations, the playlist may include one or more media items that are stored on the signage device for presentation on the display and one or more media items that are streamed from the signage manager and/or from an external source (e.g., website, streaming service provider, etc.). When the signage device plays a playlist it may transmit a signal including one or more media items stored on the memory of the signage device to the associated display. When a media item is indicated as a streaming media item, the signage device may retrieve the streaming media item from the signage manger or external source and transmit the retrieved streaming media item to the associated display.

A signage manager may transmit the signal to the signage devices rather than directly to displays. The signage device may be coupled (e.g., via USB, via hardwire, via HDMI cable, etc.) to the display. Directly coupling the signage device to the display may produce clearer signals and/or reduce bandwidth requirements for operation.

In some implementations, the signage manager and/or the signage device may store a playlist that includes one or more stored media items. Storing at least a portion of the playlist on the signage device rather than streaming the entire playlist may facilitate implementation across entities (e.g., since bandwidth requirements may be reduced, since throttling by ISP providers may not substantially impact presentation of media on displays, etc.). In some implementations, internet outages (e.g., in countries with intermittent internet availability, due to service provider problems, due to weather, etc.) may not substantially affect playback of media based on the playlist since at least a portion may be stored on a memory of the signage device (e.g., as opposed to streaming the feed directly from the signage manager to the display). By storing at least a portion of the playlist on a memory of the signage device, bandwidth needs of the signage system may be reduced (e.g., which may decreases costs due to data transmission, increase user satisfaction since bandwidth may be more available to users, and/or increase user satisfaction since pictures may be presented more clearly).

In some implementations, the playlist may include at least one stored media item and at least one streaming media item. For example, a playlist may present stored images, video, etc. and present streaming media concurrently (e.g., in a different portion of the image presented on the display) and/or after presentation of stored media. Allowing some portions of streaming media may facilitate transmission of information in a timely manner (e.g., traffic, weather, alerts, etc.) and/or may increase enjoyment of the display (e.g., stream TV shows, movies, etc.). For example, during a predetermined time period before an event (e.g., delivery trucks leaving a facility), predetermined media streams may be presented such as, traffic, weather, etc.). The presentation of the streaming media may be facilitate business operations (e.g., deliveries).

In some implementations, the signage manager may receive a request for alteration of one or more second playlists associated with a second subset of displays. The second subset of displays may be a subset of the set of displays and may or may not be a portion of the first subset of displays. For example, the second subset may be a single display or a set of displays associated with a signage device. In some implementations, the second subset of displays may not include the displays in the first subset of displays. The second subset of displays may include one or more displays in the first subset of displays and one or more additional displays in the second subset of displays.

Thus, unlike current digital signage systems, the signage manager may allow control of playlists on individual displays and on playlists that are associated with more than one display. By allowing a high level of customization (e.g., as opposed to a system that requires changes to apply to all displays or changes to be made to each individual sign), entities may utilize the signage manager to save money, reduce overhead expenses, and/or facilitate management and/or creation of playlists and playlist content. For example, content may be managed at an enterprise level (e.g., to control and/or harmonize content, minimize costs associated with additional employees to manage, etc.). The playlist may be customized to allow predetermined media items that make a portion of a playlist to play at the same time on all displays and/or portions thereof (e.g., subset) and/or at set times (e.g., 8 PM local time). Thus, a meeting may be broadcast across an entity based on the playlist criteria (e.g., concurrently, same local time, same break, etc.). In addition, since the signage manager may be web based, the signage manager may be accessed remotely.

In some implementations, the signage manager may allow a first playlist to be provided for a subset of the displays of an entity and/or individual displays of an entity. The signage manager may allow management each display individually while still allowing a playlist to be transmitted to more than one display. This ability may provide flexibility to an entity since regions of an entity may receive customized playlists, divisions of an entity may receive customized playlists, and/or individual displays may receive customized playlists.

In some implementations, access to the ability of the signage manager to modify playlists for displays may be based on the type of user. Some users may have access each of the displays of the entity and other users may have access to a subset of displays. For example, a site manager may have the ability to modify the playlist of displays at the site but be inhibited from modifying displays at other sites. A regional manager may have the ability to modify playlists of the displays in his/her associated region and may be inhibited from modifying displays outside the associated region. Thus, subset specific (e.g., site specific) playlists may be generated by a user with an appropriate permission (e.g., to incorporate site meeting handouts, to incorporate site specific information on accidents, etc.).

In some implementations, playlists may include items such as handouts that would otherwise be distributed at meetings. Thus, rather than handing out paper information sheets or sending emails with the information sheet, that may or may not be read prior to a meeting, the information sheet(s) may be provided to the signage manager as a media item for presentation in a playlist. Distribution of information for meetings via the display may ensure receipt of information during the meeting (e.g., as opposed to distribution prior to meetings) and/or may be more cost-effective (e.g., since digital signage costs may be less expensive than paper costs for distribution of information contemporaneously with a meeting). For example, a user may create a handout using the signage manager and/or upload a handout (e.g., for storage on a memory of the signage manager). The user may then select a time period for the playback of the handout, for example during a meeting. Then the signage manager may alter the playlist to allow presentation of the media item, the handout, during the meeting time. The modified playlist may then be transmitted (e.g., based on a request from the signage device and/or user) to the signage device.

In various implementations, a signage device may be coupled to the signage manager and at least one display. The signage device may transmit media (e.g., a playlist of one or more media items) to the display to be presented on the display according to the playlist (e.g., which may identify media items for display, time for playing, runtime, etc.). In some implementations, the signage device may be associated with a playlist (e.g., assigned by the signage manager based on user instructions). The signage device may transmit a stream of media to the display (e.g., to be presented on the display) based on the playlist received from the signage manager. Alternation to the playlist by the signage device (e.g., by a user) may be inhibited. The signage device may transmit periodic signals (e.g., at regular or irregular time interval) to the signage manager, for example, to determine whether an update to a playlist associated with the signage device is available. For example, a signage device may transmit a signal to the signage manager that includes last update information (e.g., time and/or date of last update, playlist version number, etc.). The signage manager may determine if the playlist has been modified (e.g., by comparing the last update information to the modified playlist date). In some implementations, the signage device may determine if the playlist has been modified. For example, the signage device may request transmission of a modified playlist update information (e.g., time and/or date, playlist version number, etc.) and compare the received modified playlist update information (e.g., from the signage device) to the last update information for the playlist stored in the memory of the signage device. If the last update information is earlier than the modified playlist update information, a determination may be made (e.g., by the signage device) that the playlist has been modified. If a determination is made that the playlist has been modified, the modified playlist (e.g., playlist and/or media associated with the playlist) or portions thereof may be transmitted to the signage device. The modified playlist (e.g., playlist and media associated with the playlist) and/or portions thereof may be stored in a memory of the signage device.

In various implementations, the playlist and/or media may be compressed for transmission to the signage device (e.g., MP4 compression and/or other appropriate forms of compression). The signage manager may compress the playlist and/or one or more media items and transmit the playlist and/or one or more media item(s) in a compressed form (e.g., MP4 and/or other appropriate forms of compression) to the signage device. The signage device may or may not decompress the playlist and/or media item(s) prior to transmission to the display. Compressing the data may minimize bandwidth usage and/or speed transmission of updates.

In some implementations, the signage device may transmit a signal to the signage manager at an interval (e.g., regular) and the signal manager may utilize the receipt of the signal to determine a health of the signage device. For example, if a signal is transmitted from the signage device to the signage manager at a regular interval (e.g., every 10 minutes, every minute, every hour, etc.) and the interval changes (e.g., longer interval, irregular interval, etc.), then a determination may be made by the signage manager that the signage device may have a problem. In some implementations, if a signal is transmitted from the signage device to the signage manager at a regular interval and an expected signal is not received, then a determination may be made that there is a problem with the signage device. A notification may be transmitted to one or more users based on the determined health of the signage device (e.g., good health, problem, etc.).

In some implementations, the signage device may have a quiet period (e.g., established by a user at the signage device and/or via graphical user interfaces of the signage manager). The quiet period may be a period of time during which the signage device does not transmit a signal to the signage manager and/or does not receive transmissions (e.g., of playlists, streaming media, and/or media items associated with the playlist). Utilizing a quiet period may allow conservation of bandwidth during periods of high use (e.g., during time periods at the company in which invoices are transmitted, delivery shipping orders distributed, etc.). The quiet period may be repeated according to a schedule and/or scheduled as a one-time event.

In some implementations, the display presents the signal (e.g. including media items) transmitted to the display by the signage device.

In some implementations, the signage manager may allow creation of media items for presentation according to a playlist. In some implementations, a user may select a template such as a poster with more than one section (e.g., portions). A user may select media items to be presented in each section from a library stored on a memory of the signage manger, from media item(s) uploaded by the user, from streaming media services, etc. In some implementations, the signage manager may transmit a notification to the user and/or block insertion of media items that do not satisfy criteria for the section of the template. For example, if the media item does not fit in the dimensions of the section, the image may not be assigned to the section (e.g., incorporation of portrait image in a landscape section may be inhibited). By inhibiting publishing (e.g., presentation) of media items that do not satisfy criteria for the template, errors may be reduced and/or aesthetics of the generated media item may be improved (e.g., since blank bars may not appear next to images that are too small and/or since images may not be cropped). In some implementations, the signage manager may automatically assign the rejected media item to a section with criteria that the rejected media item can satisfy and/or the template may be changed to satisfy the rejected media image (e.g., a template with appropriate dimensions for a section may be selected). In some implementations, the signage manager may analyze the media item (e.g., image recognition, text recognition, embedded data, etc.) and inhibit insertion of media in the template that does not satisfy criteria associated with obscenity guidelines and/or regulations (e.g., corporate regulations may bar use of specific words and phrases and/or block media that displays specific images).

In some implementations, the playlist may allow more than one media item to be presented on a display and/or a single media item to be displayed. For example, a multimedia item may be presented for 1 minute and then a streaming video may be presented individually (e.g., as "full screen") for the duration of the streaming video.

In some implementations, the playlist may be analyzed by the signage manager for deficiencies. For example, if a blank slot (e.g., a time period between media items that is not assigned to a media item) exists, then a notification may be transmitted to the user creating the playlist and/or the playlist may fail to generate. In some implementations, if the time allotted to a still image is greater than a burnout time (e.g., a time period that if display of a fixed image is allowed may cause burnout, such as 1 minute), a notification may be transmitted to the user creating the playlist and/or the playlist may fail to generated (e.g., to inhibit damage of displays). By inhibiting generation of playlists that may harm displays, display life may be increased (e.g., when compared with systems in which burnout playlists are allowed to be accidentally or purposefully generated).

In some implementations, the signage manager may monitor modifications to playlists (e.g., frequency, user identification, etc.), playlist transmission(s), and/or the user creating modifications. Companies may utilized the monitoring to monitor compliance with company best practices (e.g., frequency of updates, etc.), to audit usage of features, and/or to identify frequency of modifications.

In some implementations, a sign manager may allow a user to select a topic (e.g., weather, tips about workplace safety, tips about entity software, current events, etc.) to add to a playlist. The signage manager may automatically select media (e.g., from a library of the signage manager and/or a library associated with the user) based on the selected topic and include the selected media in the playlist (e.g., in a zone of a template) of the playlist. In some implementations, the inclusion of the selected media in a playlist may be for a predetermined amount of time (e.g., user selected and/or default values). A user may, in some implementations, extend the predetermined amount of time that the selected media is included in the playlist (e.g., after the predetermined amount of time has lapsed). A user may terminate the inclusion of the selected media in the playlist early (e.g., not a good fit for company, to add new media, etc.). In some implementations, the signage manager may automatically reselect one or more new media items that are associated with the selected topic (e.g., after the expiration of the predetermined period of time). The ability to quickly incorporate and at least partially fill a playlist may facilitate set up and management of digital signs, may keep media presented on digital signs (e.g., displays) new and/or updated, and/or may increase user satisfaction (e.g., ease of use provided by auto selection and easy renewals of time periods).

In some implementations, a signage manager and/or a signage device may allow establishment of a quiet period. A quiet period may be a predetermined period of time (e.g., at a specified time and/or interval, recurring, nonrecurring) during which the signage device may not transmit a signal to the signage manager and/or the signage manager may not transmit playlist(s) and/or media item(s) to the signage manager. Establishing a quiet period may facilitate resource use (e.g., such that downloading content may be avoided during periods of heavy business use such as shipping windows) and/or may increase user satisfaction (e.g., since bandwidth may not be further slowed during times of heavy use). A quiet period may be established for an individual display and/or a set of displays (e.g., displays in a regions, displays associated with a specific business group, etc.). In some implementations, after the quiet period has ended, updated playlists and/or media associated with the updated playlists may be transmitted to the signage devices associated with the quiet period. For example, the signage device may resume transmitting signals (e.g., heartbeats) to the signage manager after the quiet period ended. The signage manager may determine if an updated playlist and/or media item exists for the signage device in which the quiet period has ended and transmit an updated playlist and/or media item(s) to the signage device. In some implementations, the signage device may continue to transmit a signal to the signage manager during the quiet period but the signage manager may be inhibited from transmitting playlist(s) and/or media item(s) to the signage device in a quiet period during the quiet period. The signage manager may determine if a quiet period has ended for a signage device, determine if an updated playlist and/or media item exists for this signage device, and transmit (e.g., push) an updated playlist and/or media item(s) to this signage device (e.g., if an updated playlist and/or media item exists).

Figure 1C:
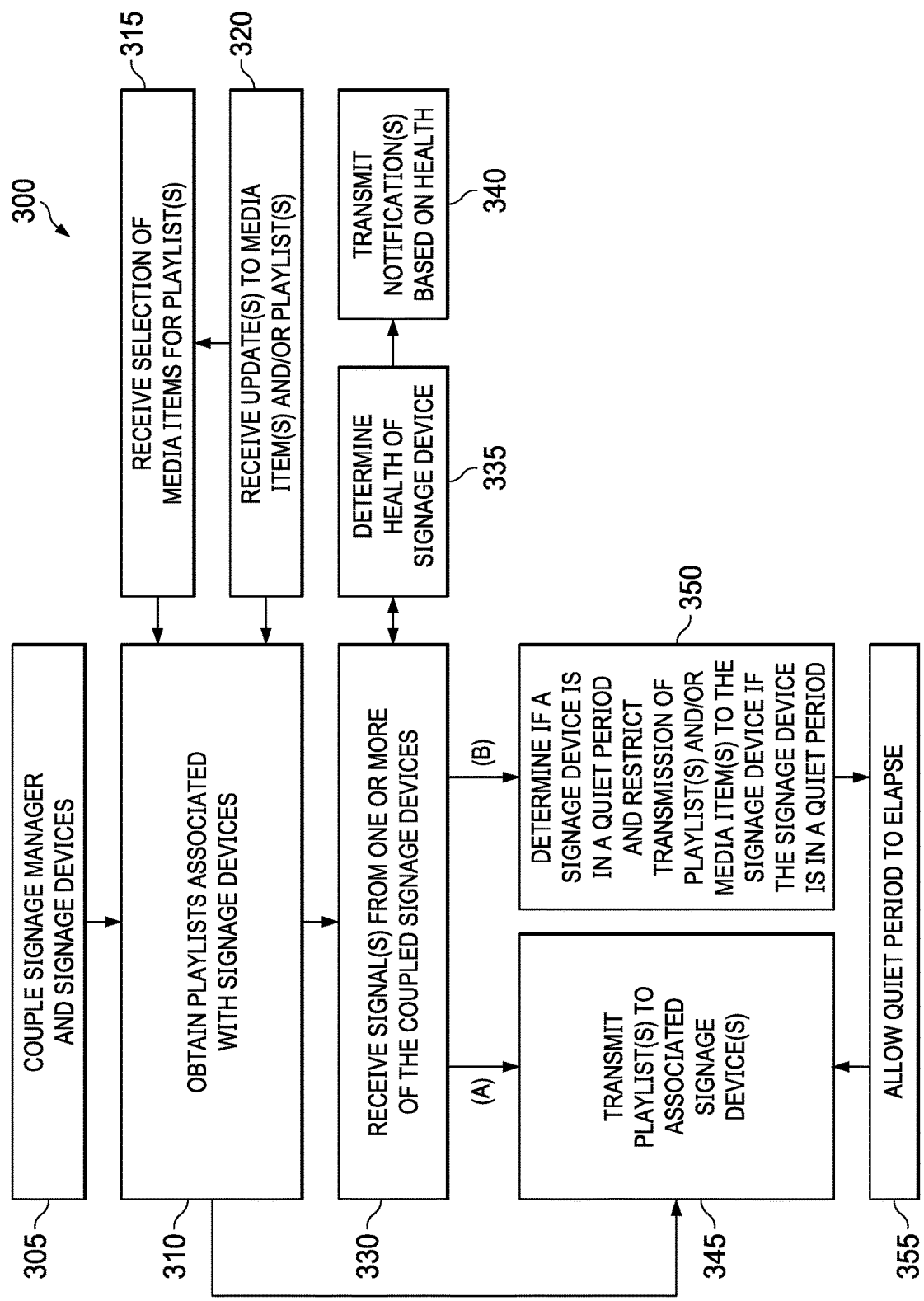
FIG. 1C illustrates an implementation of an example process executed by a system, such as the system illustrated in FIG. 1A.
Figure 11B:
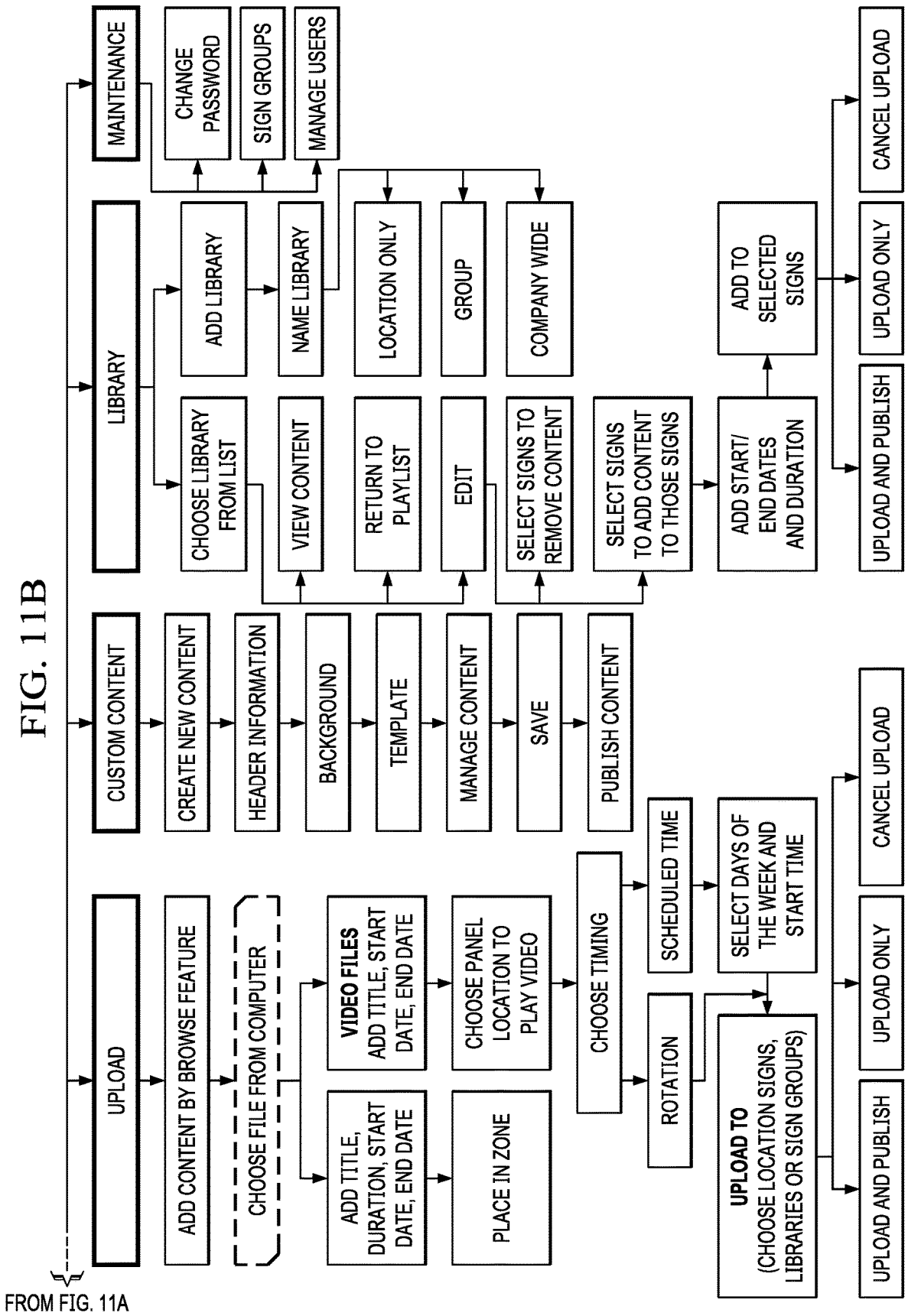
Figure 12:
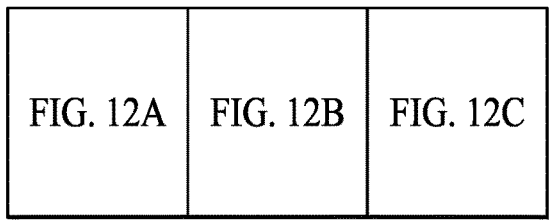
FIG. 12 illustrates an implementation of an example website wireframe of an example graphical user interface generated by the signage manager.
Figure 12A:
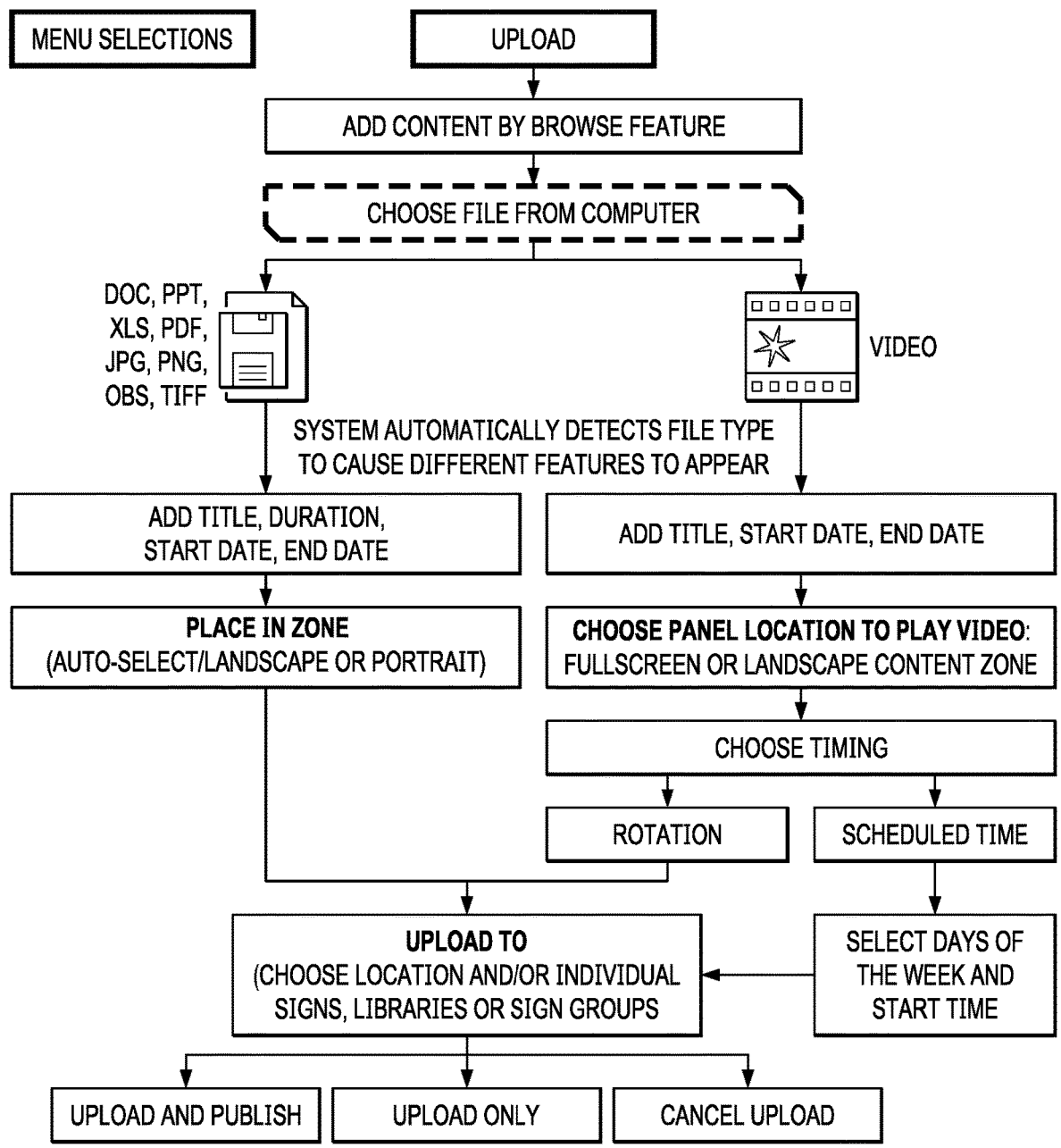
FIGS. 12A, 12B, and 12C collectively illustrate the example website wireframe illustrated in FIG. 12.
Figure 12B:
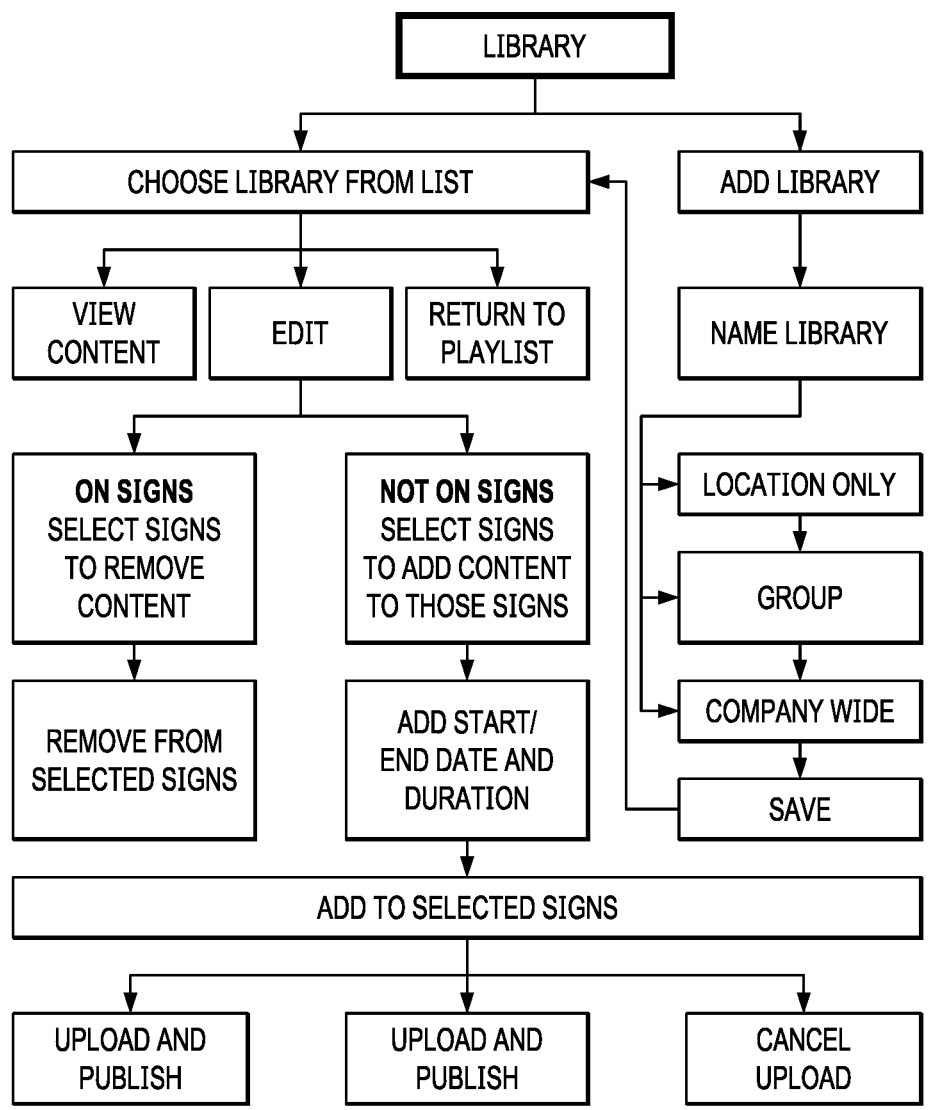
Figure 12C:
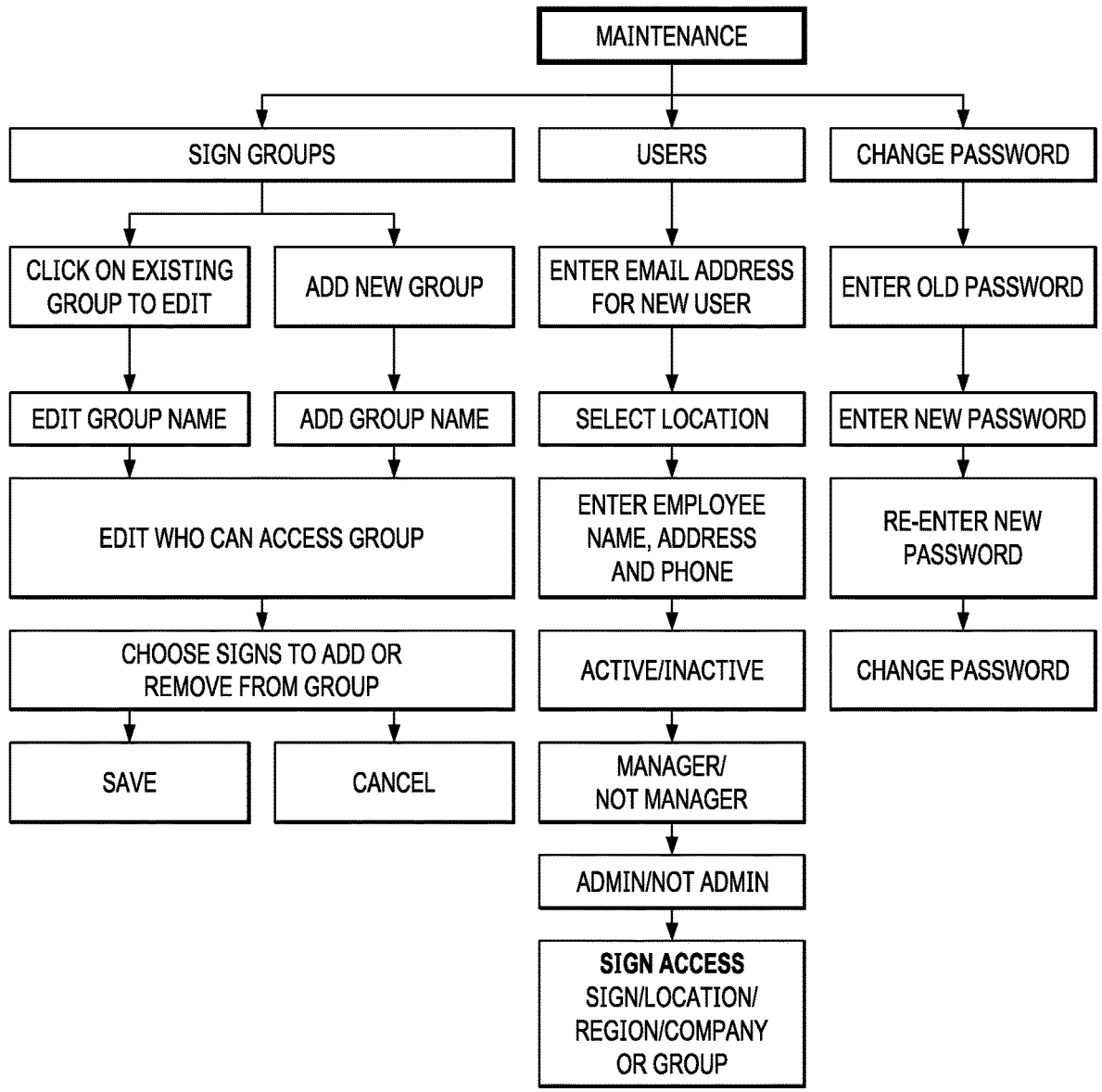
Figures 13, 13A:
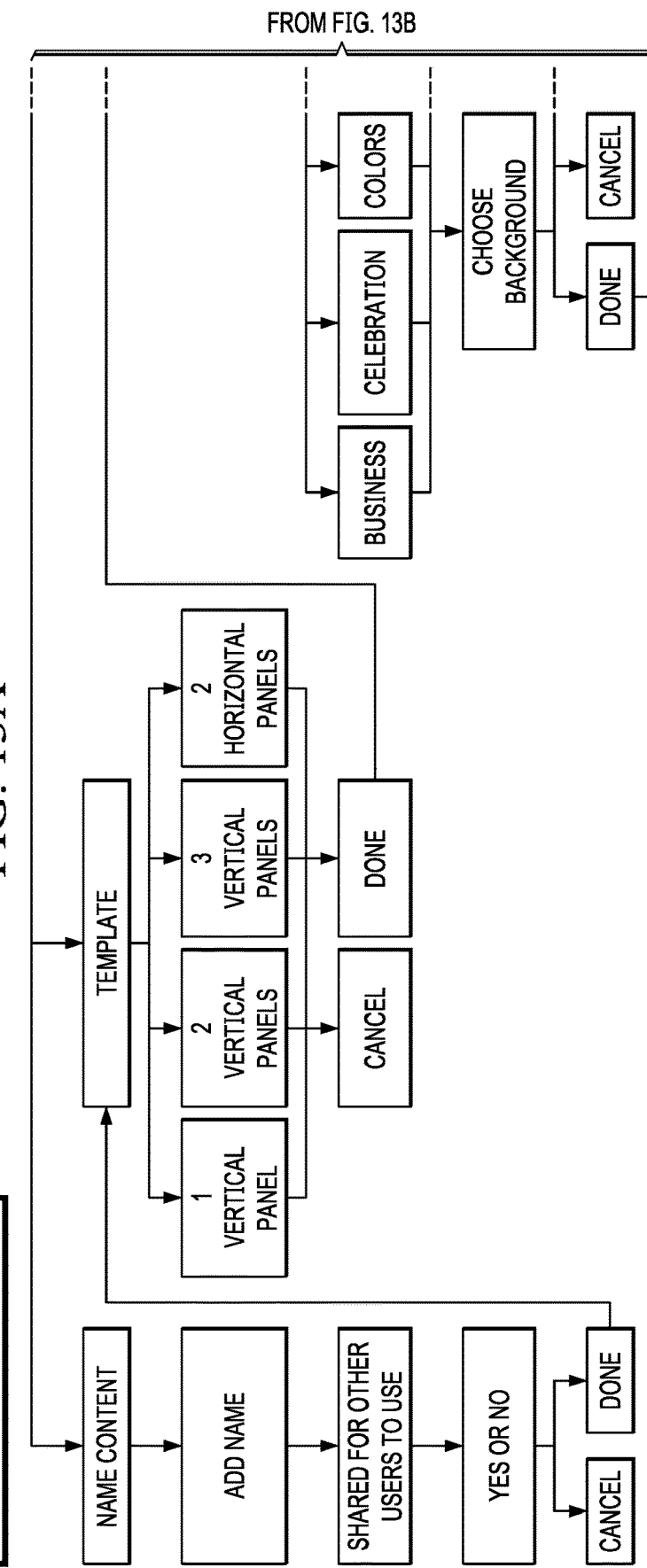
Figure 14B:
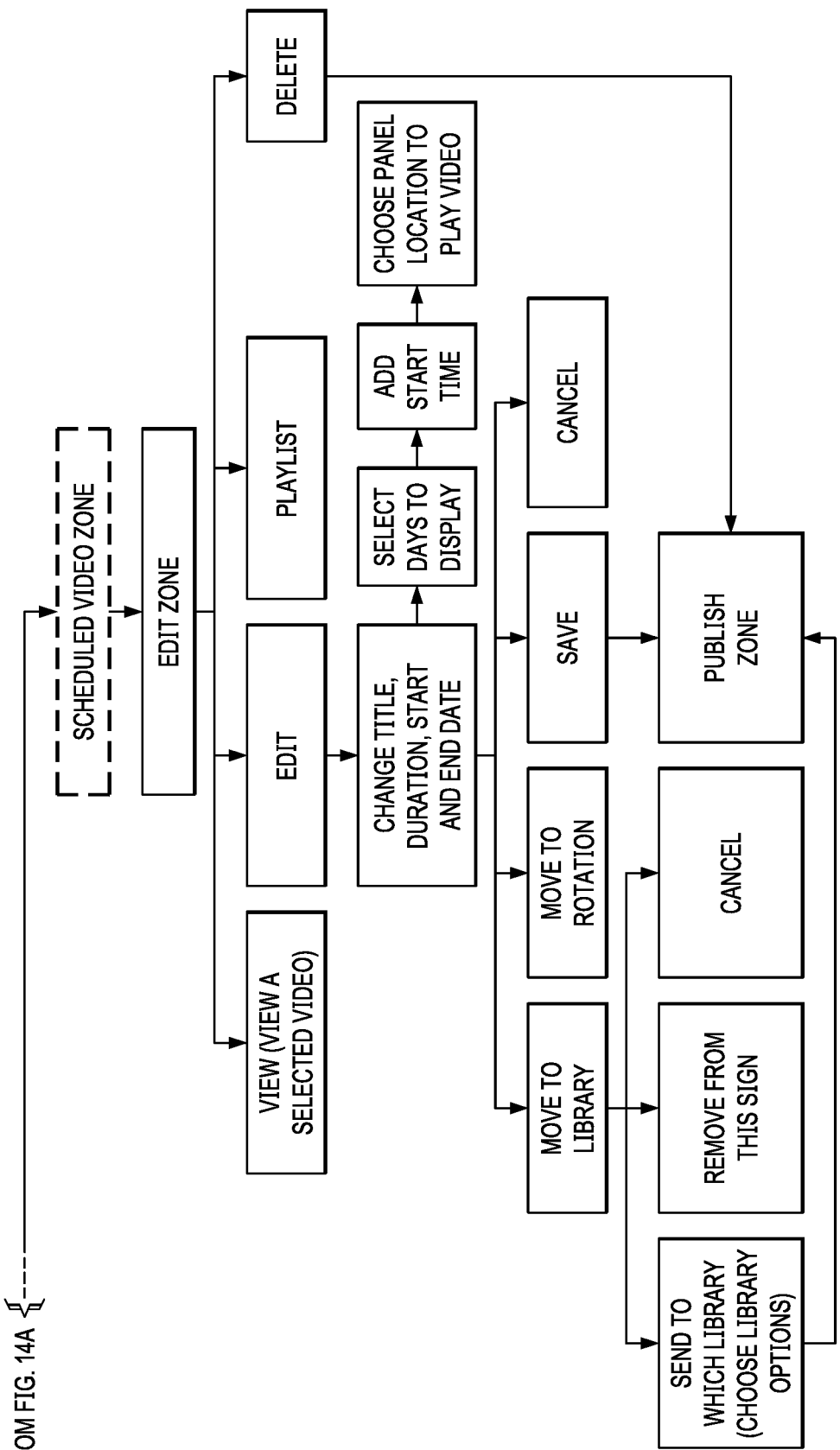
Figure 15:
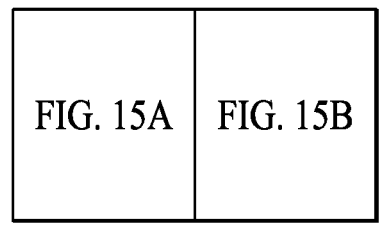
FIG. 15 illustrates an implementation of an example website wireframe of an example graphical user interface generated by the signage manager.
Figure 15A:
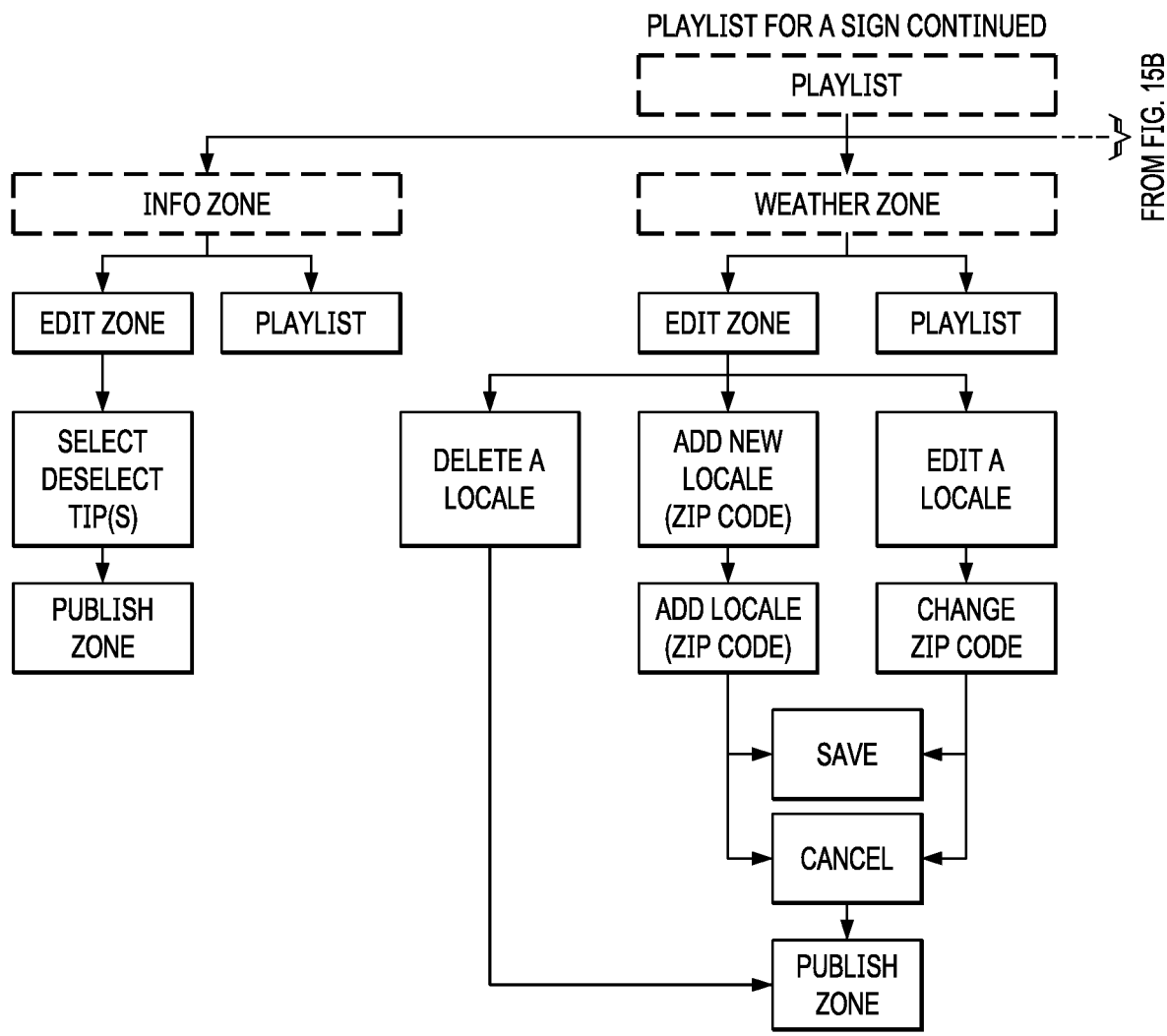
FIGS. 15A and 15B collectively illustrate the example website wireframe illustrated in FIG. 15.
Figure 15B:
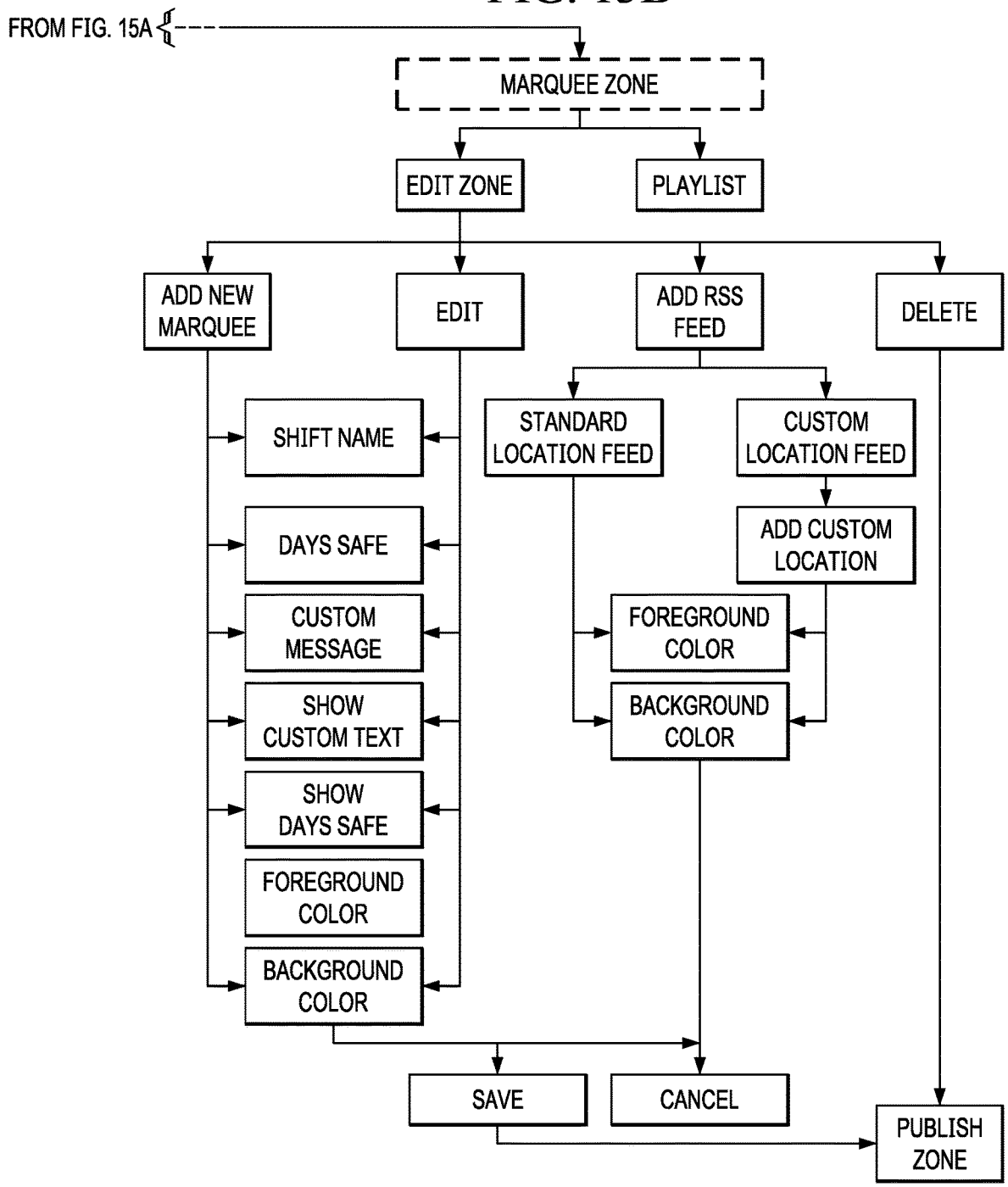
Figure 16B:
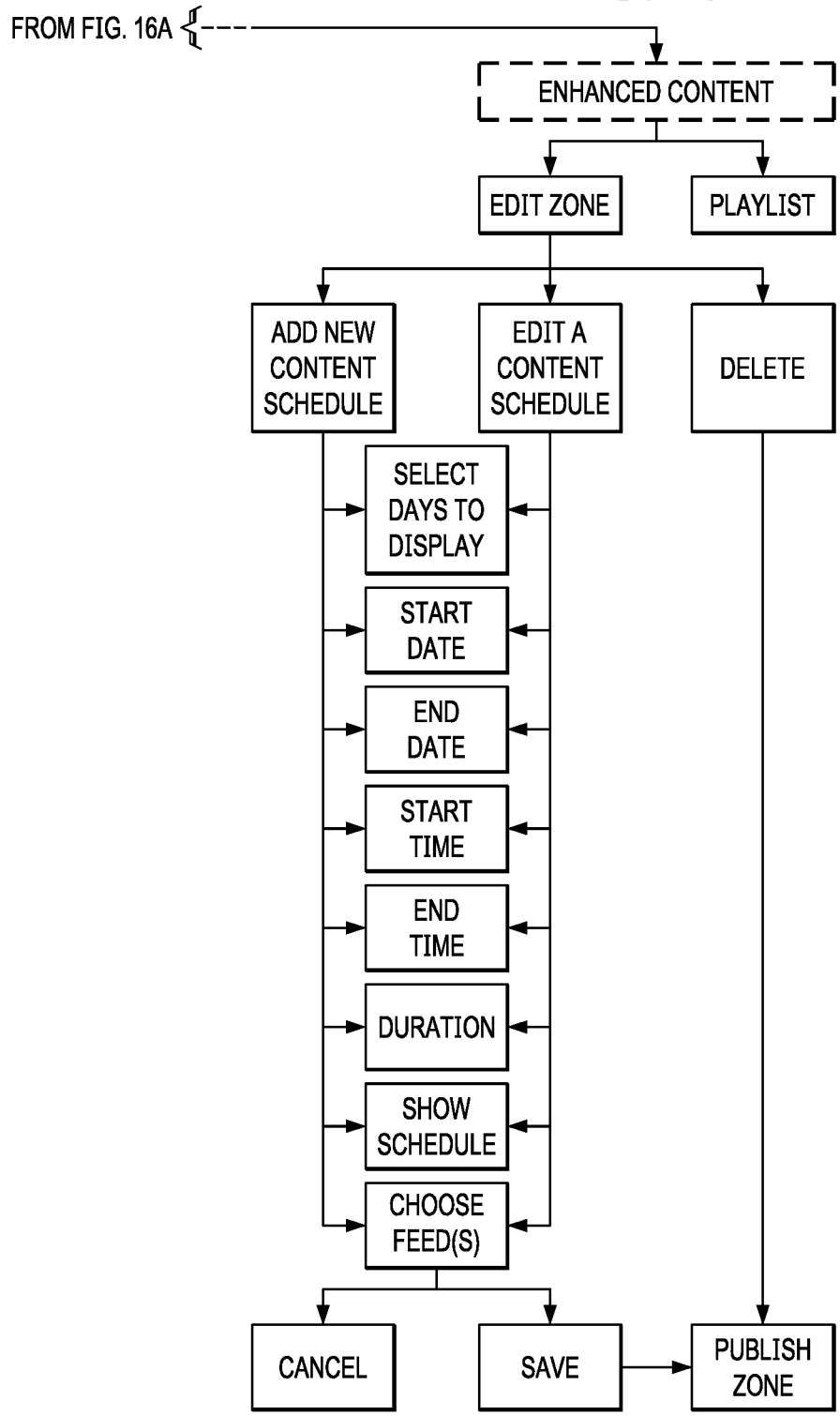

In various implementations, a process for managing playlists and/or media may be implemented by modules on the signage manager and/or signage device. The portions of the process may be performed automatically and/or manually (e.g., some portions may utilize information provided by a user). FIG. 1C illustrates an implementation of an example process 300. A signage manager may be coupled to signage devices (operation 305). For example, a signage manager may be capable of managing a plurality of signage devices for one or more entities. A signage device may be associated with a display (e.g., a 1:1 relationship). Establishing a 1:1 relationship may decrease costs (e.g., since a signage device may not need to be powerful enough to manage multiple displays), ease installation (e.g., since a wired connection can be established between two devices often without large scale wireway work in a building), and/or may improve aesthetics. Establishing a 1:1 relationship may increase security by inhibit tampering since signage devices may be inhibited from transmitting feeds to displays other than associated display(s) and/or may be inhibited from communicating with other signage devices directly (e.g., since access to a signage device may not provide access to other signage devices).

Playlists associated with signage devices may be obtained (operation 310). A playlist may be associated with one of the coupled signage devices. Associating a playlist with a signage device (e.g., 1:1 relationship) may allow independent management (e.g., by the signage manager) of the content being presented on the displays (e.g. digital signs). For example, unlike digital signs currently available that push out a single similar streaming feed of media to a plurality of devices, the signage system allows each individual display's content presentation to be customized.

A playlist may include an identification of media items, identification of a zone in which the media will be displayed, and/or a sequence of play (e.g., random and/or ordered). Selections of media items for a playlist may be received, in some implementations (operation 315). For example, a user may select media items from a library (e.g., a repository storing media items) associated with the user and/or the signage manager. A user may customize media items or portions thereof, in some implementations. For example, graphical user interfaces (GUI) generated by the signage manager (e.g., accessible via the Internet) may facilitate media creation. The GUIs may include templates, media samples, images, and/or other tools to facilitate media creation. Media items in the playlist may include stored media (e.g., customized, partially customized, and/or from a library) and/or streaming media. For example, a user may select a feed from a streaming media site (e.g., news, weather, severe event, TV, movie, corporate channel, live stream meetings, etc.).

In some implementations, one or more media items of a playlist may be automatically selected and/or recommended for selection by the signage manager. For example, a user may select a topic (e.g., weather, workplace safety, emergency operation instructions, company software tips, traffic, etc.). A user may select media items and topic(s) associated with one or more of the selected media items may be identified (e.g., all topics, some topics, greatest represented topic, least represented topic, and/or any other appropriate version). The signage manager may automatically identify media (e.g., from a library of the signage manager and/or user) associated with the selected and/or identified topic(s). The identified media may be added to the playlist and/or presented to a user as a suggested addition and/or replacement item for a playlist. For example, identified media may be inserted into a user selected zone, into a similar zone as other media items in which the same topic are presented, and/or any other appropriate zone. The identified media may be added to the playlist (e.g., automatically and/or with confirmation from a user) for a predetermined period of time. A user may extend the period of time (e.g., automatically renew the identified media's inclusion in the playlist after the period of time has elapsed for another period of time), may terminate the inclusion in the playlist prior to the period of time elapsing, and/or may provide a custom period of time for the media to be included. In some implementations, the signage manager may identify one or more new media items (e.g., that were not added to the playlist) for inclusion into the playlist after the period of time has elapsed. By adjusting the media included in the playlist, viewer apathy may be decreased (e.g., since content may be new and/or fresh), view engagement may be increased (e.g., since content may provide new information), and costs may be decreased (e.g., since the adjustment occurs automatically and/or with less user input, such as an approval rather than content creation).

Playlist(s) and/or media item(s) may be updated (operation 320). For example, content in a library may be updated and/or users may provide updates to custom and/or partially custom content. In some implementations, a user may update a playlist via graphical user interfaces generated by the signage device. An updated playlist may alter media items included in the playlist (e.g., content), placement (e.g., on which zone a media item will be presented), template, duration of play, sequence (e.g., ordered and/or random), etc. In some implementations, user identification may be updated for a license for streaming media, and/or a location (e.g., a URL) for streaming media may be updated. The updated playlist and/or stored media item(s) may be stored in a memory of the signage manager Signal(s) may be received from signage devices (operation 330). For example, a signage device may transmit a signal at an interval to the signage manager. A health of the signage device may be determined based on the signal (e.g., frequency of signal, receipt of signal, etc.). For example, if a signal is received late and/or not received by the signage manager, a health may be determined to be poor and/or conditions that might cause the poor health may be diagnosed (e.g., automatically and/or manually). A notification may be transmitted (e.g., to users and/or signal devices) based on the health. For example, the notification may request additional signal(s) (e.g., for diagnostic purposes), the notification may notify users (e.g., administrator of a signal device and/or signal manager) regarding health of a signal device, etc. In some implementations, a signal may not be transmitted for receipt by the signage manager.

The playlist may be transmitted to an associated signal device (operation 345). The media items identified on the playlist may be transmitted to the associated signal device. The playlist may be an updated playlist and/or a new playlist. In some implementations, signage manager (e.g., based on records or communications with the signage device) may determine if one or more of the media items identified on the playlist are new (e.g., when compared to previously sent playlists, when compared to current playlist, etc.). The signage manager may transmit the media items that are identified as new and may be restricted from transmitted other media items on the playlist, in some implementations. The signage manager may transmit (e.g., and the signage device may store) each playlist and associated contents as new each time a playlist (e.g., new, old, and/or updated) is transmitted.

In some implementations, the playlist (e.g., updated and/or new) may be pushed (e.g., transmitted) to a signal device when the playlist is completed or a predetermined time period (e.g., user selected and/or default) after the playlist is completed. In some implementations, the playlist may be transmitted in response to the signal received from the signage device. For example, the signage manager may wait for a signal from a signage device and determine if a playlist for transmission exists (e.g., new and/or updated). If a playlist for transmission exists, then the playlist may be transmitted to the associated signage device. The signage manager may be inhibited from transmitting the playlist to a signage device not associated with the playlist (e.g., to inhibit accidental dissemination of information from different companies and/or divisions, to increase security, etc.).

In some implementations, a determination may be made whether a signage device is in a quiet period prior to transmission of a playlist and/or media items. In some implementations, a signage device may stop transmitting signals to the signage manager during the quiet period, and thus a signage manager may await signal(s) to transmit the playlist(s) and/or media item(s) to the signage device. The signage device may continue to transmit signal(s) during quiet periods, in some implementations, and thus the signage manager may otherwise determine if the signage device is in a quiet period (e.g., based on communication with the signage device, schedule of quiet period, sending of a test packet prior to transmission of a playlist and/or media item, etc.). The signage device may wait for the quiet period to elapse prior to transmitting playlist(s) (e.g., new and/or updated) and/or media items (e.g., in the playlist, new to the playlist, and/or updated).

In various implementations, the signage device may receive the transmission of the playlist and/or media items. The signage device may store an associated playlist and/or at least a portion of the media items associated with the playlist. The signage device may receive and/or store information related to streaming components of the playlist (e.g., log on credentials, location information such as URLs or calls, etc.). The signage device may generated a media feed based on the playlist for transmission to an associated display (e.g., digital sign). The media feed may include media items presented for a period of time, in a sequence, and/or in a zone. The display may not be capable of communicating with the signage device but capable of presenting the media feed provided by the signage device to the associated display. The display may be wired (e.g., via USB, hardwire, HDMI, etc.) to the signage device (e.g., to decrease costs, improve signal quality, and/or increase security when compared with wireless connections), in some implementations. The signage manager may be restricted from communicating directly with the display and/or the display may not be capable of receiving communications from the signage manager (e.g., the display may not include or be restricted from utilizing communication interfaces that allow wireless connections). Inhibiting remote access to displays may increase security (e.g., by inhibiting remote hacking of displays).

Process 300 may be implemented by systems such as the system illustrated in FIG. 1 and/or may be implemented using one or more of the described graphical user interface and/or website wireframes. Various operations of process 300 may be added, deleted, and/or modified. In some implementations, process 300 or portions thereof may be performed in conjunction with other described processes or portions thereof.

In some implementations, the signage manager may analyze the playlist. The signage manager may analyze playlist(s) and determine if the playlist may cause damage to the display (e.g., causing screen burn, a permanent discoloration of a display) and/or users (e.g., repeat flashing, volume, etc.). For example, if an image remains on the display for a period of time greater than a predetermined burnout time for a display, it may cause the image or portions thereof to be burned into the display. Thus, the signage manager may analyze a playlist and determine if any portion may cause screen burn (e.g., residing on the display for a period of time greater than a predetermined burnout time over a short and/or long period of time). If a playlist may cause screen burn, the signage manager may transmit a notification to the user, block transmission of the playlist, adjust the playlist (e.g., change the period of time for which the image is displayed), and/or any other appropriate operation. In some implementations, the playlist may be analyzed for compliance with business goals (e.g., a predetermined range of information displayed, a predetermined range of fun item displayed, lack of a specific type of content displayed, etc.), compliance with a template, etc. For example, a playlist that includes offensive language may be identified, and a notification may be sent to users, the playlist may be altered (e.g., the content may be removed), and/or the playlist may be inhibited from being transmitted to a signage device. In some implementations, the size of media items and their associate zones for display may be analyzed. Media items that are smaller or larger (e.g., by a predetermined size) than a zone, may be identified. Media items that do not play in a zone (e.g., some zones may not be capable of presenting streaming media), may be identified. The identified media items that do not comply with the template characteristics, such as size, may cause the signage manager to transmit a notification to a user, the playlist to be altered (e.g., media items may be moved to a zone in which the media item can comply), and/or transmission of the playlist to be inhibited.

In some implementations, an emergency alert (e.g., traffic, weather, workplace event) may be presented quickly via the displays. A user (e.g., with access to a set of displays to which the emergency alert is related) may create and/or retrieve media item(s) related to the emergency alert. For example, workplace and/or industry protocol that guides operation during the emergency (e.g., OSHA handouts and/or videos, chemical plant shut down procedures, tornado cover information, evacuation routes, etc.) may be selected. The user may select a subset of signage devices (e.g., by identifying signage devices, subsets, locations, and/or displays) and/or default settings. The user may identify that the media should be transmitted to signage devices (e.g., rather than waiting for a signal from the signage device, and/or indicating that a quiet period should be interrupted). The signage manager may transmit an updated playlist including the selected media items and instructions to the signage manager to immediately deploy the new playlist (e.g., as opposed to deploying the playlist at a predetermined time in the future). The signage device may receive the playlist and/or media items and generated a media feed based on the playlist and media items. Thus, interrupting the current playlist being presented on the associated display and allowing quick transmission of the emergency alert.

In some implementations, the signage manager may allow generation of playlists (e.g., by the signage manger) and generation of feeds (e.g., by the signage manager) that include streaming traffic reports (e.g., from traffic services and/or news feeds) stream based on location and/or operations of the entity. For example, for a predetermined range of time proximate deliveries from a division of an entity, a feed including traffic in at least a zone may be presented on a display.

In some implementations, quick selection features for playlist generation and/or updating may be allowed by the signage manager. For example, users may select topics and/or media items and allow the signage manager to automatically identify and generate playlists (e.g., for the entire playlist and/or zones) based on the selected topics and/or media items. The signage manager may assign default time periods for the playlist to play (e.g., to encourage new playlists to be created and/or allowed to be created by the signage manager to keep content fresh and viewers of a digital sign engaged).

In some implementations, a first user with access to a first set of displays (e.g., entire set of displays for an entity or portion thereof) may access the signage manager via a user interface generated by the signage manager. The first user may generate one or more first playlists and/or alter one or more existing first playlists via the signage manger. Each of the first playlists may be associated with a first set of displays. The first playlists may be the same or different. A first user may generate a customized playlist to present on one display of the first set of displays, in some implementations. A second user with access to a first portion of the first set of displays may then access the signage manager to alter the first playlist to generate a second playlist to associate with a second set of displays (e.g., a portion of the first set of displays). A third user with access to a second portion of the first set of displays may access the signage manger via one or more interfaces generated by the signage manager to alter the first playlist to generate a third playlist to associate with the third set of displays (e.g., a portion of the second set of displays that may or may not include one or more of the displays in the second set of displays). The third user may not have access to the second set of displays, in some implementations; and thus, may be inhibited from altering the first playlist and/or second playlist associated with the second set of displays.

In various implementations, a signage manager may manage the media presented on a plurality of displays across an organization or multiple organizations. The signage manager may communicate with a signage device to allow play of media items on the displays. The signage manager may allow independent control and/or management of each of the displays, unlike systems in which a media feed is pushed out to the plurality of devices for an enterprise. In some implementations, the signage device may store at least a portion of the media items included in the playlist associated with the signage device. Thus, even if a feed (e.g., streaming media) is interrupted, the display may not be inhibited from presenting media items (e.g., by presenting a black or blank screen, for example) but rather the media items stored in the signage device may be played at least partially according to the playlist.

In some implementations, the signage managers, playlists, and/or media content a user can utilize and/or access may be restricted based on user information. For example, some users may have rights (e.g., administrative rights, license rights, etc.) that other users may not have. A user rights may be customized or default rights may be utilized. For example, a user may have administrative rights to maintain content on signs, specify users to a sign within a location, specify users to all signs within a location, specify users to all signs within a region or group of locations, specify users to a specific group of signs within locations, and/or specify users to all signs within a company. In some implementations more than one person may have administrative rights. Some entities may utilize one person to manage digital signs, who is authorized with administrative rights. Some entities may have more than one person to manage digital signs and users may or may not have similar rights. For example, some users may have administrative rights, some users may have rights to manage (e.g., create and/or modify playlists and/or media items) digital signs in a geographical region, some users may have rights to manage digital signs in a business group, some users may have rights to manage a specific digital sign, etc.

EXAMPLE

Example 1

FIGS. 1B-10 illustrate implementations of example graphical user interfaces generated by the signage manager. FIGS. 2-10 illustrated implementations of the example graphical user interface, illustrated in FIG. 1D, in which one or more fields have been at least partially expanded. FIGS. 11-16 illustrate website wireframes of the graphical user interfaces generated by the signage manager.

The signage manager system includes a display coupled to a signage device, which includes software on the device, and a signage manager, which generates user interface to manage content. The signage manager communicates with the signage device through the internet. A display may act as a "digital sign" by presenting media items transmitted to the display from the signage device via a connection (e.g., hard wire connection, such as HDMI cable).

The graphical user interface(s) (GUIs) of the sign manager may include at least 4 main pages to manage content on signs. For example, the GUIs generated may include Upload, Playlist, Library and Custom Content GUIs. The Upload GUI may copy content from a user's computer to the sign resource library (e.g., for presentation on displays as a digital sign). The Playlist GUI may control features on a display. A user may log into the signage manager with credentials such as username (email address) and password, and then the user may navigate to a central page to make and publish changes to 1 more zones. The Library GUI allows a user to copy purchased content from their cloud library and/or publish to signs. The user may upload content to a library of the signage manager (e.g., entity library, personal library, etc.) for use in a playlist and/or for use by others in a playlists. The Custom Content GUI may allow a user to create a custom media item or portions thereof (e.g., without uploading content from the user computer and/or without content from the library).

The signage manager may allow customization to several features based on customer needs, such as but not limited to:
1. Administrative rights to maintain content on signs:
   Specify users to a sign within a location;
   Specify users to all signs within a location;
   Specify users to all signs within a region or group of locations;
   Specify users to a specific group of signs within locations; and/or
   Specify users to all signs within a company
2. Quiet Time: Although the signage manager system may be configured for minimal bandwidth usage, some clients have designated critical bandwidth usage times in facilities, such as during peak production and/or peak shipping windows. A user may specify a time period during which at least a portion of the communication with the signage manager may be inhibited (e.g., downloads may be inhibited and/or postponed). For example, Quiet Time may be set in the background for an individual sign and/or location to suspend uploads to signs during designated quiet times. Once quiet time has ended, new content (e.g., new playlists and/or updated media items) that was uploaded during that time may be transmitted to the signage device.

The Home page GUI may be a control center that allows users (e.g., based on administrative rights) to choose signs in which to manage content, upload content, create custom content, and/or view a notification center showing signs that are offline and/or content that has been uploaded or edited in a zone but has not been published as well as manage sign libraries.

The home page GUI may include features, such as a notification center, multi-sign publish, and/or sign selection.

The Notification center may display notices if a sign(s) is offline (e.g., not talking to the internet). This may allow a user to address the situation immediately. Any signs offline appear under the red "Signs Offline" notification bar in the notification center. The notification center may display any zone that has been edited without publishing the changes. Content may be edited or uploaded to a zone for a sign(s) and if not published, the content will not be sent to the sign. Both notifications may be on line and/or emailed through the signage manager system to the user(s) with rights to the sign(s).

Multi-Sign Publish allows an administrative user with access to more than one sign and/or location to quickly publish content that has been edited or uploaded to one or more zones on multiple signs instead of individually choosing each sign and panel to publish. Thus, although the signage manager is capable of individually customizing playlists, a user may opt to generate a playlist for more than one display.

The Sign Selection feature may allow a user to click on a location name and the signs appear for which the user has access to manage may be presented via the GUI. The sign template for each sign may appear and the user may select the sign they want to manage.

In the Upload GUI, a user may choose the "Upload" feature to upload content from their computer to the display (e.g., digital sign). The file types accepted may include Microsoft Word, Excel, PowerPoint, Publisher, Adobe PDF, JPEG, PNG, TIFF, GIFF, MP4, for example. The system may automatically recognizes the file type and specific features based on the file type appear. In some implementations, non-video files may be uploaded and the user may provides title, start and end date, and/or duration time for the file to appear on the sign. If multiple pages are included in the uploaded file, the user may choose to upload as one continuous file or as separate images. By uploading pages as separate images, the user may be allowed to sort the content into their existing content in the zone, separately display pages and/or separately assign features (e.g., duration of presentation) pages of a playlist. The user may let the system automatically choose the section of the template in which to present the item based on page orientation and/or may automatically place the document into a horizontal zone or landscape zone.

Video (MP4 files) may include the same features as the non-video upload process. A user may be allowed to schedule the video at specific times on chosen days of the week for a date range or allow the video to play in rotation with other content. The user can may select to play the video full screen or within the horizontal panel.

The signage manager may allow a user to add content, such as a message to be presented as a media item and/or a portion of a media item, to a sign (e.g., a media item) without having to upload content from the user computer. This may allow the user to select a message based on category: business, celebration, holiday, or general. The user may select a background within a category, select the template (e.g., how they want their message to appear), and/or add text (e.g., with font and/or color choices). The user may upload photos or other media items from their computer (e.g., phone, laptop, etc.) to the message, and then save and publish (e.g., add to a playlist) for one or more selected displays. Allowing uploads from mobile user may increase possibilities to engage employees easily from a computer, tablet or mobile device. A user may to add a custom background instead of choosing from the backgrounds provided, in some implementations.

The library GUI of the signage manager may allow users to upload their own content or copy purchased signage manager content from a cloud library. Libraries can be set up to be sign, location or group specific and/or for company-wide use. During the customer set up process, administrative controls may dictate if a library can created for a sign, location or group/companywide by users. In some implementations, a signage manager may include libraries from which media items may be copy and/or purchased based on user needs. Libraries may be created for specific sign (e.g., presentation on a display) use, location, group and/or company-wide use. Content may be copied from a library to signs allowing the user to manage content from their computer and/or mobile device. In some implementations, users may create their own libraries to store their content for future use. User access rights determines if the user can create a library, manage content in that library for a sign, location, and/or company.

The signage manager may include a maintenance feature. The feature(s) in Maintenance may be based on user access rights. For example, users may have the ability to change their password. The user may enter their old password, enters a new password and then re-enters the new password.

ii. User Groups—Allows users with access to create customized sign groups in which they want to regularly upload content. This could be regions, zones, product groups, language specific groups. The user creates a group, sets access rights and chooses locations and or signs to include in the group. The groups will show up based on access rights in the Upload function under Sign Groups.

iii. User Administration—Allows users with access to add system users to manage content. The user adds the email address for the employee and then selects location which the employee is locations. The user fills in the employee name and address. They then choose if the employee is active/inactive and level of admin access: Manager or Admin and then sign access: Sign, Location, Region, Company, Group.

1. Admin Access
a. Manager—allows user to upload and manage content for specified sign access rights.
b. Admin—allows user to upload and manage content for specified sign access rights and have access to Maintenance features.
2. Sign Access—allows user access to manage content for selected signs
a. Sign—user can manager selected sign only
b. Location—user can manage selected signs within the location chosen
c. Region—user can manage selected signs with a region chosen
d. Company—user can manager all signs in a company
e. Group—user can manage signs in selected groups
  e. Playlist The Playlist is the holder of all content in one place for a sign. When a user chooses a sign from the Sign Selection on the Home page, they are taken to the Playlist. To keep the user from having to click through individual pages for each zone of the sign playlist, the playlist is displayed in one page in collapsed mode. The user can quickly see each zone on the sign, when last published and the publisher's name as well as if a zone has new content that hasn't been published (Edit zone button in red). The user can then choose which zone to expand and either view the content or edit the zone.

Each zone has a Publish Zone button the user may click on if changes are made to the zone. The publish zone button sends a signal to the signage device that it has new content and looks for the new content to display.

1. Sign Template Zone—To view the zone, the user can click on the blue sign template zone bar or the + sign on the left sign of the bar. The sign template for the chosen sign will appear. The user can collapse the bar or edit the zone if they want to change the template and how content is displayed. The user can change the template to show more or less content for a continual period of time or schedule the template change for a specified period of time for certain days of the week. Once created or edited, to publish the changes, the user may click on the "Publish Zone" button.

2. Content Zone—The content zone has 4 sections: Active Portrait Zone, Inactive Portrait Zone, Active Horizontal Zone, and Inactive Horizontal Zone. Active refers to content that has a valid start and end date based on the computer calendar current date. If content falls past the current date, the content is moved to the respective inactive zone. The user can click on the "view" button beside content to view an enlarged image of the content. If there is more than 1 page to the file, there are forward and back arrows to direct the user. The user can also edit a piece of content in active or inactive zones by clicking on the "Edit Zone" button. They can change the title, duration and start/end date. They can save and publish or cancel out of the change. The user can also delete a piece of content in an active or inactive zone by clicking on the "Delete" button.

a. Bulk Edit—Users can also click on multiple lines of content and edit start/end dates or copy to other signs as well as remove from the sign you are editing if needed.

b. Copy to Sign/Libraries—users with access to manage multiple signs, can copy content to a library or to one or more signs.

c. Users can also change order of rotation in Active content by clicking on the title, holding the mouse down (or holding your finger on the title on a mobile device) and dragging to a different order in rotation.

3. Scheduled Video Zone—Any videos uploaded for active/inactive status that are to be played at a scheduled date or time appear in this zone. The user will see the same functions as the content zone and are able to change the video from scheduled time to go into general rotation.

4. Info Zone—The info zone allows for personal, workplace and home safety tips to be chosen to display on a sign. The user can view the current topics chosen to appear on the sign by expanding the blue collapser bar. The active topic list also displays the date added. Editing the section by clicking the "Edit Zone" button and a list of topics appear. Any topics chosen to display on a sign will show how long the topic has been on the sign. The notes section also shows topics that were previously chosen and how long they have been off the sign.

The user can click on a topic and a window appears with all the tips for the topic. The user can click on the left blue box to activate a topic. The system randomly chooses a tip from a topic in order to display the tips in random order. The user can choose how often a tip rotates before publishing the tips. Default language is English, but the signage manager interface supports multiple languages. The language choices for tips are set at time of set up of a new customer.

5. Weather Zone—The weather zone appears on signs for which are covered in the National Weather Service (NWS) system. Signs that have postal codes not covered by the NWS system have a customized logo panel appearing in the weather panel. The weather panel displays current weather as well as a 5 day forecast. Lobby templates typically display current weather conditions. The weather zone can be customized based on customer need.

A sign can display weather for one or more postal codes. The user can view the current postal codes chosen by expanding the blue collapser bar. The active topic list also displays the date added. Editing the section by clicking the "Edit Zone" button and a list of postal codes appear. The user chooses to add a new locale, edit or delete an active locale. They can save changes, cancel and/or publish changes.

6. Marquee Zone—The marquee zone is one or more scrolling ticker feeds where the user can add custom messages. They also can choose each message to have different background and text colors. There is also the choice for the number of safe days worked to appear with their message and the system will automatically advance the days until the user manually resets the counter. Depending on the signage manager package chosen, there is also the ability to have RSS feeds appear in the marquee zone—either signage manager provided feeds or the user can add the RSS feed of their choice.

The user can view the current marquee feeds by expanding the blue collapse bar. Editing the section by clicking the "Edit Zone" button and the user can delete active feeds or add new feeds. Once changes are made, the user can preview the feed prior to publishing if wanted. Default language is English, and the signage manager system supports multiple languages. The language choices for the scrolling ticker feeds are set at time of set up of a new customer.

a. Stock Ticker—should the client want their stock trading information to appear and update regularly on their signs, the signage manager interface allows the feed to be added to the marquee zone as a standalone feature in addition to the scrolling ticker feed. The stock ticker can be put on all signs for a client or specified signs if needed.

7. Severe Weather Zone—The severe weather zone can display important weather alerts issued by the NWS. The view current warnings, the user can click on the blue collapser bar. To add or edit, the user clicks on the "Edit Zone" button. Click on Add New locale button and the user chooses state and county and save or cancel. Once published, any weather alerts issued will overtake the Info and Marquee zone with a bright colored zone displaying the alerts. Once the NWS removes the alert from their system and the signage manager system receives the update, the alert will be removed from rotation in the Info and Marquee zones.

8. Traffic Zone—Traffic is part of a package selection in the signage manager system. If chosen, the client chooses the city/state and a third party source provides the content to signage manager. To view the active traffic zone schedule, the user can click on the blue collapse bar. The location for traffic as well as the schedule to display appears.

To edit the zone, the user clicks on the "Edit Zone" button. The user can edit or delete an existing schedule or add a new schedule. When editing or adding a schedule, the user has the ability to choose when the traffic updates appear on signs. They can choose to run solely traffic in a certain window of time on specific days of the week, stop other content and constantly display traffic for a specified time or to have traffic play on the 10 s, 15 s, 20 s, 30 s, etc. of the hour. They have can multiple schedules for when traffic can display.

9. Enhanced Content—Enhanced is part of a package selection in the signage manager system. Enhanced content is current entertainment, sports news, sports scores and game schedules, wellness, US and World News. If chosen, the client chooses the feeds to display and a third party source provides the content to signage manager. To view the active content schedule, the user can click on the blue collapse bar. The selections as well as the schedule to display appears.

To edit the zone, the user clicks on the "Edit Zone" button. The user can edit or delete an existing schedule or add a new schedule. When editing or adding a schedule, the user has the ability to choose when the contents updates appear on signs. They can choose to run solely in a certain window of time on specific days of the week, stop other content and constantly display content for a specified time or to have content play on the 10 s, 15 s, 20 s, 30 s, etc. of the hour. They have can multiple schedules for when enhanced content can display. We can also filter out specific words in content should a client choose in order to keep news headlines with those specific words appearing on the sign.

2. Signage Device Software

The sign supervisor software is installed on a signage device prior to shipment. The Supervisor facilitates the communication between the Sign Manager (GUI) and the Signage device software. The Sign Supervisor software includes the following:

A. Heartbeats

Heartbeats are very small packets sent to signage manager server periodically to indicate the sign is still running. The server is set to alert signage manager staff when a sign exceeds a configured amount of time without heart beating.

The heartbeat response from server to sign is used to indicate that there is a new configuration to be picked up. All communication with the sign is initiated from the sign so that the client does not have to adjust their network configuration to allow inbound contact with the sign.

B. Downloads Configuration Changes from Signage Manager Server

Configuration updates can be made by a user publishing changes on Sign Manager, or automatically by some of the features (like Traffic). The Sign Supervisor handles the download of these files.

C. Downloads Assets from Signage Manager Server

The sign is designed to use as little network bandwidth as reasonable. For example, when the sign is sent a configuration containing image/video assets, a hash value is sent along with each item. If the sign already has content with the same name, it compares the hash value of the local item with the value in the configuration. If the hashes match, it continues to use the content it already has. If the hashes don't match, the content is downloaded and given a new name, so that existing content can be updated or multiple items that happen to have the same name do not conflict with each other.

1. Downloads player software updates—Player software updates can be sent from the signage manager server to the Supervisor, which then automatically applies the update in the very early morning for minimal noticeable disruption of the sign display.

2. Remote Access—A third party software allows signage manager to remote access the signage device as long as the signage device is powered on and connected to the internet. This allows for signage device and sign supervisor software updates as well as any troubleshooting on an as needed basis.

3. Start/Stop function—The Supervisor user interface has Start/Stop buttons to easily stop and restart the signage device's operation, allowing maintenance of the PC without the distracting display operating. While the player is manually turned off, the Supervisor continues its heartbeat and file download duties, so that when the Player is restarted it is ready to go.

4. Signage device Software—This software handles all visual display of content. The Signage device software carries out the instructions from the Sign Manager. The visual display of content includes:

a. Multiple Display Formats (sign templates)—Currently we have 11 formats (some of which are designed for specific clients). A sign can change templates on a schedule which is managed in the Sign manager by editing the Sign Zone Layout in the Playlist.

b. Panels Supported:

i. Poster—corresponds with Portrait Content Zone on Sign Manager. Image panel, change can be either fade-in/-out or instant.

ii. Media—corresponds with Landscape Content Zone on Sign Manager. This is a multi-purpose panel (see below), changes are instant.

iii. Info Zone—Safety Tip items can be configured by signage manager to have varying backgrounds, for a more engaging, dynamic appearing sign.

The Info Zone is also used by the Severe Weather alerter. The sign can be configured to receive National Weather Service (NWS) weather alerts for counties specified in the Sign Manager. When alerts are issued by NWS, they are updated to the sign which begins alternating the regular Safety Tip information with the text of the alert(s). When multiple alerts apply to the sign, the entire set of alerts are played along with notices that there are multiple alerts in effect.

iv. Marquee Zone—The scrolling ticker feed can play either user-supplied text (including an automatically-updating "number of days safe"), or a user-supplied RSS feed which has a configurable update period.

v. Weather Zone—we use the National Weather Service Weather (NWS) for this zone. The NWS Weather display can be configured by us for client needs. The default template displays the current weather conditions (including an easy-to-notice indicator when NWS declares heavy weather conditions), and a five-day forecast (which has a similar indicator for NWA forecast of hazardous conditions). Lobby templates display current weather conditions and easy to notice indicator when NWS declares heavy weather conditions.

vi. Clock—The clock operation is automatic, there is no Sign Manager operation. It uses the internal computer clock and time zone settings.

vii. Media Panel—The majority of the versatility of the sign is driven by the Media panel. It manages the display of video as well as various types of still image content.

a. Video—Video can be played within the Media panel with the other panels of the sign operating normally, or full-screen hiding the rest of the sign's panels. Video can run either in rotation with other content on the Media panel (even when it run full-screen it can operate in rotation), or it can run at scheduled times, allowing the exact start times and days to be chosen in the Sign Manager.

b. User-supplied Images—The Sign Manager allows setup of the order that standard images (uploadable in various formats) play in rotation.

c. Enhanced Content—Topics are chosen in Sign manager, with time to play, frequency and start/end time choices. These topics are provided from a third party source that generate automatic hourly content updates to the sign, allowing a frequently changing display of imagery without operator intervention. These images play full screen on the standard template. Lobby Templates can play full content either full screen or in horizontal zone.

d. Traffic—Traffic locations are chosen in the Sign Manager with similar timing options to Enhanced Content. Traffic displays are updated as much as every 15 minutes, showing maps and text of current traffic conditions. These images play full screen on the standard template. Lobby Templates can play full content either full screen or in horizontal zone. If a sign is on quiet time for content updates, traffic always continues to update Example 2

In some implementations, the playlists and/or media presented in playlists may be customized via interfaces generated by the signage manager.

Figure 17:
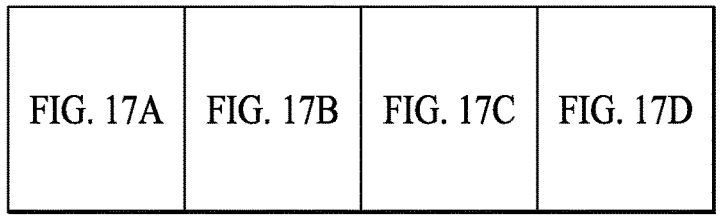
FIG. 17 illustrates an implementation of an example website wireframe of an example graphical user interface generated by the signage manager.
Figure 17A:
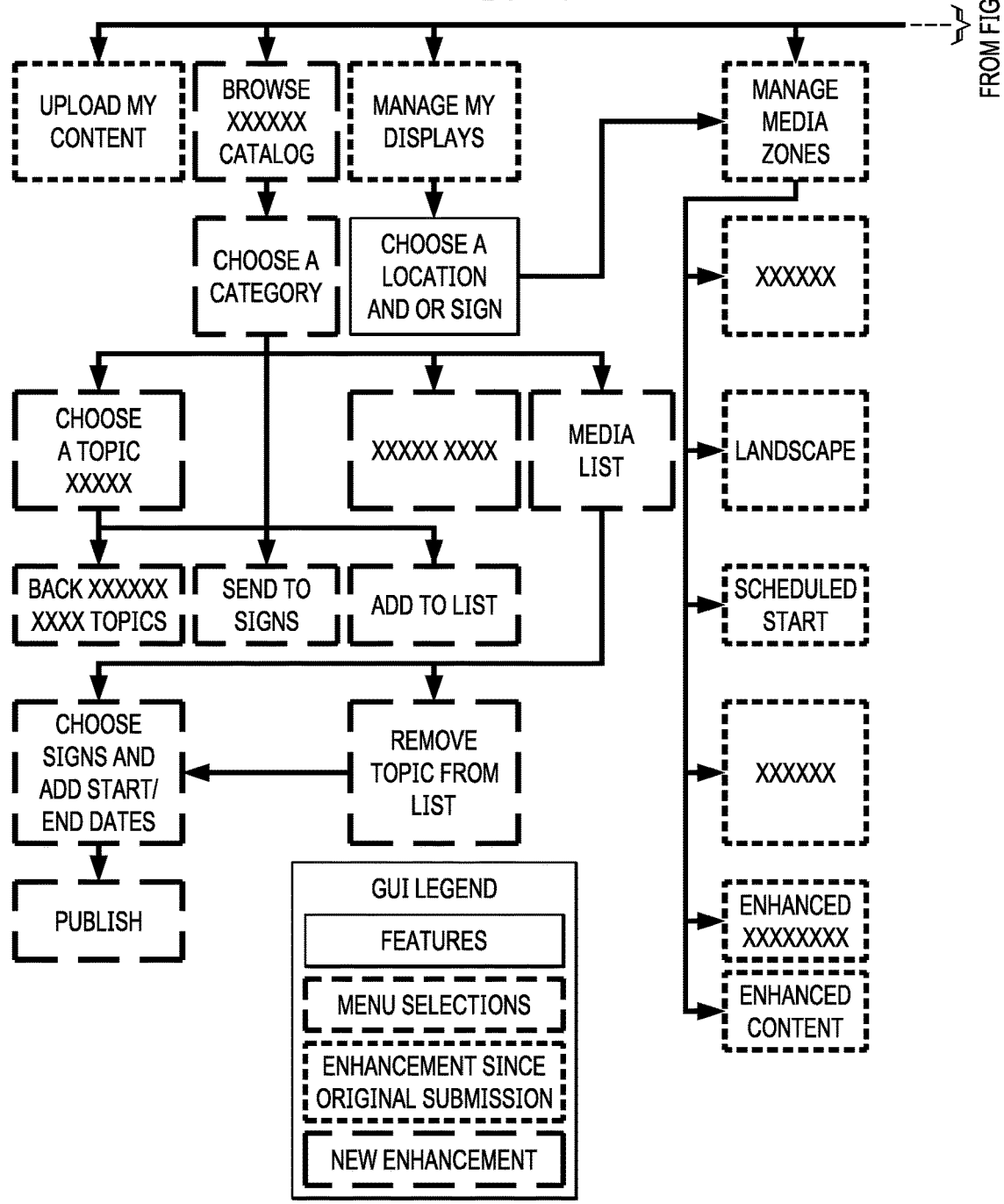
FIGS. 17A, 17B, 17C, and 17D collectively illustrate the example website wireframe illustrated in FIG. 17.
Figure 17B:
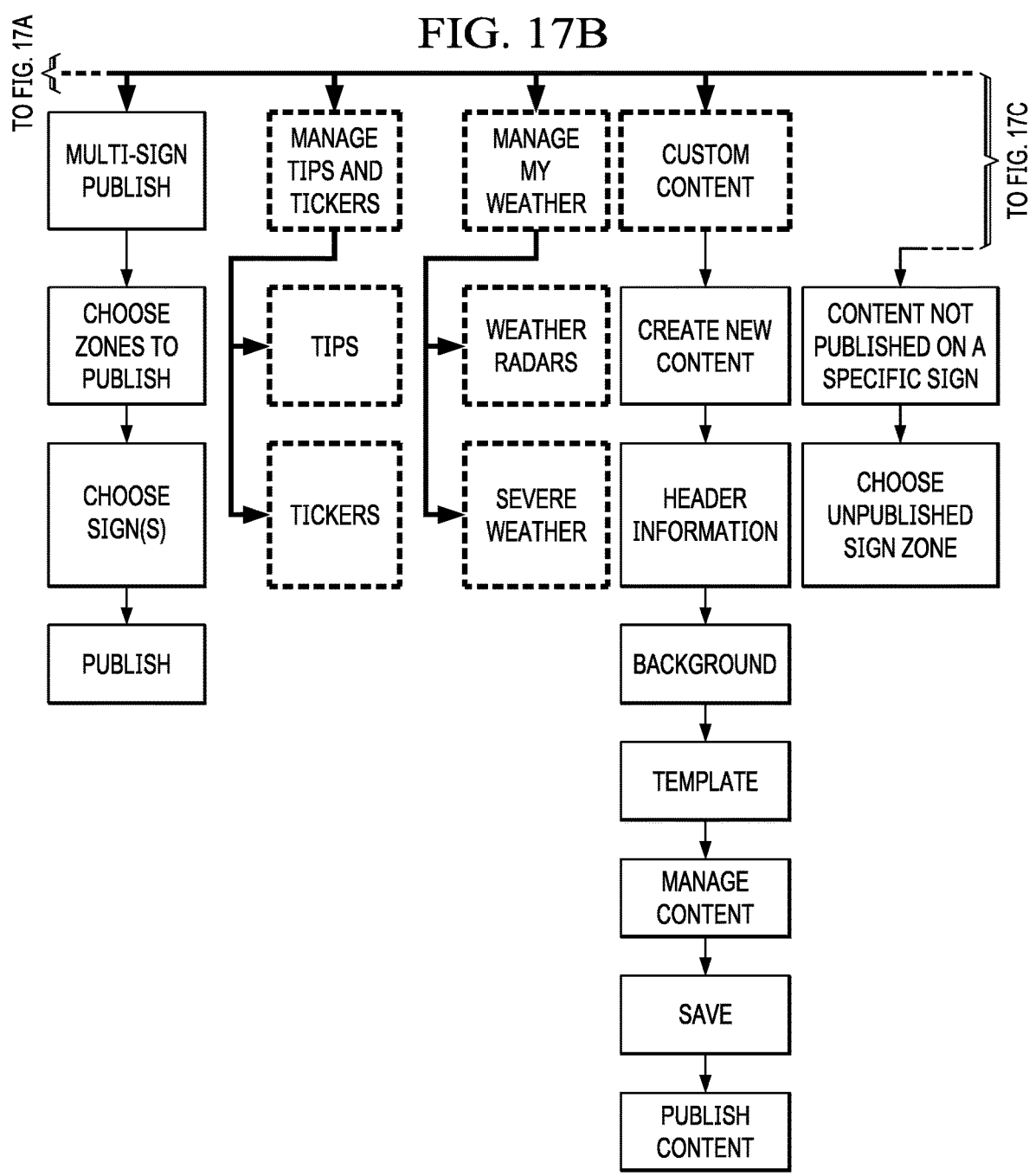
Figure 17C:
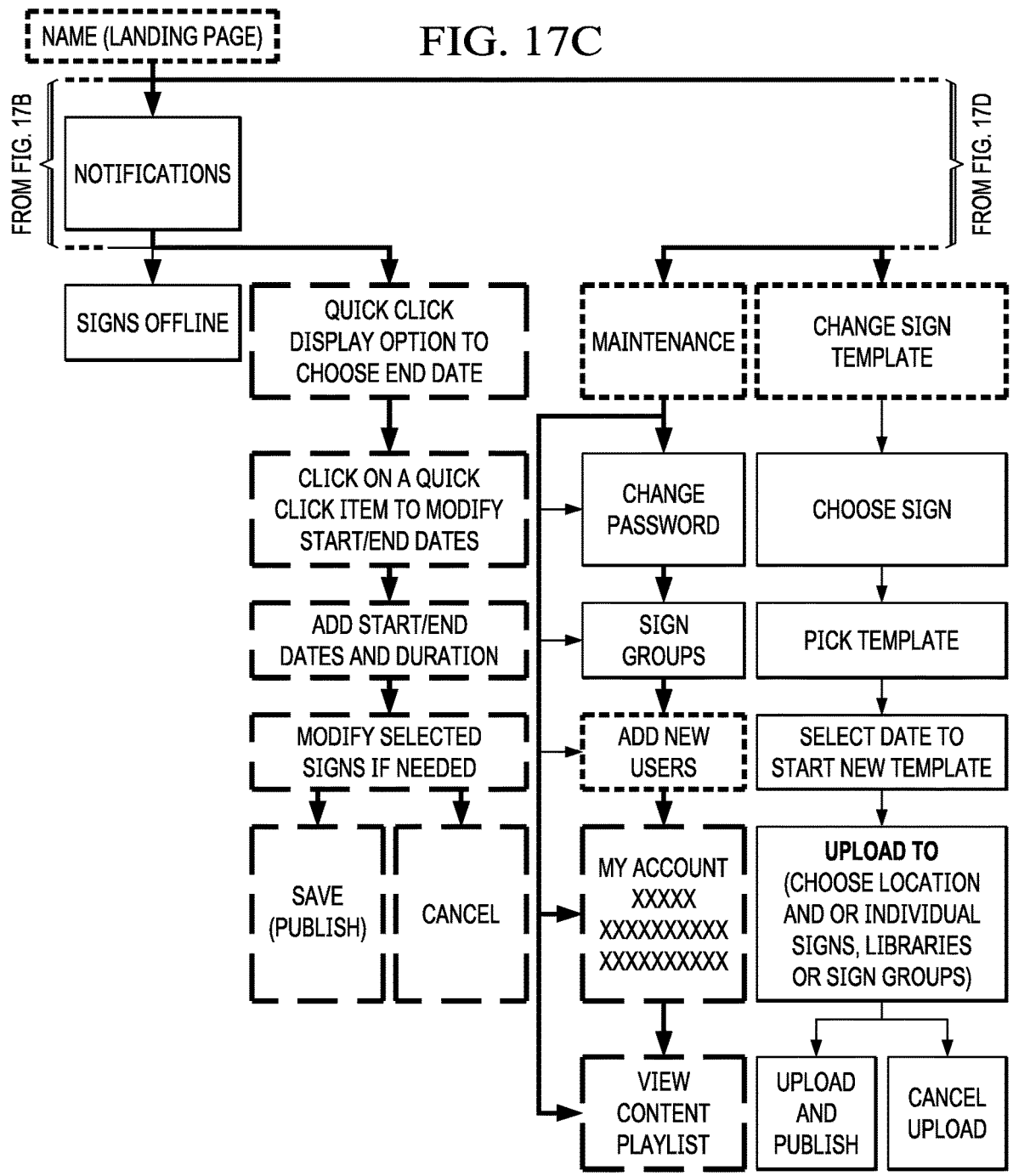
Figure 17D:
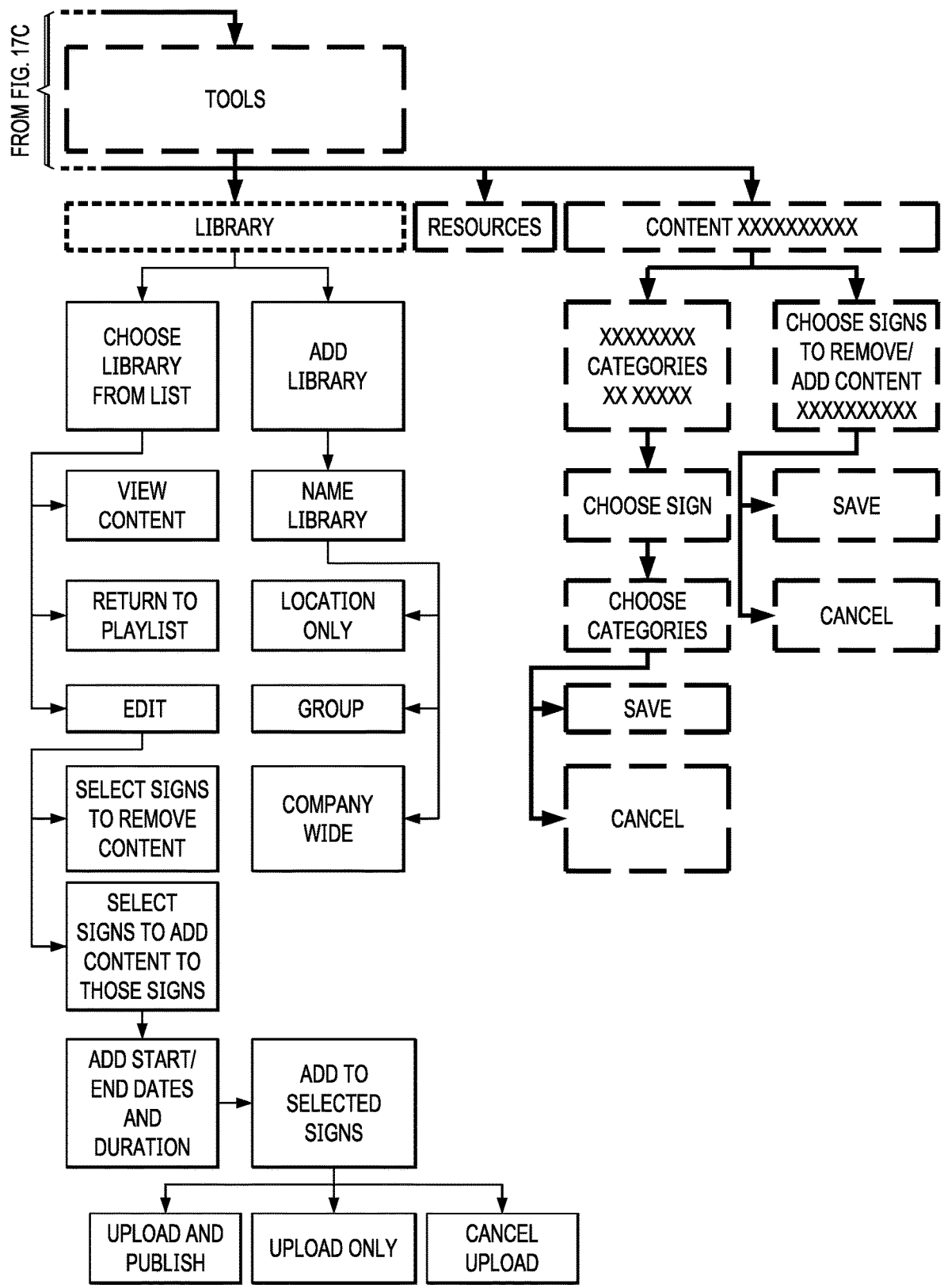
Figure 18:
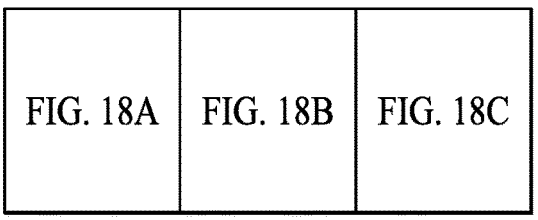
FIG. 18 illustrates an implementation of a portion of the example website wireframe of the example graphical user interface generated by the signage manager, illustrated in FIG. 17.
Figure 18A:
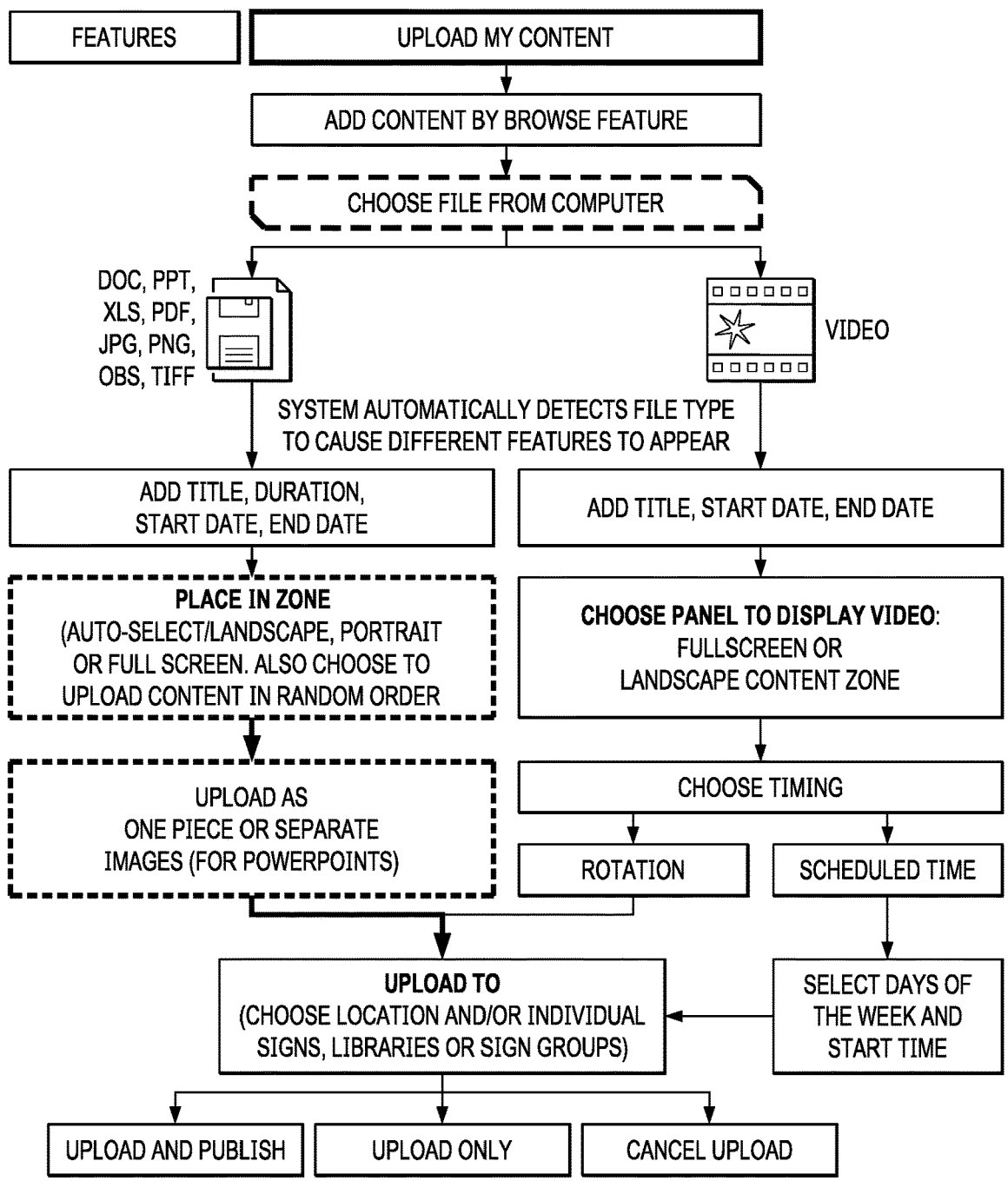
FIGS. 18A, 18B, and 18C collectively illustrate the example website wireframe illustrated in FIG. 18.
Figure 18B:
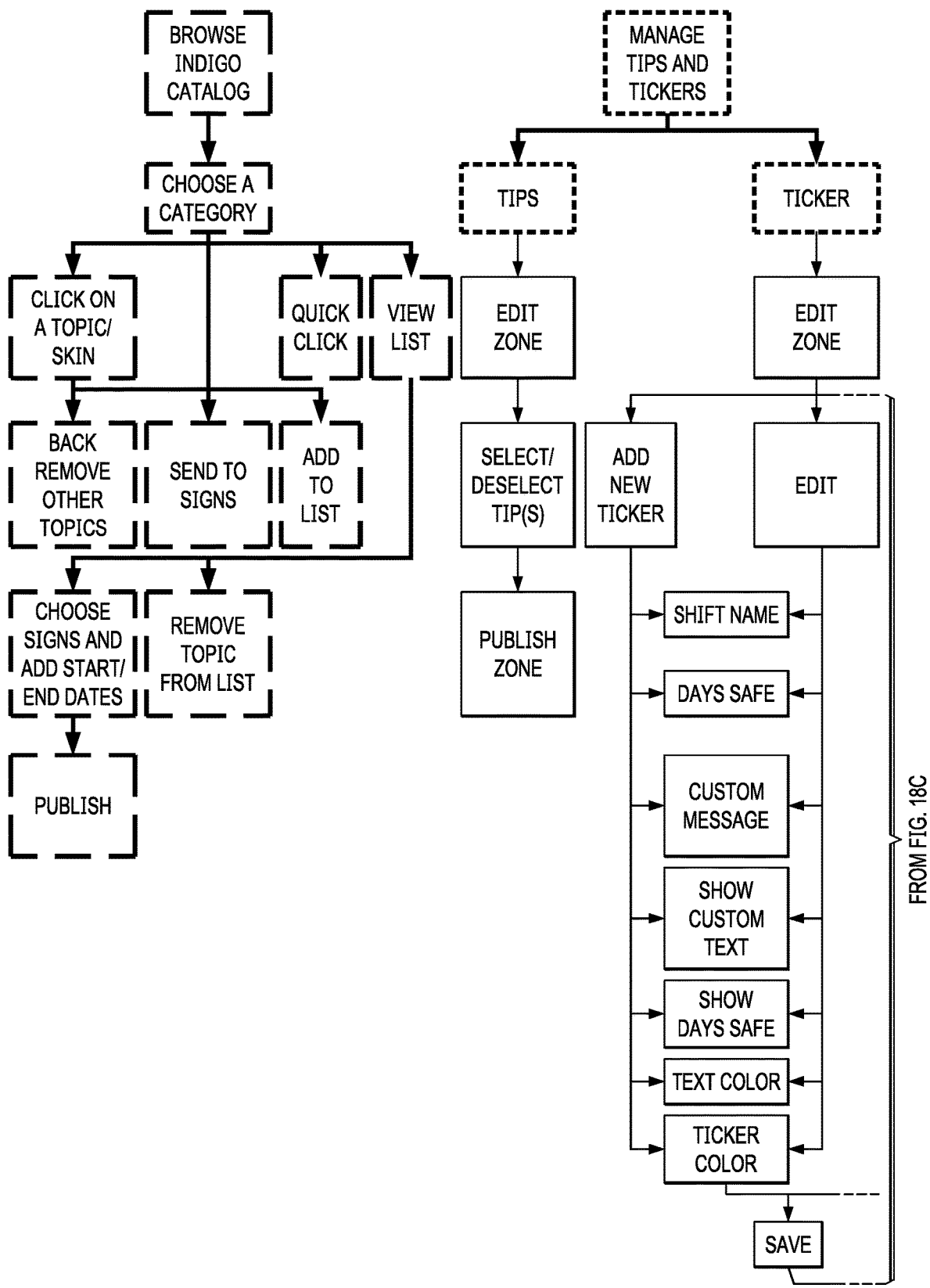
Figure 18C:
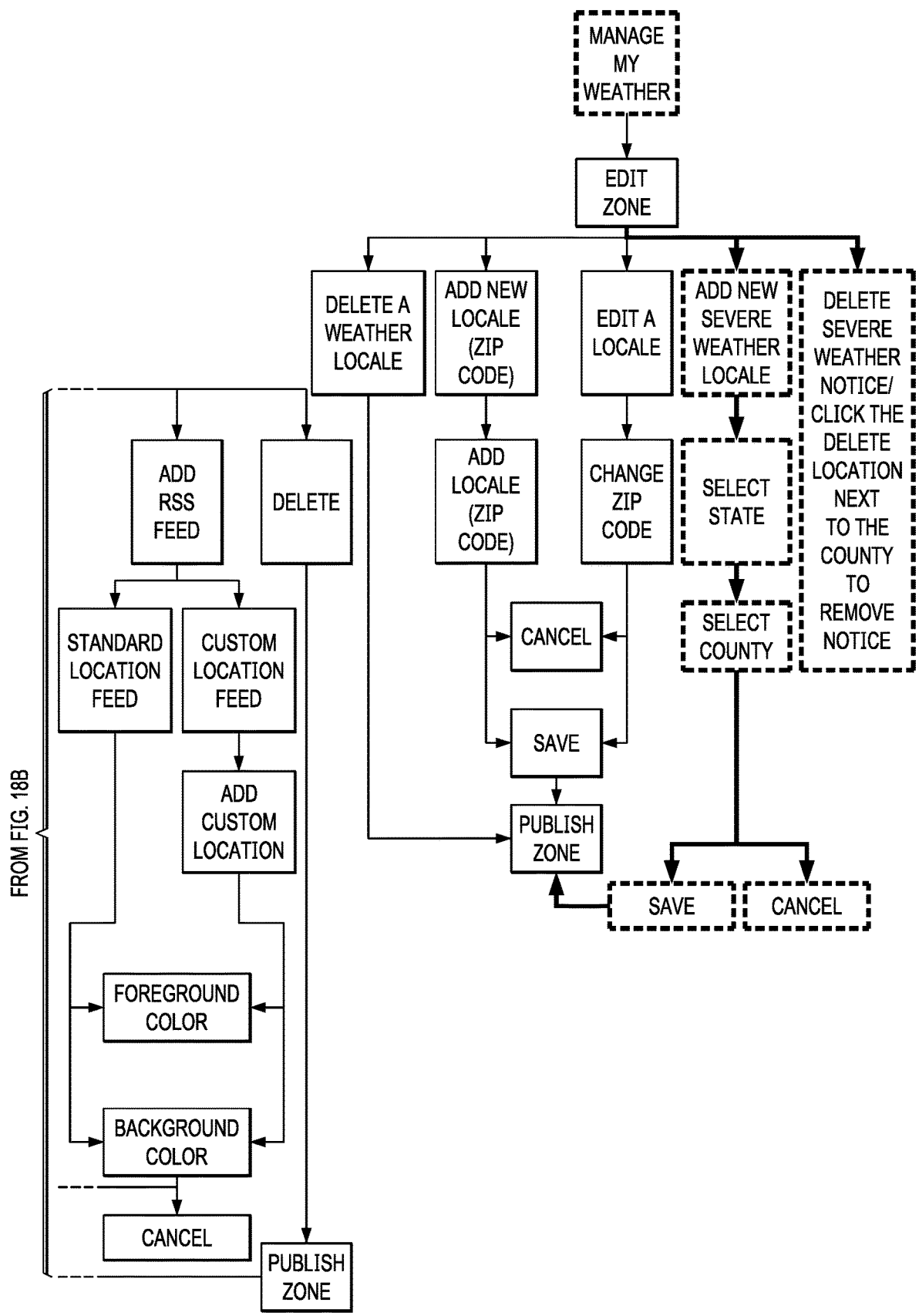
Figure 19:
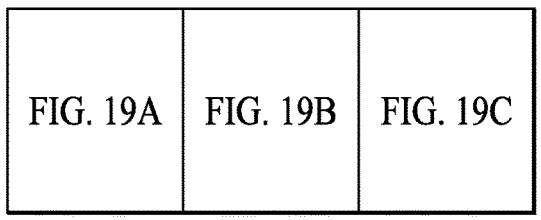
FIG. 19 illustrates an implementation of a portion of the example website wireframe of the example graphical user interface generated by the signage manager, illustrated in FIG. 17.
Figure 19A:
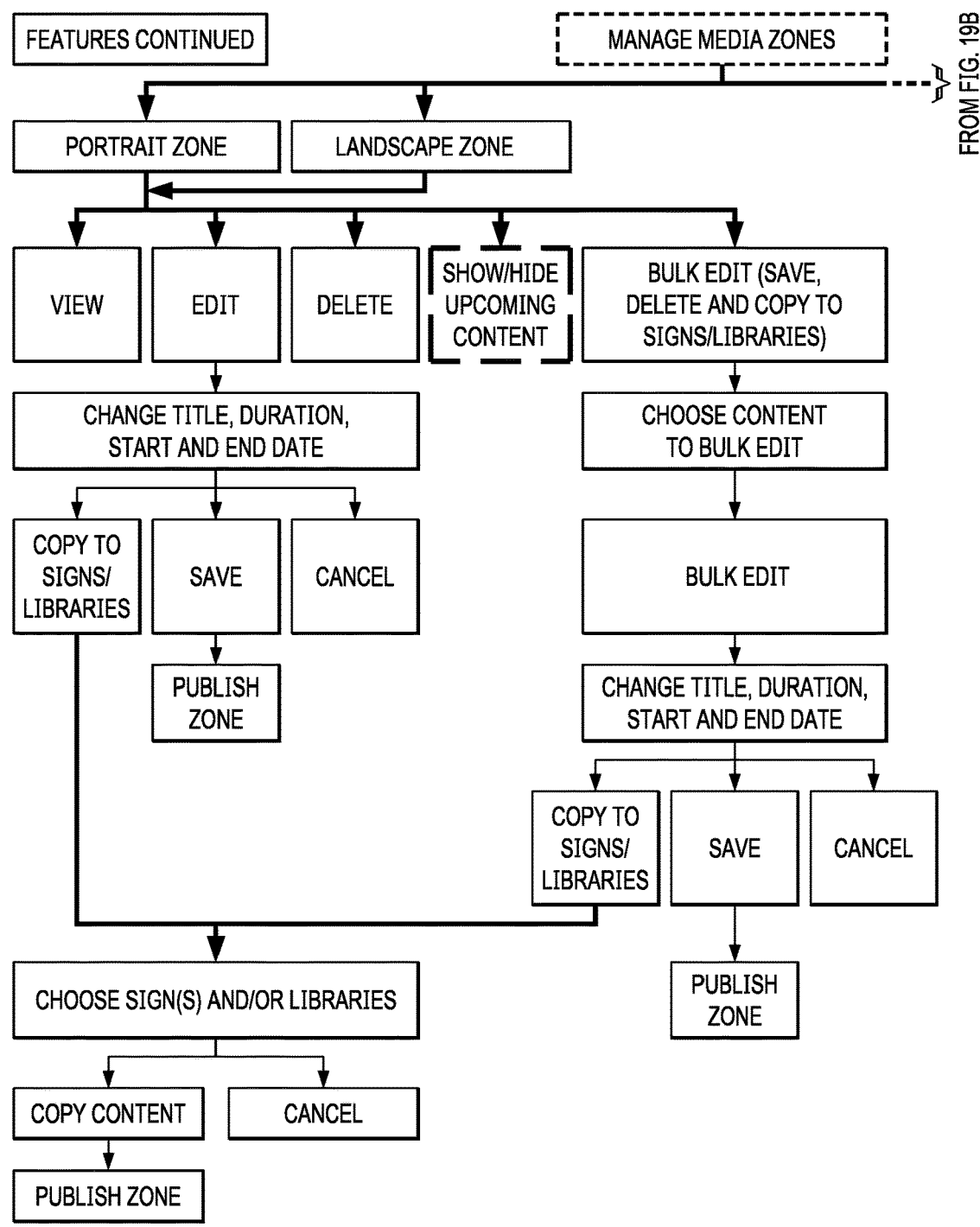
FIGS. 19A, 19B, and 19C collectively illustrate the example website wireframe illustrated in FIG. 19.
Figure 19B:
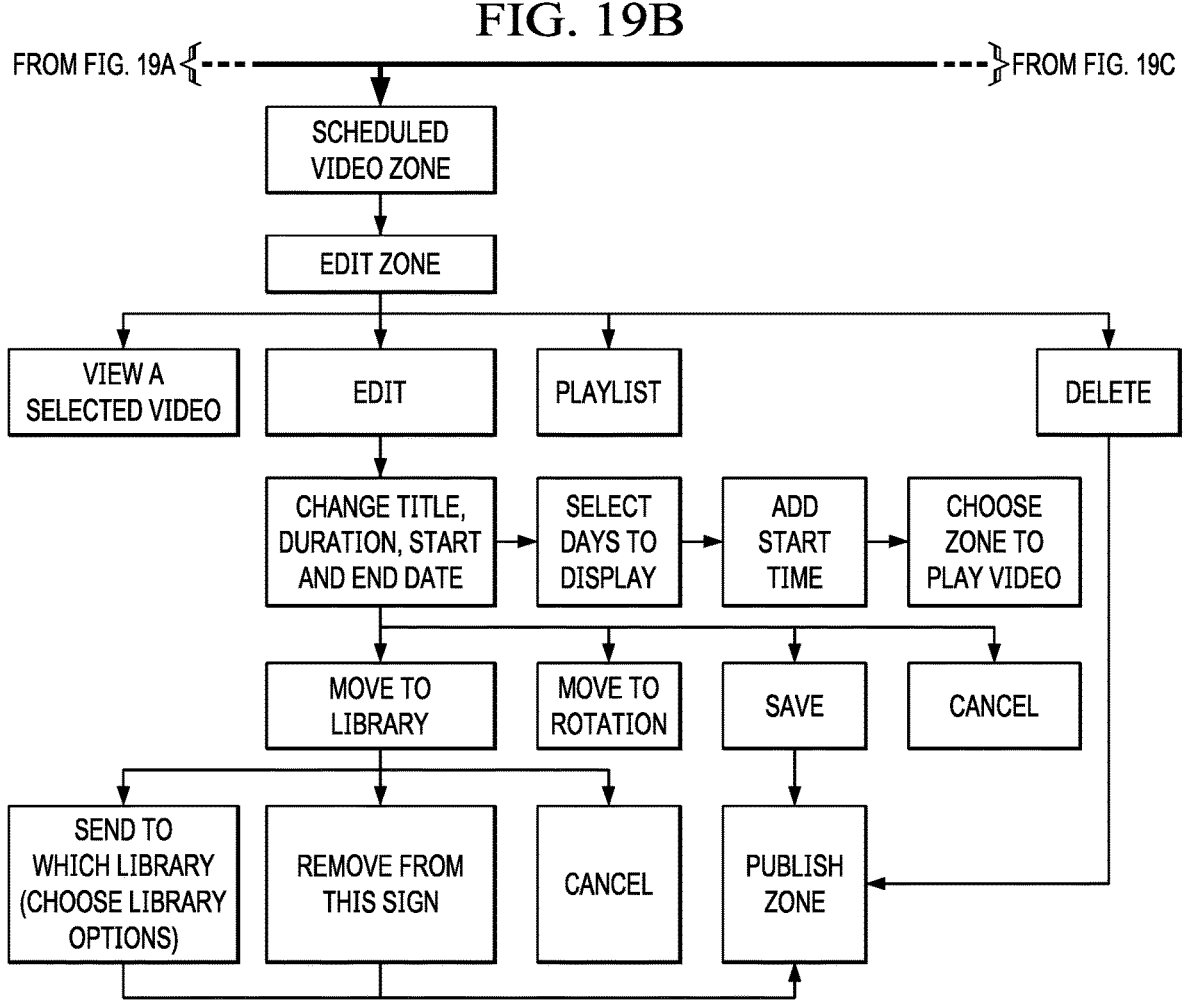
Figure 19C:
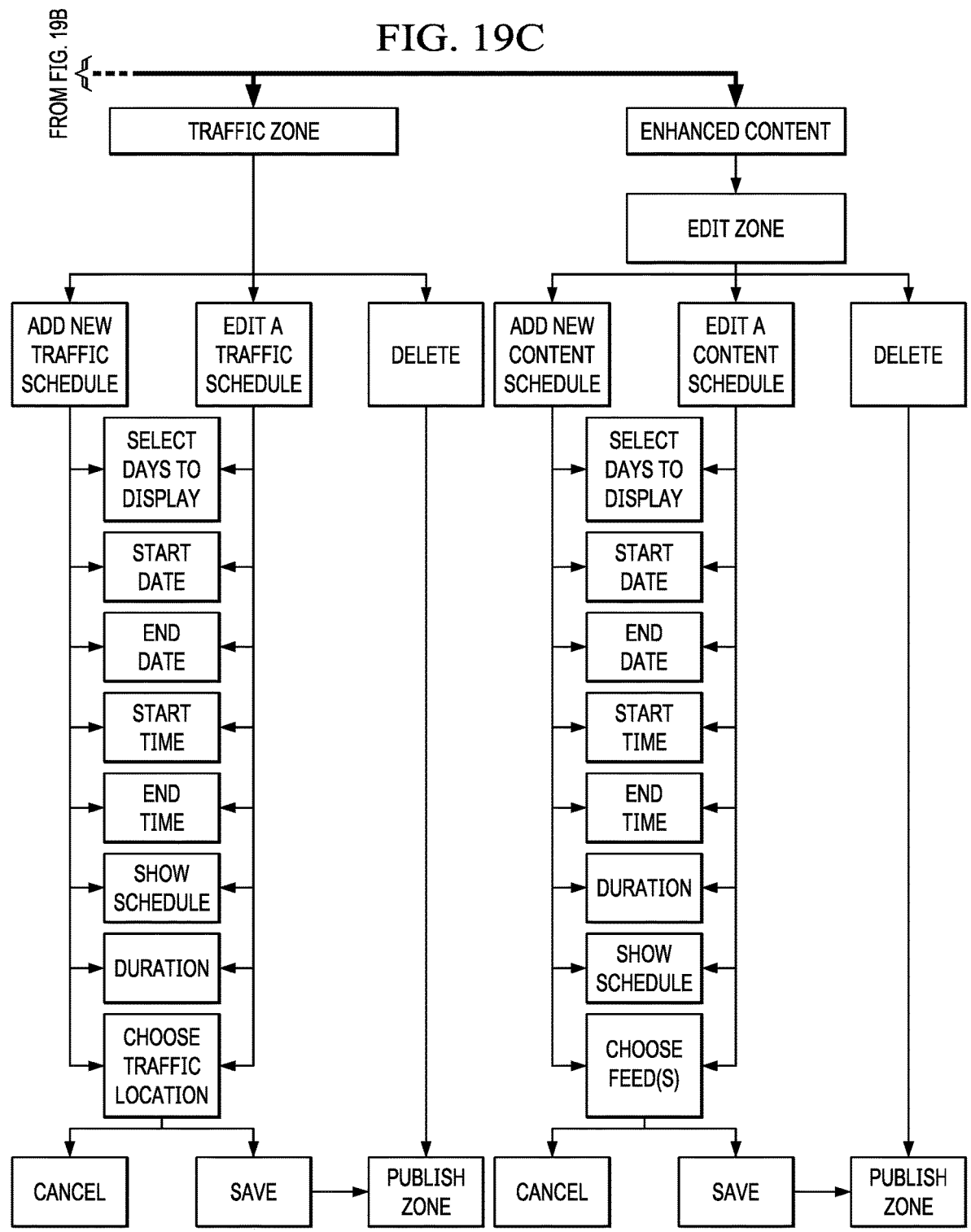
Figure 20B:
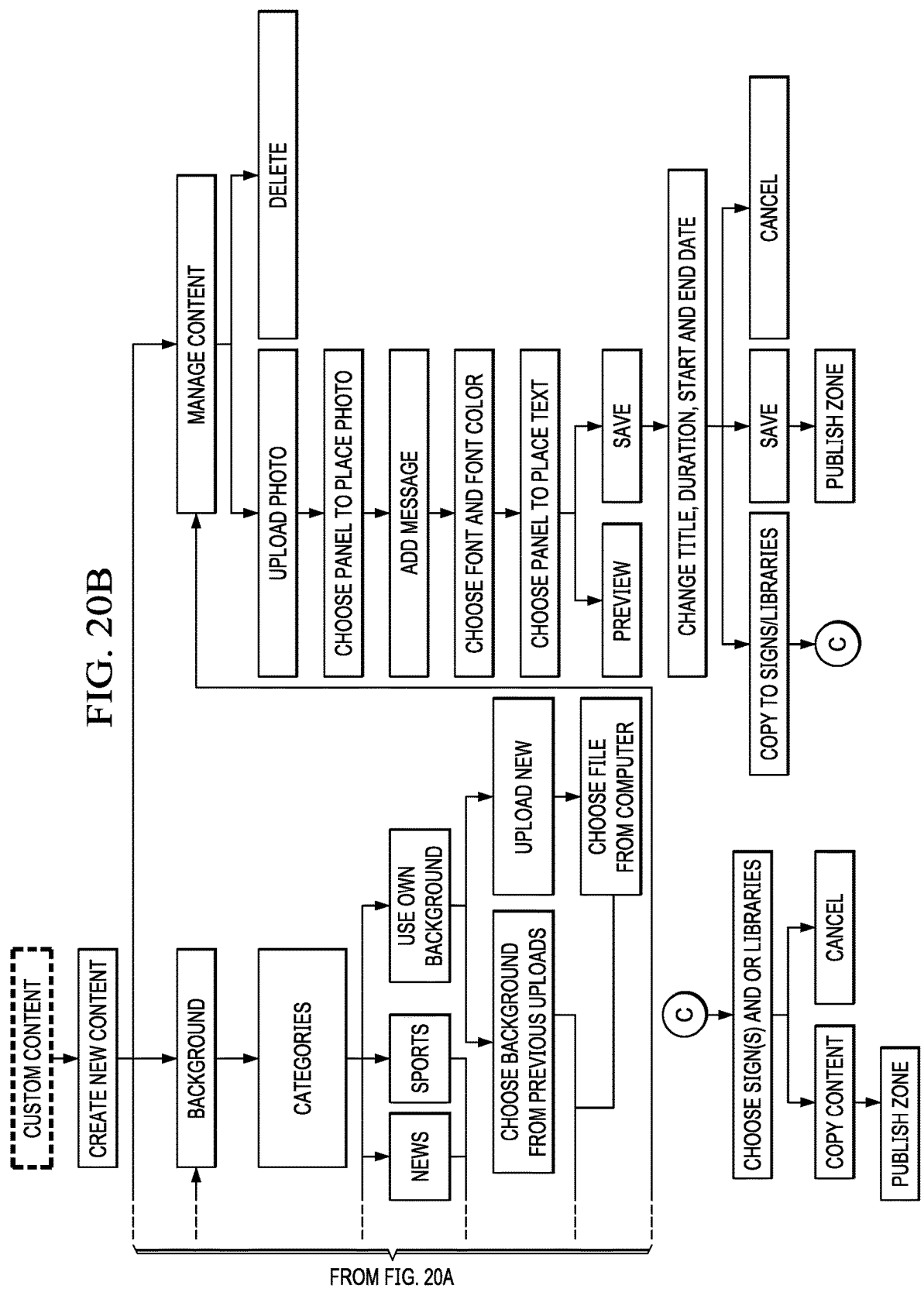
Figure 21:
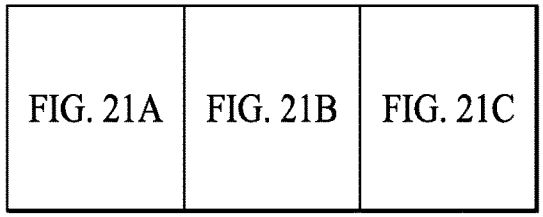
FIG. 21 illustrates an implementation of a portion of the example website wireframe of the example graphical user interface generated by the signage manager, illustrated in FIG. 17.
Figure 21A:
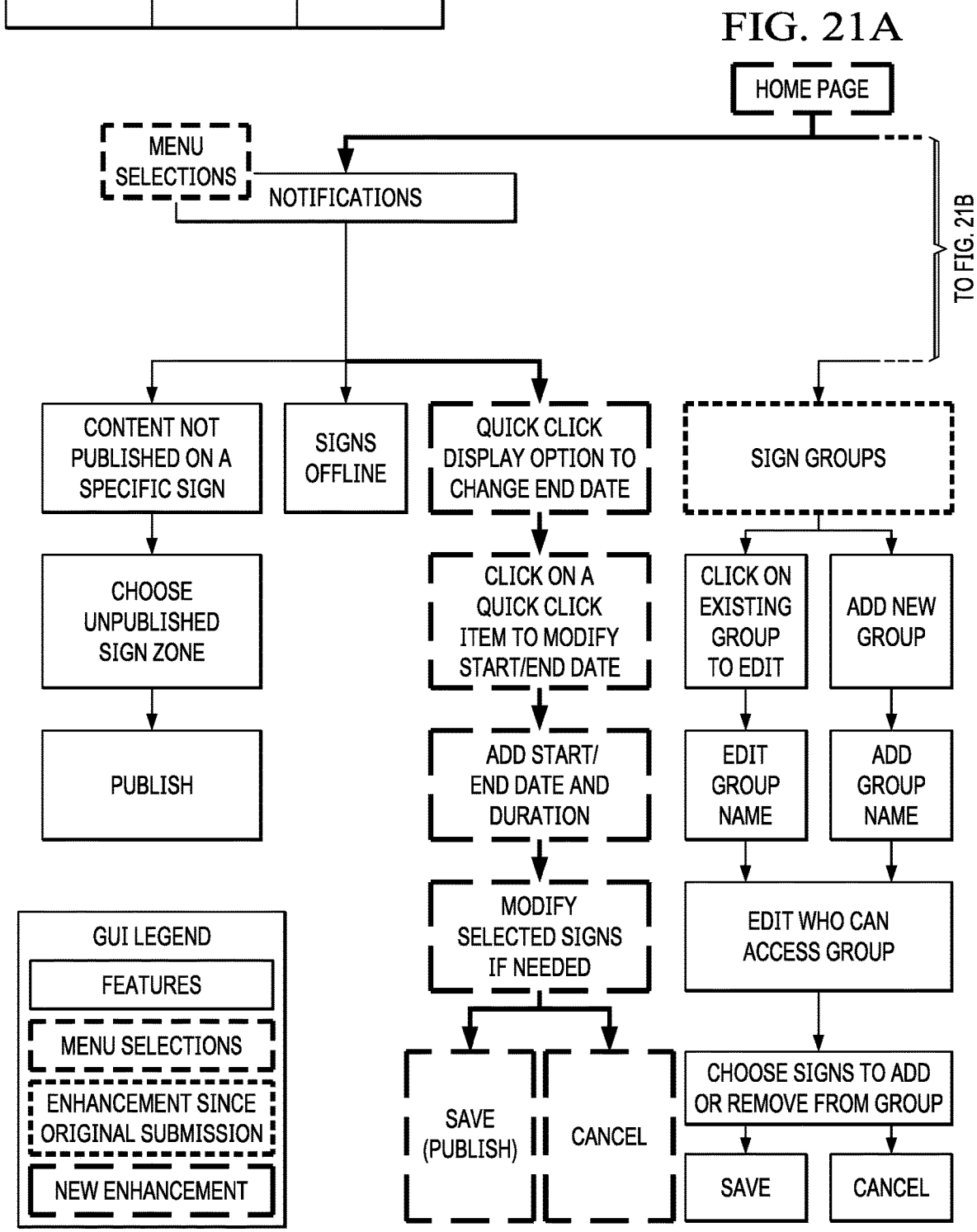
FIGS. 21A, 21B, and 21C collectively illustrate the example website wireframe illustrated in FIG. 21.
Figure 21B:
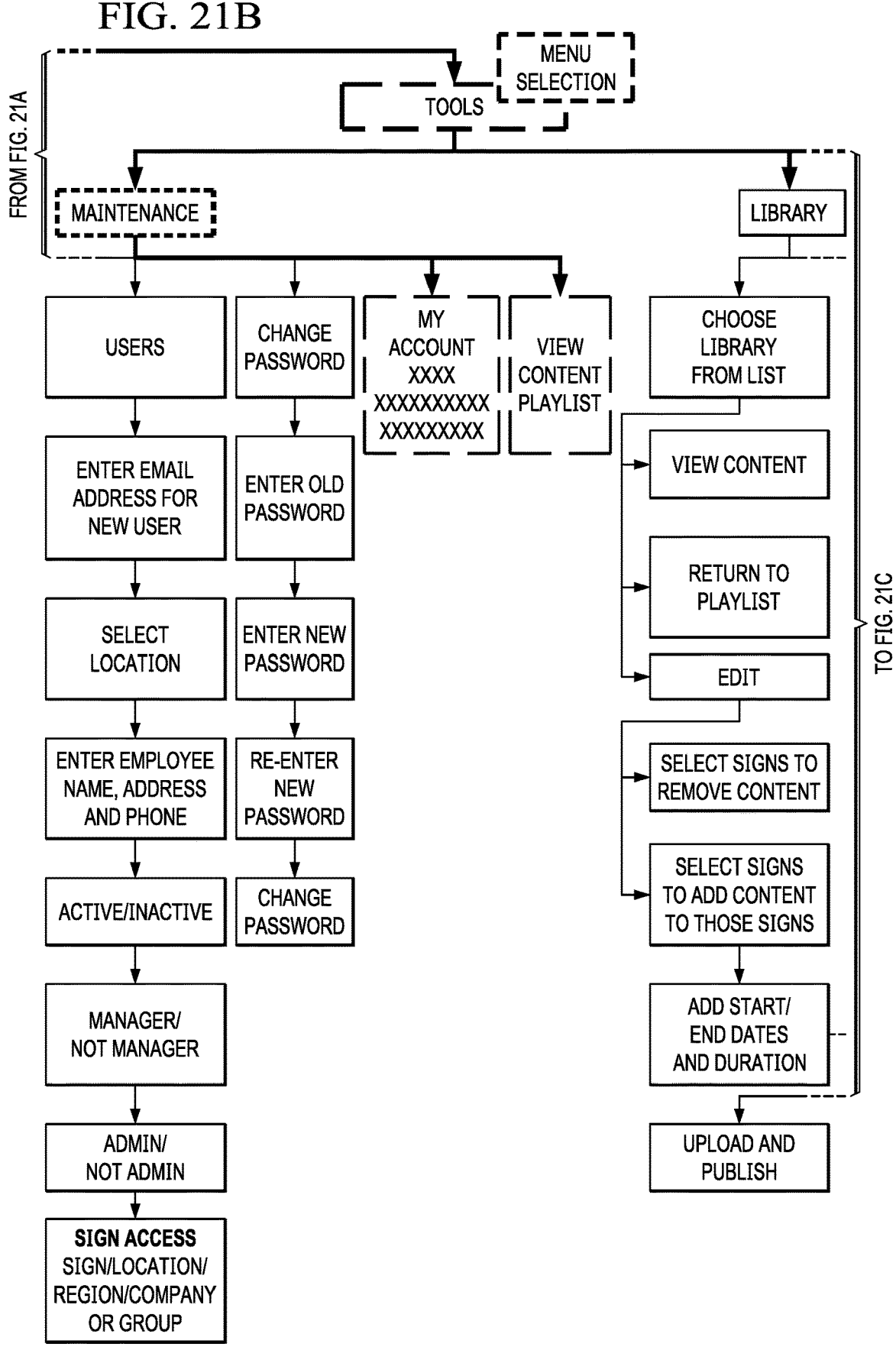
Figure 21C:
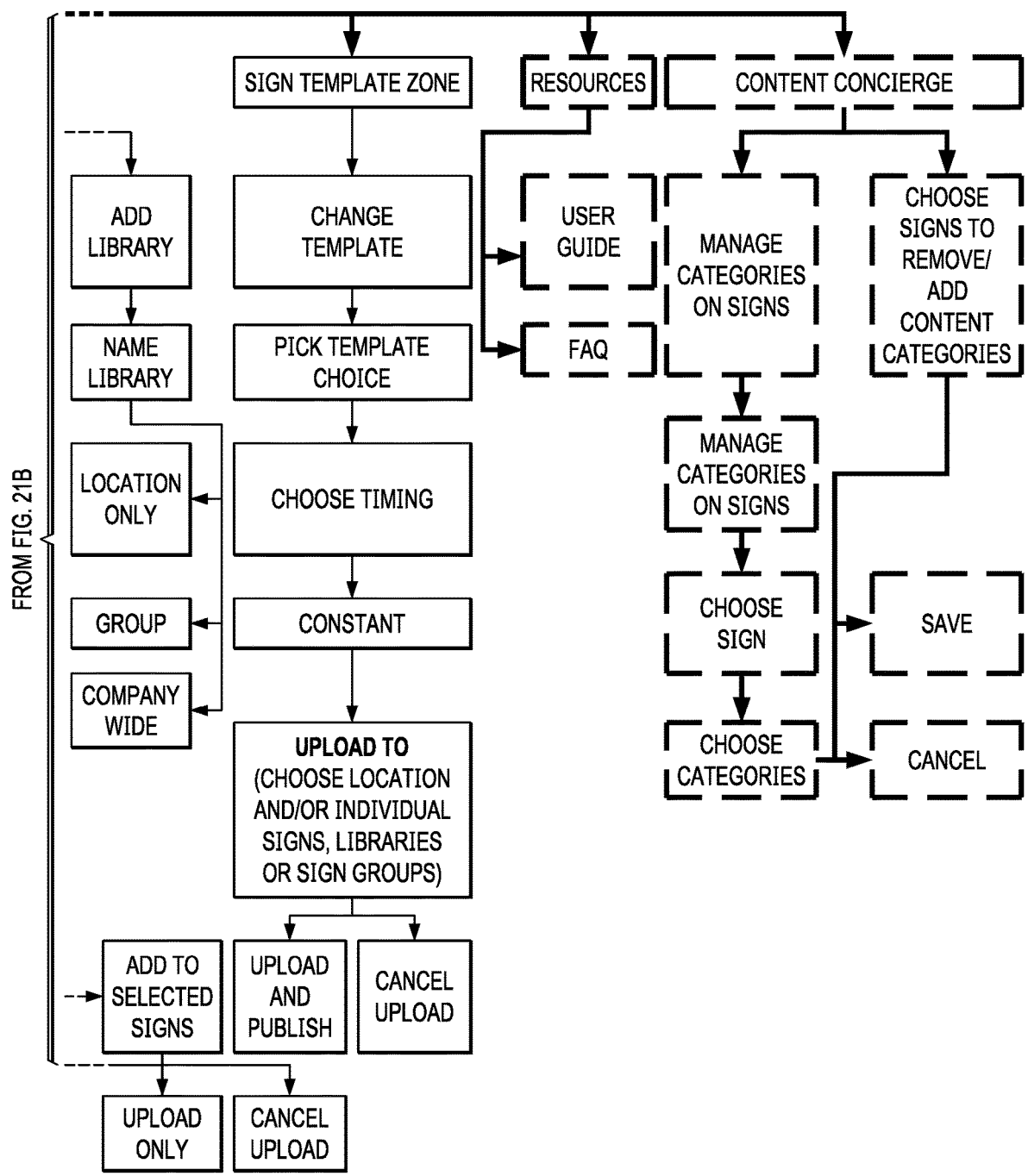

In various implementations, the signage manager generates one or more user interfaces (e.g., graphical user interfaces (GUI)) to facilitate creation and/or management of playlist(s) and/or media item(s). FIG. 17 illustrates an example website wireframe of graphical user interface(s) generated by the signage manager. FIGS. 18-21 illustrate portions of the example website wireframe of graphical user interfaces generated by the signage manager and illustrated in FIG. 17. The sign manager may generate a home page and one or more other pages, such as pages for uploading content (e.g., Upload My Content), browsing content (e.g., Browse Catalog), managing displays (e.g., Manage My Displays), providing guidance to individuals viewing a sign (e.g., Manage Tips and Tickers), weather content options for inclusion on playlists (e.g., Manage My Weather), and/or creating custom content. For example, an Upload My Content page may allow a user (e.g., administrator of one or more playlists) to copy content from the user's computer and/or a memory accessible by the user (e.g., remote memory) to the sign resource library to include in playlists and thus on digital signs (e.g., presented on displays). As another example, a Browse Catalog page may allow a user to search a library of content (e.g., including multiple categories media associated with topics) and choose content to create playlists. A Manage My Displays page may allow a user to edit content already published to a digital sign (e.g., being presented on a display). In some implementations, a Manage Tips and Tickers page may allow a user to change out tips on the sign to keep content fresh. A Manage My Weather page may allow a user to add and/or remove zip codes to a zone in which weather information may be displayed and/or may allow management of subscriptions to severe weather alerts. In some implementations, a page may be generated to allow users to upload the user's content to the user's signage manager library (e.g., for inclusion in playlist, for storage, etc.). A Custom Content page may allow a user to generate a custom media item (e.g., without uploading content from their computer) and/or a partially custom media item (e.g., including at least a portion of content from a user's library and/or signage manager library).

In some implementations, a Home page may be a control center that allows users (e.g., based on administrative rights) to choose signs in which to manage content, upload content, create custom content, view a notification center (e.g., identifying signs that are offline and/or content that has been uploaded or edited in a zone but has not been published), and/or manage sign libraries.

In some implementations, the home page may include a notifications portion (e.g., a toolbar). The Notifications portion may present one or more notices (e.g., to seek a user input for correction, attention, etc.). An indicator (e.g., color, flag, etc.) may be displayed proximate the word "Notification" to indicate that attention is needed. In some implementations, selecting the notification may allow a user to quickly address and/or provide needed user supplied information. For example, Notifications may include information related to, for example but not limited to:

i. Signs Offline—if a sign(s) is offline (e.g., not coupled to the Internet). This may allow a user to address the situation more quickly than when compared with waiting for a notification from a user than a sign is offline.

ii. Content not published—Content can be edited or uploaded to a zone for a sign(s) and if not published, the content will not be sent to the sign.

iii. Quick Click Communication Deployment—ability to change end date for the topic sent to sign.

iv. License Expiration—displays the upcoming signage manager/display license expiration date In some implementations, a user (e.g., with access to more than one sign and/or subset of signs, for example in a location) may be able to publish (e.g., include on a playlist for presentation on a display) content that has been edited or uploaded to one or more zones on multiple signs instead of individually choosing each sign and panel to publish. The playlist may be associated with an individual sign, but the playlist may be replicated and/or partially replicated to other playlist(s) (e.g., for presentation on one or more other displays).

In some implementations, GUI(s) generated by the signage manager (e.g., Manage My Signs) may allow users to manage templates used in presentation on displays. For example, a user may identify a display (e.g., a location name may be identified and the signs may be presented, for which the user has access to manage and that are in the location, and a user may a sign/display from the signs presented). The user may then customize, partially customize, and or an existing template. The sign template for an identified sign may be presented and the user may identify the portions of the template (e.g., zones) that the user would like to manage.

In some implementations, the signage manager may generate GUI(s) (e.g., Upload my Content) or portion thereof to facilitate content management, creation, and/or ion. For example, the signage manager may generated graphical user interfaces such as:

Upload my Content: The user may choose the "Upload" feature to upload content from their computer to the sign. The file types accepted may include Microsoft Word, Excel, PowerPoint, Publisher, Adobe PDF, JPEG, PNG, TIFF, GIFF, and/or MP4. The system may automatically recognizes the file type and/or specific features based on the file type appear. In some implementations, Non-video and video media items are handled differently by the signage manager. Non-video files may be uploaded and the user may provide a title, start and end date, duration time for the file to appear on the sign, if multiple pages to the file, the user can choose the system to upload as one continuous file or as separate images. In some implementations, the signage manager may automatically determine media information (e.g., title, start and end date, size, etc.) Separate images may allow the user to sort the content into their existing content in the zone. The user may allow the system automatically choose the panel based in page orientation or place the document into a horizontal zone or landscape zone. User can also choose a horizontal formatted document to play full screen. In some implementations, the user may allow default features, such as content uploaded may be placed in random order in zone playlist and/or play in order of content upload and start date. Video (MPA4 files) may be processed in a similar manner by the signage device. In some implementations, the user may be allowed to schedule the video (e.g., at specific times on chosen days of the week, for a date range, and/or allow the video to play in rotation with other content). The user can also choose for the video to play full screen or within the horizontal panel, for example.

Create Custom Content: A user may be able to add content to the sign with or without having to upload content from their computer. This may allow the user to choose a message based on category: business, celebration, holiday, and/or general. The user may choose a background within the category, choose the template how they want their message to appear, and/or add their text with font and color choices. The user may upload photos from their phone to the message and then save and publish to signs. In some implementations, features may be mobile accessible. Allowing mobile accessibility to GUIs may increase user satisfaction and participation (e.g., which may increase user engagement and/or viewership of a digital sign). In some implementations, if the user would like to add their own background and/or borders instead of choosing from the backgrounds and/or borders provided, they have the ability to do so and/or custom create new backgrounds and/or borders.

Library: The library function may allow users to upload their own content and/or copy purchased content from a library (e.g., cloud, personal, etc.). Libraries can be set up to be sign, location or group specific and/or for company-wide use. During the customer set up process, administrative controls may dictate if a library can created for a sign, location or group/companywide by users. Users can also create their own libraries to store their content for future use, in some implementations. User access rights determines if the user can create a library, manage content in that library for a sign, location or company, in some implementations.

Tools: features in Maintenance may be based on user access rights.
  i. Change Password—All users may have the ability to change their password. The user enters their old password, enters a new password and then re-enters the new password.
  ii. Sign Groups—Allows users with access to create customized sign groups in which they want to regularly upload content. This could be regions, zones, product groups, language specific groups. The user creates a group, sets access rights and chooses locations and or signs to include in the group. The groups will show up based on access rights in the Upload function under Sign Groups.
  iii. Add New Users—Allows users with access to add system users to manage content. The user adds the email address for the employee and then s location which the employee is locations. The user fills in the employee name and address. They then choose if the employee is active/inactive and level of admin access: Manager or Admin and then sign access: Sign, Location, Region, Company, Group.
  1 Admin Access
    a. Manager—allows user to upload and manage content for specified sign access rights.
    b. Admin—allows user to upload and manage content for specified sign access rights and have access to Maintenance features.
  2. Sign Access—allows user access to manage content for signs
    a. Sign—user can manager sign only
    b. Location—user can manage signs within the location chosen
    c. Region—user can manage signs with a region chosen
    d. Company—user can manager all signs in a company
    e. Group—user can manage signs in groups
  iv. My Account—Shows user software License dates.
  v. View Content Playlist—This feature allows a user to view the entire set of content uploaded for a sign. It will include the Portrait and Landscape Zones, Tips and Tickers, Weather zip codes and counties identified for severe weather, and, if applicable, Traffic and Enhanced content schedules.

Sign Template Zone: In some implementations, to view the zone, the user can click on the sign template zone bar or the + sign on the left sign of the bar and the sign template for the chosen sign will appear. The user can collapse the bar or edit the zone if they want to change the template and how content is displayed. The user can change the template to show more or less content Once created or edited, to publish the changes, the user must click on the "Publish Zone" button.

Manage Media Zones: Manage Media Zones allows the user to manage the portrait zone, horizontal zone, scheduled video zone, traffic and enhanced contents zone. The user chooses a zone and the active playlist is displayed. Active reverse to content that has a valid start and end date based on the computer calendar current date. If content falls past the current date, the content is removed from the active playlist. If the user wants to see upcoming content, they click on the show upcoming content button and the content that is scheduled for date in the future will be displayed. To go back to the active content, the user will click on the Hide upcoming content button. The user can select the "view" button beside content to view an enlarged image of the content. If there is more than 1 page to the file, there are forward and back arrows to direct the user. The user can also edit a piece of content in active or inactive zones by clicking on the "Edit Zone" button. They can change the title, duration and start/end date. They can save and publish or cancel out of the change. The user can also delete a piece of content in an active or inactive zone by clicking on the "Delete" button. Content that is edited or added must be published or the content will not display on the signs. The Publish button send a signal to the sign player to download the edited or new content.

a. Bulk Edit—Users can also click on multiple lines of content and edit start/end dates or copy to other signs as well as remove from the sign you are editing if needed.
 b. Copy to Sign/Libraries—users with access to manage multiple signs, can copy content to a library or to one or more signs.
 c. Users can also change order of rotation in Active content by clicking on the title, holding the mouse down (or holding your finger on the title on a mobile device) and dragging to a different order in rotation.

Scheduled Video Zone: Any videos uploaded for active/inactive status that are to be played at a scheduled date or time appear in this zone. The user will see the same functions as the content zone and are able to change the video from scheduled time to go into general rotation.

Tips: The info zone allows for personal, workplace and home safety tips to be chosen to display on a sign, may be customizable. The user can view the current topics chosen to appear on the sign and displays the date added. Topics chosen to display on a sign will show how long the topic has been on the sign. The notes section also shows topics that were previously chosen and how long they have been off the sign. The user can click on a topic and a window appears with all the tips for the topic. The user can click on the left box to activate a topic. The system randomly chooses a tip from a topic in order to display the tips in random order. The user can choose how often a tip rotates before publishing the tips. Default language is English, but the signage manager interface supports multiple languages. The language choices for tips are set at time of set up of a new customer.

Manage My Weather: The weather zone appears on signs for which are covered in the National Weather Service (NWS) system. Signs that have postal codes not covered by the NWS system may have a customized logo panel appearing in the weather panel. The weather panel displays current weather as well as a 5 day forecast. Lobby templates typically display current weather conditions. The weather zone can be customized based on customer need. A sign can display weather for one or more postal codes. The user can views the current postal codes chosen upon clicking the Manage My Weather button. Editing the section by clicking the "Edit Zone" button and a list of postal codes appear. The user chooses to add a new locale, edit or delete an active locale. They can save changes, cancel and/or publish changes.

Ticker: The ticker zone is one or more scrolling ticker feeds where the user can add custom messages. They also can choose each message to have different background and text colors. There is also the choice for the number of safe days worked to appear with their message and the system will automatically advance the days until the user manually resets the counter. Depending on the package chosen, there is also the ability to have RSS feeds appear in the marquee zone—either the signage manager provided feeds or the user can add the RSS feed of their choice. The user can delete active feeds or add new feeds. Once changes are made, the user can preview the feed prior to publishing if wanted. Default language is English, and the signage system supports multiple languages. The language choices for the scrolling ticker feeds are set at time of set up of a new customer. For example, the GUI may include a Stock Ticker—should the client want their stock trading information to appear and update regularly on their signs, the signage interface allows the feed to be added to the marquee zone as a standalone feature in addition to the scrolling ticker feed. The stock ticker can be put on all signs for a client or specified signs if needed.

Manage My Weather: The severe weather zone can display important weather alerts issued by the NWS. Current warnings are displayed below the weather zones chosen. Click on Add New locale button and the user chooses state and county and save or cancel. To Delete a locale, click the delete button next to the locale to remove. Once published, any weather alerts issued will overtake the Tips and Ticker zones with a bright colored zone displaying the alerts. Once the NWS removes the alert from their system and the SIGNAGE system receives the update, the alert will be removed from rotation in the Tips and Ticker zones.

Traffic Zone: Traffic may be part of a package ion in the SIGNAGE system. If chosen, the client chooses the city/state and a third party source provides the content to signage system. To view the active traffic zone schedule, the user can click on the Traffic Zone button. The location for traffic as well as the schedule to display appears. To edit the zone, the user clicks on Traffic button. The user can edit or delete an existing schedule or add a new schedule. When editing or adding a schedule, the user has the ability to choose when the traffic updates appear on signs. They can choose to run traffic in a certain window of time on specific days of the week, stop other content and constantly display traffic for a specified time or to have traffic play on the 10 s, 15 s, 20 s, 30 s, etc. of the hour. They have can multiple schedules for when traffic can display. The user can delete a schedule by click on "Delete" next to the schedule.

Enhanced Content: Enhanced is part of a package ion in the SIGNAGE system. Enhanced content is current entertainment, sports news, sports scores and game schedules, wellness, US and World News. If chosen, the client chooses the feeds to display and a third party source provides the content to signage system. To view the active content schedule, the user can click on the blue collapse bar. The ions as well as the schedule to display appears. To edit the zone, the user clicks on the "Edit Zone" Enhanced Content button. The user can edit or delete an existing schedule or add a new schedule. When editing or adding a schedule, the user has the ability to choose when the contents updates appear on signs. They can choose to run solely in a certain window of time on specific days of the week, stop other content and constantly display content for a specified time or to have content play on the 10 s, 15 s, 20 s, 30 s, etc. of the hour. They have can multiple schedules for when enhanced content can display. We can also filter out specific words in content should a client choose in order to keep news headlines with those specific words appearing on the sign.

Browse Content/Library: The Library is topical content that can be used by a licensed user of the signage system. The library is made of numerous categories that are applicable to many different types of work environments—warehouse, distribution centers, transportation departments, corporate office settings, manufacturing and more. Content may be developed and designed for the library and the library is continually updated to provide the most current and relevant topics such as safety, health and wellness, transportation, data security and motivational topics. Our library is unique is that we allow a licensed user full access to the library to use content that is applicable to an initiative a company is running, reinforce a safety training topic or improve engagement of employees by incorporating signage manager content in with corporate communications on displays. Each library category may include multiple topics. A topic consists of the following:

a. 3 English posters
   b. 1 Spanish Poster
   c. 3 horizontal oriented supporting documents The user has several options after choosing a category from within the catalog, Click on a Topic to view details, Quick Click Communication to quickly deploy a topic to a display, View List—if there are topics added to a list to add to a sign and Send to signs (after choosing signs to display content and adding start/end dates). Click on a Topic—this allows the user to view all components of the topic and determine if they want to start building a list of topics to deploy, send the chosen topic to signs or view other topics. Once a topic(s) is chosen the user will be asked to choose the sign(s) to deploy the content to and start and end dates. If the content is for future dates, the sign manager will display the content on the upcoming playlist and the user can view the through the Manage Media Zones. In some implementations, the signage manager may include the ability to quickly deploy media, a set of media on a display. This feature allows a licensed user to quickly deploy a topic from the library onto their display(s). From within the library, the user finds the topic and can choose the Quick Click Communication button to deploy the topic: 3 posters (for portrait zone) and 3 horizontal slides (for the landscape zone). Each component will display in the zone for 15 seconds before transitioning to the next component. The topic will play in rotation for the duration of the day. The sign manager will send an email to the licensed user with an option to extend the end time at their convenience should they choose to do so.

In some implementations, the signage manager may allow automatic population and/or identification of suggestions for inclusion in playlists (e.g., a Content Concierge). Content Concierge takes on the management of content for a display so there is continual rotation of content in the 2 media zones and the tips zone. An license may be obtained for a single display and includes access to the content library for use on the display for the license period. At the onset of the license, the client selects the categories from the catalog that are relevant to their workplace and the location of the display. Each category in the catalog has multiple topics. Each topic contains 6 components: 3 posters (for portrait zone) and 3 horizontal slides (for the landscape zone). Each component will display in the zone for 15 seconds before transitioning to the next component. Content Concierge looks at the sign profile for the library categories and schedules relevant content from those categories to play on the display for a specific period of time. For example: General safety category may contain topics like Heat Stress, Hydration; Personal Safety may contain a Holiday Safety topic and the Wellness category may contain topics like Heart Health and Making Healthy Food Choices. Content Concierge will play Heat Stress and Hydration during typical warmer months (June-August) and Holiday Safety in November/December whereas the Heart Health and Making Healthy Food Choices topics could be played during any month. The system is designed to change out content for the duration of the license period. When new topics are added to the category, those topics are also added to the mix for the concierge service to add into the sign rotation.

The Tips Zone may be a portion of a panel (e.g., zone) on the display that the Content Concierge is allowed to manage. The tips may include short tips for the work and home cover general safety, personal and home safety, health and wellness, data security and financial wellness. Content Concierge will manage these tips with the same consideration as the content library where tips around heat stress, hydration, outdoor safety will be displayed in the warmer months, whereas flu prevention, holiday shopping safety and winter weather driving tips will display in applicable months. While the Content Concierge service gives the client the freedom from managing content, they have the flexibility to add their own content onto the displays as well.

Example 3

In some implementations, the signage device may supervise media presented on a display of a digital sign.

In various implementations, the signage device may include one or more modules to manage presentation of media items on an associated display. The modules may communicate with the signage manager, transmit signals to the signage manager, receive and/or retrieve playlists and/or media from the signage manger, generate feeds for transmission to an associate display, split feeds for distribution of a single media feed to secondary device(s), and/or any other appropriate operation.

The module may be installed on a signage device prior to shipment and/or may be installed once the signage device is at a location. The module may facilitate the communication between the Sign Manager and the signage device. The signage device module may allow operation including but not limited to:

Heartbeats: Heartbeats are very small packets (e.g., signals) sent to signage manager at a known interval (e.g., periodically) to indicate the sign is still running. The server is set to alert users when a sign exceeds a configured amount of time without heart beating. The heartbeat response from server to sign is used to indicate that there is a new configuration to be picked up. All communication with the sign is initiated from the sign so that the client may not have to adjust their network configuration to allow inbound contact with the sign.

Downloads configuration changes from signage manager: Configuration updates can be made by a user publishing changes on Sign Manager, or automatically by some of the features (like Traffic). The Sign Supervisor handles the download of these files.

Downloads assets from signage manager: The sign may be designed to use as little network bandwidth as reasonable, in some implementations. For example, when the sign is sent a configuration containing image/video assets, a hash value is sent along with each item. If the sign already has content with the same name, it compares the hash value of the local item with the value in the configuration. If the hashes match, it continues to use the content it already has. If the hashes don't match, the content is downloaded and given a new name, so that existing content can be updated or multiple items that happen to have the same name do not conflict with each other.

1. Downloads player software updates—Player software updates can be sent from the signage manager server to a Supervisor, which then automatically applies the update in the very early morning for minimal noticeable disruption of the sign display.
2. Remote Access—A third party software allows signage system to remote access the sign player as long as the sign player is powered on and connected to the internet. This allows for sign player and sign supervisor software updates as well as any troubleshooting on an as needed basis.
3. Start/Stop function—The Supervisor user interface may have Start/Stop buttons to easily stop and restart the sign Player's operation, allowing maintenance of the computer without the distracting display operating. While the player is manually turned off, the Supervisor continues its heartbeat and file download duties, so that when the Player is restarted it is ready to go.
4. Sign Player Software—This software may handles visual display of content. The Sign player software carries out the instructions from the Sign Manager. The visual display of content includes:
   a. Multiple Display Formats (sign templates)—A plurality of formats for templates may be available. Templates may be specific for entities and/or accessible by a plurality of entities. A sign can change templates on a schedule which is managed in the Sign manager by editing the Sign Zone Layout in the Playlist, in some implementations.
   b. Examples of Panels Supported:
      i. Poster—corresponds with Portrait Content Zone on Sign Manager. Image panel, change can be either fade-in/-out or instant.
      ii. Media—corresponds with Landscape Content Zone on Sign Manager. This is a multi-purpose panel (see below), changes are instant.
      iii. Info Zone—Safety Tip items can be configured by signage manager to have varying backgrounds, for a more engaging, dynamic appearing sign. The Info Zone is also used by the Severe Weather alerter. The sign can be configured to receive National Weather Service (NWS) weather alerts, for example, for counties specified in the Sign Manager. When alerts are issued by NWS, they are updated to the sign which begins alternating the regular Safety Tip information with the text of the alert(s).
      When multiple alerts apply to the sign, the entire set of alerts are played along with notices that there are multiple alerts in effect.
      iv. Marquee Zone—The scrolling ticker feed can play either user-supplied text (including an automatically-updating "number of days safe"), or a user-supplied RSS feed which has a configurable update period.
      v. Weather Zone—for example weather RSS and/or other information may be obtained (e.g., from the National Weather Service Weather (NWS)). The NWS Weather display can be configured by users and/or signage manager administrators for entity needs. The default template displays the current weather conditions (including an easy-to-notice indicator when NWS declares heavy weather conditions), and a five-day forecast (which has a similar indicator for NWA forecast of hazardous conditions). Lobby templates display current weather conditions and easy to notice indicator when NWS declares heavy weather conditions. Although NWS has been described weather information may be obtained from other sources.
      vi. Clock—The clock operation is automatic, and in some implementations, may not require management by the signage manager. For example, the signage device clock and time zone settings may be utilized.
      vii. Media Panel—The majority of the versatility of the sign is driven by the Media panel. It manages the display of video as well as various types of still image content.
         a. Video—Video can be played within the Media panel with the other panels of the sign operating normally, or full-screen hiding the rest of the sign's panels. Video can run either in rotation with other content on the Media panel (even when it run full-screen it can operate in rotation), or it can run at scheduled times, allowing the exact start times and days to be chosen in the Sign Manager.
         b. User-supplied Images—The Sign Manager allows setup of the order that standard images (uploadable in various formats) play in rotation.
         c. Enhanced Content—Topics are chosen in Sign manager, with time to play, frequency and start/end time choices. These topics are provided from a third party source that generate automatic hourly content updates to the sign, allowing a frequently changing display of imagery without operator intervention. These images play full screen on the standard template. Lobby Templates can play full content either full screen or in horizontal zone.
         d. Traffic—Traffic locations are chosen in the Sign Manager with similar timing options to Enhanced Content. Traffic displays are updated as much as every 15 minutes, in some implementations, showing maps and text of current traffic conditions. These images play full screen on the standard template. Lobby Templates can play full content either full screen or in horizontal zone. If a sign is on quiet time for content updates, traffic always continues to update.

End of Examples

In various implementations, computers (e.g., signage manager and/or signage device) have been described. The computer may include a processor that executes instructions (e.g., to perform various described operations) and manipulates data to perform operations of server and a memory.

A memory may include a repository (e.g., a database) of data. Data may include data sources (e.g., libraries of media items, streaming media sources, etc.), media items, templates, libraries of media items, playlists, modification information, user credentials (e.g., for verification of access), and/or any other appropriate data. In addition, various software may be stored on memory. For example, modules for managing playlists may be stored on a memory. The modules (e.g., of the signage manager) may include a graphical interface facilitating interaction between a user and the signage manager. Software may also include an interface coupled to the modules, and the software may accesses data upon request from the modules. Memory may also include other forms of memory such as volatile memory. Memory may be remote and/or local memory of the computer.

The computer(s) may include a communication interface that may allow the computer to communicate with other repositories and/or computer systems (e.g., signage manager and/or signage devices) via a network. Communication interface may transmit data from and/or receive data from coupled repositories and/or other computer systems via network protocols (e.g., TCP/IP, Bluetooth, and/or Wi-Fi) and/or a bus (e.g., serial, parallel, USB, and/or FireWire).

A client may be used to allow a user to access signage manager and/or modules stored on the signage manager. The client may be a computer system such as a personal computer, a laptop, a personal digital assistant, a smart phone, or any computer system appropriate for communicating with signage manager. The client may include a processor, a memory, a communication interface, and a presentation interface. Processor may include a programmable logic device, a microprocessor, or any other appropriate device for manipulating information in a logical manner and memory may include any appropriate form(s) of volatile and/or nonvolatile memory, such as a repository. Communication interface allows the client to communication to other computers and/or repositories via a network. The communication interface communicates with signage manager via one or more network protocols (e.g., TCP/IP, Wi-Fi, 802.11g, 802.11n, IR or Bluetooth). A presentation interface may present data on the client to a user, such as via a monitor and speakers.

A graphical user interface (GUI) of the signage manager may be displayed on a presentation interface, such as a monitor, of the client. FIGS. 2-10 illustrate implementations of example GUIs generated by the signage manager. GUI may be operable to allow the user of client to interact with repositories and/or signage manager. Generally, GUI provides the user of client with an efficient and user-friendly presentation of data provided by signage manager. GUI includes a plurality of displays having interactive fields, pull-down lists, and buttons operated by the user. And in one example, GUI presents an explore-type interface and receives commands from the user. It should be understood that the term graphical user interface may be used in the singular or in the plural to describe one or more graphical user interfaces in each of the displays of a particular graphical user interface. Further, GUI contemplates any graphical user interface, such as a generic web browser, that processes information in signage manager and/or client and efficiently presents the information to the user. The signage manager can accept data from the user of client via the web browser (e.g., Firefox or Safari) and return the appropriate Hyper Text Markup Language (HTML) or eXtensible Markup Language (XML) responses.

Although one example of a signage manager has be described, the signage manager can be implemented using computers other than servers, as well as a server pool. For example, the signage manager server may include a general-purpose personal computer (PC) a Macintosh, a workstation, a UNIX-based computer, a server computer, or any other suitable device. According to one implementation, signage manager server may include a web server. Signage manager server may be adapted to execute any operating system including UNIX, Linux, Windows, or any other suitable operating system. In short, signage manager server may include software and/or hardware in any combination suitable to provide access to data and/or translate data to an appropriate compatible format.

Although a single processor has been described in various implementations, multiple processors or other types of processors may be used according to particular needs. A processor may include a programmable logic device, a microprocessor, or any other appropriate device for manipulating information in a logical manner.

The described process may be implemented by various systems, such as the described signage system(s). In addition, various operations may be added, deleted, and/or modified. In some implementations, described processes or portions thereof may be performed in combination with other processes or portions thereof.

Although users have been described as a human, a user may be a person, a group of people, a person or persons interacting with one or more computers, and/or a computer system.

It is to be understood the implementations are not limited to particular systems or processes described which may, of course, vary. It is also to be understood that the terminology used herein is for the purpose of describing particular implementations only, and is not intended to be limiting. As used in this specification, the singular forms "a", "an" and "the" include plural referents unless the content clearly indicates otherwise. Thus, for example, reference to "a streaming video" includes a combination of two or more videos and reference to "media" includes different types and/or combinations of media.

Although the present disclosure has been described in detail, it should be understood that various changes, substitutions and alterations may be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

The invention claimed is:

1. A system to manage presentation media, the system comprising:
 a signage manager comprising a memory storing:
  a playlist associated with a signage device, wherein the playlist comprises:
   a listing of one or more media items stored on the signage device for presentation on a display associated with the signage device; and
   an indication of one or more zones of the associated display in which the one or more media items is to be presented, wherein the one or more zones is defined by a template indicating a size, a shape, and a relative position of the zone within the associated display;
  a module operable to:
   receive a signal from the signage device at an interval;

send, to the signage device, updates to at least one of the playlist or one or more of the media items in response to receiving the signal from the signage device;
control presentation of the one or more media items on the associated display by:
inhibiting receipt of alterations to the playlist from the signage device,
wherein the display associated with the signage device is not capable of transmitting change instructions regarding the playlist to the signage device or the signage manager; and
a processor capable of executing the module stored in the memory.

2. The system of claim 1 wherein one or more of the media items includes media streamed from an external source, and wherein the signage device allows the media to be streamed from the external source to the associated display according to the playlist.

3. The system of claim 1 wherein the module is inhibited from receiving alterations to the playlist from the signage device.

4. The system of claim 1 wherein at least one of the playlists comprises at least one media item stored on the signage device, wherein the at least one stored media item is presented during an internet outage such that the internet outage does not substantially affect playback of media based on the playlist by the signage device.

5. The system of claim 1 wherein the module is further operable to:
transmit one or more new media items to the signage device, wherein the one or more new media items are not in the playlist, wherein transmitting the new media items interrupts a feed of the media items based on the playlist from the signage device to the associated display.

6. A method to control presentation on a plurality of signage devices, the method comprising:
managing a plurality of playlists for a plurality of signage devices, wherein each playlist is associated with one of the signage devices, and wherein each signage device is associated with a display and transmits media to the display based on associated playlist, wherein each playlist comprises:
a listing of one or more media items to be presented; and
an indication of one or more zones of the associated display in which the one or more media items is to be presented, wherein the one or more zones is defined by a template indicating a size, a shape, and a relative position of the zone within the associated display;
independently managing, by a signage manager, each of the playlists in the plurality of playlists such that the media presented on each of the displays is independently controllable;
inhibiting receipt of alterations to the playlist from the signage device, wherein the display associated with the signage device is not capable of transmitting change instructions regarding the playlist to the signage device or the signage manager;
receiving a signal from one of the plurality of signage devices;
determining whether one of the playlists associated with the signage device that transmitted the signal has been updated;
if a determination is made that a playlist has been updated, transmitting from a signage manager to the signage device that transmitted the signal the updated playlist, wherein the signage device plays media based on the updated playlist after receipt of the updated playlist; and wherein transmission of the updated playlist to the signage device that transmitted the signal does not alter the playlists of other signage devices of the plurality of signage devices;
identifying one or more media items that are in the updated playlist and not previously transmitted to the signage device; and
transmitting the one or more media items that are in the playlist and not previously transmitted to the signage device.

7. The method of claim 6 further comprising:
receiving an update to one or more of the playlists; and
pushing the updated one or more playlists to one or more of the signage devices associated with the one or more playlists.

8. The method of claim 6, further comprising determining a health of one of the signage device based on the signal received or not received from the signage device.

9. The method of claim 8, further comprising transmitting a notification to one or more users based on the determined health of the signage device.

10. The method of claim 6 wherein each of the playlist allows one or more media items to be presented sequentially in one or more zones presented on the display associated with one of the signage managers; and wherein one or more of the media items comprises at least one of:
a media item stored in a memory of the signage device, streaming TV feed, streaming movie feed, media related to weather, media related to traffic, alerts, media related to a meeting, a handout, information sheet, media related to business operations, or media related to site specific information.

11. The method of claim 6 further comprising restricting transmission of one or more of the playlists to one of the signage devices during a quiet period of the signage device.

12. The method of claim 6 further comprising:
receiving one or more new media items for immediate play from a user;
receiving an identification of a subset of the signage devices or associated displays, wherein a subset of the playlists are associated with the subset of the signage devices; and
transmitting the one or more new media items to the identified subset of signage devices such that the one or more new media items interrupts the subset of playlists being presented by the subset of signage devices on associated displays, and wherein the one or more new media items are not in the subset of playlists.

13. The method of claim 6 generating one or more user interfaces to allow customization of at least one of:
one or more of the playlists
or one or more of the media items.

14. A method to control presentation of media items on a plurality of signage devices, the method comprising:
transmitting from a signage manager to a plurality of signage devices a plurality of playlists, wherein each playlist is associated with one of the signage devices, and wherein each signage device is associated with a display, wherein each playlist comprises:
a listing of one or more media items to be presented; and an indication of one or more zones of the associated display in which the one or more media items is to be presented, wherein the one or more zones is defined by a template indicating a size, a shape, and a relative position of the zone within the associated display;

inhibiting receipt of alterations to the playlist from the signage device, wherein the display associated with the signage device is not capable of transmitting change instructions regarding the playlist to the signage device or the signage manager;

wherein the signage manager is inhibited from communicating with the displays;

wherein each playlist is associated with one of the signage devices, and wherein each of the signage devices transmits media to a single display according to an associated playlist;

and wherein the signage manager allows independent management of each of the playlists in the playlists such that the media presented on each of the displays is independently controllable.

15. The method of claim 14 further comprising:

receiving one or more geographical regions to associate with a set of the plurality of signage devices, and wherein each signage device in the set of signage devices is associated with one or more of the geographical regions;

obtaining a severe weather alert associated with one of the geographical regions;

transmitting the severe weather alert to one or more signage devices in the set of signage devices that are associated with the geographical region associated with the severe weather alert, wherein the severe weather alert interrupts at least a portion of the playlist in at least one of the zones.

16. The method of claim 14 further comprising:

receiving from a user a selection of one or more zones on one of the displays;

obtaining one or more topics for display on one or more of the selected zones on the display;

automatically identifying one or more media items for inclusion in one of the playlists associated with the display based on one or more of the topics; and allowing at least one of:
  transmitting a recommendation to the user based on the automatically identified one or more media items for inclusion,
  or automatically updating the playlist to include one or more of the automatically identified one or more media items for inclusion.

17. The method of claim 14 further comprising:

generating at least one playlist of the plurality of playlists by:
  receiving at least one topic selection from a user, wherein each topic is associated with more than one available media items, wherein available media items are available for inclusion in the playlist;
  automatically selecting one or more of the available media items associated with the topic for inclusion in the at least one playlist;
  automatically assigning at least one of a zone or a play duration to the selected one or more of the available media items in the at least one playlist; and
  allowing a user to modify at least one of the automatically assigned zone, the automatically assigned play duration, or the automatically selected one or more available media items for the at least one playlist.

* * * * *